United States Patent
Xiong et al.

(10) Patent No.: US 12,429,992 B2
(45) Date of Patent: Sep. 30, 2025

(54) OPERATION METHOD AND ELECTRONIC DEVICE FOR DISPLAYING CONTENT OF AN APPLICATION IN AN ACCESSIBLE WINDOW

(71) Applicant: HUAWEI TECHNOLOGIES CO., LTD., Guangdong (CN)

(72) Inventors: Liudong Xiong, Shenzhen (CN); Chundong Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/762,772

(22) PCT Filed: Jul. 15, 2020

(86) PCT No.: PCT/CN2020/102103
§ 371 (c)(1),
(2) Date: Mar. 23, 2022

(87) PCT Pub. No.: WO2021/057203
PCT Pub. Date: Apr. 1, 2021

(65) Prior Publication Data
US 2022/0357818 A1    Nov. 10, 2022

(30) Foreign Application Priority Data

Sep. 24, 2019    (CN) .................. 201910907503.X

(51) Int. Cl.
*G06F 3/0481*    (2022.01)
*G06F 3/04847*    (2022.01)
(Continued)

(52) U.S. Cl.
CPC ........ *G06F 3/0481* (2013.01); *G06F 3/04847* (2013.01); *H04M 1/72448* (2021.01);
(Continued)

(58) Field of Classification Search
CPC ............... G06F 3/0481; G06F 3/04847; G06F 2203/04803; H04M 1/72448; H04M 1/72469
See application file for complete search history.

(56) References Cited

U.S. PATENT DOCUMENTS 5,305,435 A * 4/1994 Bronson ............... G06F 3/0481
715/788
6,091,395 A * 7/2000 DeStefano ............ G06F 3/0481
715/788
(Continued)

FOREIGN PATENT DOCUMENTS

CN    104281393 A    1/2015
CN    105094658 A    11/2015
(Continued)

OTHER PUBLICATIONS

Office Action issued in CN201910907503.X, dated Jun. 8, 2020, 5 pages.
(Continued)

*Primary Examiner* — Justin R. Blaufeld

(57) ABSTRACT

This disclosure provides an operation method. The method is applied to an electronic device, and includes: displaying a first interface, where the first interface includes first content of a first application; detecting a first operation in the first interface; displaying a first window in the first interface in response to the first operation, where a first area in the first window is used to display the first content of the first application; detecting a second operation in the first window; and in response to the second operation, displaying second content of the first application in the first area in the first window, and displaying, in the first interface, content the same as that in the first area in the first window.

13 Claims, 91 Drawing Sheets

(51) Int. Cl.
*H04M 1/72448* (2021.01)
*H04M 1/72469* (2021.01)

(52) U.S. Cl.
CPC ............ *G06F 2203/04803* (2013.01); *H04M 1/72469* (2021.01)

(56) References Cited

U.S. PATENT DOCUMENTS

| | | | | |
|---|---|---|---|---|
| 6,166,736 A * | 12/2000 | Hugh | ............... | G06F 3/0481 715/777 |
| 2003/0189597 A1* | 10/2003 | Anderson | ............. | G06F 3/0481 715/778 |
| 2004/0056893 A1* | 3/2004 | Canfield | ............. | G06Q 10/107 715/753 |
| 2005/0257163 A1* | 11/2005 | Conrad | ................. | G06F 3/0486 715/835 |
| 2006/0123353 A1* | 6/2006 | Matthews | ............ | G06F 3/0481 715/779 |
| 2006/0161859 A1* | 7/2006 | Holecek | ................. | G06F 3/048 715/781 |
| 2006/0161860 A1* | 7/2006 | Holecek | ................. | G06F 3/048 715/781 |
| 2006/0218500 A1* | 9/2006 | Sauve | ................... | G06F 3/0481 715/767 |
| 2007/0041056 A1* | 2/2007 | Wakai | ................... | G06F 3/1431 358/448 |
| 2008/0057926 A1* | 3/2008 | Forstall | ............... | H04M 1/7243 455/415 |
| 2008/0074550 A1* | 3/2008 | Park | ..................... | H04N 21/482 348/565 |
| 2008/0082937 A1* | 4/2008 | Bennah | ............... | G06F 3/04812 715/781 |
| 2009/0193364 A1* | 7/2009 | Jarrett | ................. | G06F 3/04817 715/838 |
| 2009/0199128 A1* | 8/2009 | Matthews | ............ | G06F 3/0481 715/800 |
| 2010/0064260 A1* | 3/2010 | Amano | ................... | G09G 5/14 715/859 |
| 2010/0083154 A1* | 4/2010 | Takeshita | ............... | G16H 30/20 715/781 |
| 2010/0248788 A1* | 9/2010 | Yook | .................... | G06F 3/04886 455/566 |
| 2010/0257482 A1* | 10/2010 | Lyons | ................... | G06F 3/0486 715/835 |
| 2011/0175930 A1* | 7/2011 | Hwang | ................. | G06F 3/0482 345/660 |
| 2011/0302528 A1* | 12/2011 | Starr | ...................... | G06F 9/451 715/862 |
| 2012/0066628 A1* | 3/2012 | Ens | ...................... | G06F 16/9577 715/769 |
| 2012/0117505 A1* | 5/2012 | Koch | .................... | G06F 3/04886 345/173 |
| 2012/0204125 A1* | 8/2012 | Shia | .................... | G06F 3/04886 715/781 |
| 2012/0220340 A1* | 8/2012 | Sirpal | ................... | G06F 3/04886 715/788 |
| 2012/0236035 A1* | 9/2012 | Kimura | .............. | H04M 1/0247 345/660 |
| 2012/0272128 A1* | 10/2012 | Takaku | ............... | G06F 3/1423 345/173 |
| 2013/0057572 A1* | 3/2013 | Anderson | ............... | G06F 9/451 345/619 |
| 2013/0086507 A1* | 4/2013 | Poston | ................. | G06F 3/0483 715/777 |
| 2013/0205244 A1* | 8/2013 | Decker | ................ | G06F 3/04845 715/777 |
| 2013/0227472 A1* | 8/2013 | Sosinski | ............ | G06F 3/03547 715/788 |
| 2013/0237288 A1 | 9/2013 | Lee | | |
| 2013/0321340 A1* | 12/2013 | Seo | ....................... | G06F 3/0486 345/174 |
| 2014/0089831 A1* | 3/2014 | Kim | .................... | G06F 3/04883 715/769 |
| 2014/0181686 A1* | 6/2014 | Shin | ........................ | H04B 5/72 715/748 |
| 2014/0213318 A1* | 7/2014 | Leem | .................... | G06F 3/0482 455/566 |
| 2014/0306905 A1* | 10/2014 | Kim | .................... | G06F 3/04883 345/173 |
| 2014/0337794 A1* | 11/2014 | Vranjes | ................... | G06F 9/451 715/800 |
| 2014/0359436 A1* | 12/2014 | Kim | ...................... | G06F 3/0481 715/702 |
| 2015/0067588 A1* | 3/2015 | Shim | ................... | G06F 3/04886 715/781 |
| 2015/0153951 A1* | 6/2015 | Kim | ..................... | G06F 3/0488 715/773 |
| 2015/0169141 A1* | 6/2015 | Kim | ..................... | G06F 3/0482 715/769 |
| 2015/0205507 A1 | 7/2015 | Chen | | |
| 2015/0268743 A1* | 9/2015 | Takeuchi | .............. | G06F 1/1632 345/157 |
| 2015/0277711 A1* | 10/2015 | Masterson | .............. | G06T 13/80 715/752 |
| 2015/0277722 A1* | 10/2015 | Masterson | ............ | H04L 67/565 715/752 |
| 2015/0293659 A1* | 10/2015 | Yoo | ........................ | G06F 3/0488 715/765 |
| 2015/0338888 A1* | 11/2015 | Kim | ...................... | G06F 1/1677 345/156 |
| 2015/0355823 A1* | 12/2015 | Han | .................... | G06F 3/04817 715/765 |
| 2016/0070466 A1* | 3/2016 | Chaudhri | .............. | H04M 1/724 715/765 |
| 2016/0077685 A1* | 3/2016 | Fang | ........................ | G06F 9/452 715/778 |
| 2016/0103793 A1* | 4/2016 | Fang | ..................... | G06F 3/0483 715/234 |
| 2016/0124595 A1* | 5/2016 | Kim | .................... | G06F 3/04845 715/769 |
| 2016/0349934 A1 | 12/2016 | Liu | | |
| 2017/0031555 A1* | 2/2017 | Ma | ........................ | G06F 3/0488 |
| 2017/0109037 A1* | 4/2017 | Seo | ..................... | G06F 3/04883 |
| 2017/0269822 A1 | 9/2017 | Mu | | |
| 2017/0344329 A1* | 11/2017 | Oh | ........................ | H04W 88/02 |
| 2017/0357437 A1* | 12/2017 | Peterson | ............... | G06F 40/134 |
| 2019/0258376 A1* | 8/2019 | Park | ...................... | G06F 3/0488 |
| 2019/0339836 A1* | 11/2019 | Kanda | ................... | G06F 3/0482 |
| 2020/0097135 A1* | 3/2020 | Fard | ..................... | G06F 3/04886 |
| 2020/0174662 A1* | 6/2020 | Liang | ..................... | G06F 9/451 |

FOREIGN PATENT DOCUMENTS

| | | | | |
|---|---|---|---|---|
| CN | 105159505 A | | 12/2015 | |
| CN | 105760055 A | | 7/2016 | |
| CN | 106445354 A | * | 2/2017 | .......... G06F 3/0484 |
| CN | 106775341 A | | 5/2017 | |
| CN | 107515712 A | | 12/2017 | |
| CN | 104540190 B | | 4/2018 | |
| CN | 108664182 A | | 10/2018 | |
| CN | 105703807 B | | 2/2019 | |
| CN | 109364479 A | | 2/2019 | |
| CN | 105792106 B | | 3/2019 | |
| CN | 109445572 A | | 3/2019 | |
| CN | 109917956 A | | 6/2019 | |
| CN | 110830645 A | | 2/2020 | |
| EP | 2207342 A2 | | 7/2010 | |
| KR | 101668394 B1 | | 10/2016 | |
| WO | WO-2011037222 A1 | * | 3/2011 | .......... H04M 1/0247 |
| WO | 2015161653 A1 | | 10/2015 | |

OTHER PUBLICATIONS

International Search Report and Written Opinion issued in PCT/CN2020/102103, dated Sep. 28, 2020, 10 pages.

(56) References Cited

OTHER PUBLICATIONS

European Extended Search Report for Application No. 20869802 dated Oct. 10, 2022, 7 pages.

* cited by examiner

OPERATION METHOD AND ELECTRONIC DEVICE FOR DISPLAYING CONTENT OF AN APPLICATION IN AN ACCESSIBLE WINDOW

This application is a national stage of International Application No. PCT/CN2020/102103, filed on Jul. 15, 2020, which claims priority to Chinese Patent Application No. 201910907503.X, filed on Sep. 24, 2019. Both of the aforementioned applications are hereby incorporated by reference in their entireties.

TECHNICAL FIELD

This application relates to the field of electronic devices, and more specifically, to an operation method and an electronic device.

BACKGROUND

With development of electronic products, a user has an increasingly high requirement for a terminal device, and increasingly more terminal devices use large screens. Many users are still accustomed to one-hand holding and one-hand operating of large-screen terminal devices. Therefore, a one-handed mode may be set on the terminal device, and software on the terminal device is scaled down to lower left or lower right, to facilitate a one-hand operation. However, for the large-screen terminal device, if a display area for the software on the terminal device is scaled down, user experience on the large-screen terminal device is poor. In addition, if a width of the screen is large, even if the software on the terminal device is dragged downward, it is still inconvenient to one-hand operate the other end of the handheld terminal device.

SUMMARY

This application provides an operation method and an electronic device, to help improve user experience.

According to a first aspect, an operation method is provided. The method is applied to an electronic device, and includes: displaying a first interface, where the first interface includes first content of a first application; detecting a first operation in the first interface; displaying a first window in the first interface in response to the first operation, where a first area in the first window is used to display the first content of the first application; detecting a second operation in the first window; and in response to the second operation, displaying second content of the first application in the first area in the first window, and displaying, in the first interface, content the same as that in the first area in the first window.

For example, the first operation may be a slide up operation.

For example, the second operation may be a double-tap operation or a slide operation.

For example, when the first application is WeChat, the first interface is a home screen of WeChat on the electronic device, and content displayed on the home screen of WeChat is the first content. When the electronic device detects the first operation, the content displayed in the first area in the first window is synchronized with the content displayed in the first interface, that is, the content displayed in the first area in the first window is also the content displayed on the home screen of WeChat. When a double-tap operation is detected in the first window, the content displayed in the first area in the first window is scaled up as a whole relative to the content displayed on the home screen of WeChat. For example, a font of the content displayed on the home screen of WeChat may be scaled up. For another example, an area occupied by the content displayed on the home screen of WeChat is scaled up. When a slide operation is detected in the first window, the content displayed in the first area in the first window moves as a whole relative to the content displayed on the home screen of WeChat. For example, the content displayed on the home screen of WeChat may move as a whole by a specific distance along a slide direction. In this case, the content displayed in the first interface is synchronized with the content displayed in the first area in the first window.

In this embodiment of this application, after detecting the first operation, the electronic device displays the first window in the first interface. In this case, content displayed in the first window is synchronized with the content displayed in the first interface. When detecting the second operation in the first window, the electronic device changes the content displayed in the first area in the first window, and synchronizes the content with the content in the first interface, so that the content displayed in the first area in the first window is synchronized with the content displayed in the first interface. This can facilitate an operation of a user and improve user experience.

With reference to the first aspect, in some possible implementations of the first aspect, the first window further includes a second area; and the detecting a second operation in the first window includes: detecting the second operation in the second area in the first window.

With reference to the first aspect, in some possible implementations of the first aspect, the first window further includes a third area, and the third area is used to display at least one application running in the background of the electronic device.

For example, the third area may display an icon of the at least one application running in the background of the electronic device, or the third area may display a thumbnail of the at least one application running in the background of the electronic device.

For example, if an application running in the background of the electronic device includes only WeChat, an icon of WeChat may be displayed in the third area in the first window, or a thumbnail of WeChat running in the background of the electronic device may be displayed in the third area in the first window. For another example, if applications running in the background of the electronic device include WeChat, Alarm, and Albums, an icon of WeChat, an icon of Alarm, and an icon of Albums may be displayed in the third area in the first window, or a thumbnail of WeChat running in the background of the electronic device, a thumbnail of Alarm running in the background of the electronic device, and a thumbnail of Albums running in the background of the electronic device may be displayed in the third area in the first window.

With reference to the first aspect, in some possible implementations of the first aspect, the method further includes: detecting a third operation in the third area in the first window; and displaying the first content of the first application in the first area in the first window in response to the third operation.

For example, the third operation may be a single-tap operation.

For example, an icon of WeChat is displayed in the third area in the first window, and after a single-tap operation on the icon of WeChat is detected, content displayed on a home screen of WeChat is displayed in the first area in the first window. For another example, a thumbnail of WeChat running in the background of the electronic device, a thumbnail of Alarm running in the background of the electronic device, and a thumbnail of Albums running in the background of the electronic device may be displayed in the third area in the first window. After a single-tap operation on the thumbnail of Alarm is detected, content displayed on a home screen of Alarm is displayed in the first area in the first window.

In this embodiment of this application, when the third operation is detected in the third area in the first window, the first content of the first application is displayed in the first area in the first window, so that the user can conveniently select an application that needs to be operated. This can facilitate an operation of the user and improve user experience.

With reference to the first aspect, in some possible implementations of the first aspect, the method further includes: detecting a fourth operation in the first window; and changing a display size of the first window in the first interface in response to the fourth operation.

For example, the fourth operation may be a double-tap operation, or the fourth operation may be a slide operation of the user with two fingers along two opposite directions on the electronic device.

The user may adjust the display size of the first window, so that user experience can be improved.

With reference to the first aspect, in some possible implementations of the first aspect, the first window is located at a first location in the first interface; and the method further includes: detecting a fifth operation in the first window; and moving the first window from the first location in the first interface to a second location in the first interface in response to the fifth operation.

The user may adjust the location of the first window, so that user experience can be improved.

According to a second aspect, an operation apparatus is provided. The apparatus is included in an electronic device, and the apparatus has functions of implementing behavior of the electronic device according to the foregoing aspect and the possible implementations of the foregoing aspect. The functions may be implemented by hardware, or may be implemented by hardware executing corresponding software. The hardware or the software includes one or more modules or units corresponding to the foregoing functions, for example, a display module or unit and a detection module or unit.

According to a third aspect, an electronic device is provided, and includes one or more processors and one or more memories. The one or more memories store one or more computer programs, where the one or more computer programs include instructions, and when the instructions are executed by the one or more processors, the electronic device is enabled to perform the following steps: displaying a first interface, where the first interface includes first content of a first application; detecting a first operation in the first interface; displaying a first window in the first interface in response to the first operation, where a first area in the first window is used to display the first content of the first application; detecting a second operation in the first window; and in response to the second operation, displaying second content of the first application in the first area in the first window, and displaying, in the first interface, content the same as that in the first area in the first window.

With reference to the third aspect, in some possible implementations of the third aspect, the first window includes a first area, and when the instructions are executed by the one or more processors, the electronic device is enabled to further perform the following step: detecting the second operation in the second area in the first window.

With reference to the third aspect, in some possible implementations of the third aspect, the first window further includes a third area, and the third area is used to display at least one application running in the background of the electronic device.

With reference to the third aspect, in some possible implementations of the third aspect, a third operation is detected in the third area in the first window; and the first content of the first application is displayed in the first area in the first window in response to the third operation.

With reference to the third aspect, in some possible implementations of the third aspect, when the instructions are executed by the one or more processors, the electronic device is enabled to further perform the following steps: detecting a fourth operation in the first window; and changing a display size of the first window in the first interface in response to the fourth operation.

With reference to the third aspect, in some possible implementations of the third aspect, the first window is located at a first location in the first interface, and when the instructions are executed by the one or more processors, the electronic device is enabled to further perform the following steps: detecting a fifth operation in the first window; and moving the first window from the first location in the first interface to a second location in the first interface in response to the fifth operation.

According to a fourth aspect, this technical solution provides a computer storage medium, including computer instructions. When the computer instructions are run on an electronic device, the electronic device is enabled to perform the operation method according to any possible implementation of the foregoing aspect.

According to a fifth aspect, this technical solution provides a computer program product. When the computer program product runs on an electronic device, the electronic device is enabled to perform the operation method according to any possible design of the foregoing aspect.

DESCRIPTION OF EMBODIMENTS

The following describes technical solutions in this application with reference to the accompanying drawings.

Terms used in following embodiments are merely intended to describe specific embodiments, but are not intended to limit this application. As used in the specification and appended claims of this application, the terms "a", "one", "the", "the foregoing", and "this" of singular forms are intended to also include plural forms, for example, "one or more", unless otherwise clearly specified in the context. It should be further understood that, in the following embodiments of this application, "at least one" or "one or more" means one, two, or more. The term "and/or" is used to describe an association relationship between associated objects and represents that three relationships may exist. For example, A and/or B may represent the following three cases: Only A exists, both A and B exist, and only B exists, where A and B may be singular or plural. The character "/" usually represents an "or" relationship between the associated objects.

Reference to "an embodiment", "some embodiments", or the like described in this specification means that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment. Instead, the statements mean "one or more but not all of the embodiments", unless otherwise specifically emphasized in another manner. The terms "include", "have", and their variants all mean "include but are not limited to", unless otherwise specifically emphasized.

The following describes an electronic device, a user interface used for the electronic device, and embodiments used for using the electronic device. In some embodiments, the electronic device may be a portable electronic device that further includes another function such as a personal digital assistant function and/or a music player function, for example, a mobile phone, a tablet computer, or a wearable electronic device (for example, a smartwatch) having a wireless communication function. An example embodiment of the portable electronic device includes but is not limited to a portable electronic device provided with iOS®, Android®, Microsoft®, or another operating system. The portable electronic device may alternatively be another portable electronic device, such as a laptop. It should be further understood that, in some other embodiments, the foregoing electronic device may not be the portable electronic device but a desktop computer.

Figure 1:
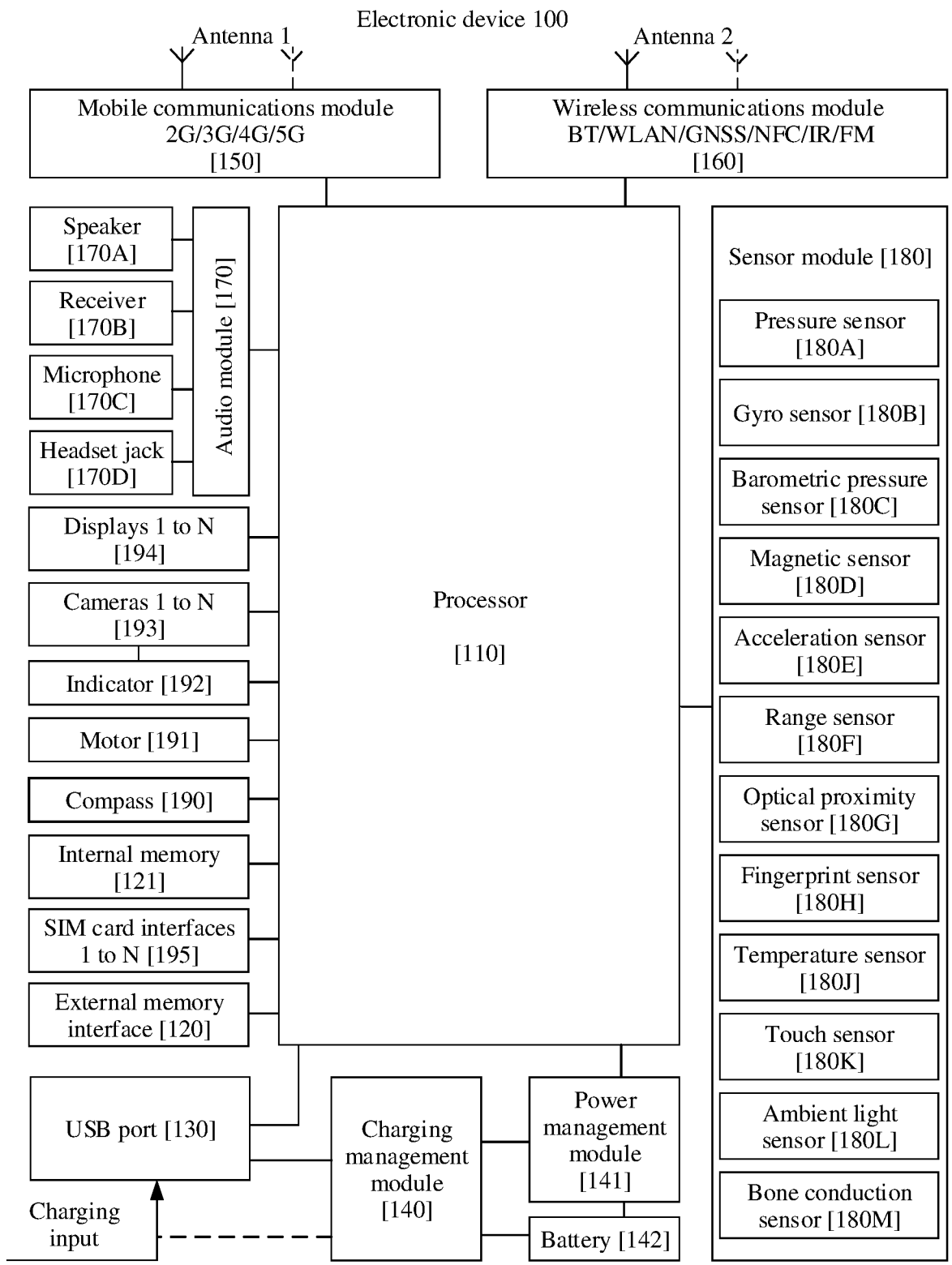
FIG. 1 is a schematic diagram of a hardware structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a compass 190, a motor 191, an indicator 192, a camera 193, a display 194, a subscriber identification module (SIM) card interface 195, and the like.

It may be understood that the structure shown in this embodiment of this application does not constitute a specific limitation on the electronic device 100. In some other embodiments of this application, the electronic device 100 may include more or fewer components than those shown in the figure, or may combine some components, or may split some components, or may have different component arrangements. The components in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors. In some embodiments, the electronic device 101 may alternatively include one or more processors 110. The controller may generate an operation control signal based on an instruction operation code and a time sequence signal, to complete control of instruction reading and instruction execution. In some other embodiments, a memory may be further disposed in the processor 110, to store instructions and data. For example, the memory in the processor 110 may be a cache memory. The memory may store instructions or data just used or cyclically used by the processor 110. If the processor 110 needs to use the instructions or the data again, the processor may directly invoke the instructions or the data from the memory. In this way, repeated access is avoided, waiting time of the processor 110 is reduced, and efficiency of processing data or executing instructions by the electronic device 101 is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB port, and/or the like. The USB port 130 is a port that conforms to a USB standard specification, and may be specifically a mini USB port a micro USB port, a USB Type-C port, or the like. The USB port 130 may be configured to connect to a charger to charge the electronic device 101, or may be configured to transmit data between the electronic device 101 and a peripheral device. The USB port 130 may alternatively be configured to connect to a headset, to play audio by using the headset.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may further be multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert an amplified signal into an electromagnetic wave for radiation through the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the electronic device 100. The wireless communications module 160 may be one or more devices that integrate at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini light-emitting diode (mini LED), a micro-LED, a micro-OLED, quantum dot light emitting diodes (QLED), or the like. In some embodiments, the electronic device 100 may include one or more displays 194.

In some embodiments of this application, when the display panel is made of a material such as an OLED, an AMOLED, or an FLED, the display 194 in FIG. 1 may be bent. Herein, that the display 194 may be bent means that the display may be bent to any angle at any part, and may be held at the angle. For example, the display 194 may be folded left and right from the middle. Alternatively, the display 194 may be folded up and down from the middle.

The display 194 of the electronic device 100 may be a flexible screen. Currently, the flexible screen attracts much attention due to unique features and huge potential of the flexible screen. Compared with a conventional screen, the flexible screen has features of strong flexibility and bendability, and can provide a user with a new interaction mode based on the feature of bendability, to meet more requirements of the user for an electronic device. For an electronic device configured with a foldable display, the foldable display on the electronic device may be switched between a small screen in a folded form and a large screen in an expanded form at any time. Therefore, the user uses a split-screen function more frequently on the electronic device provided with the foldable display.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and a skin color of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to: compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the electronic device 100, such as image recognition, facial recognition, speech recognition, and text understanding, can be implemented by using the NPU.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store one or more computer programs, and the one or more computer programs include instructions. The processor 110 may run the instructions stored in the internal memory 121, so that the electronic device 101 performs the page element display method provided in some embodiments of this application, various applications, data processing, and the like. The internal memory 121 may include a program storage area and a data storage area. The program storage area may store an operating system. The program storage area may further store one or more applications (for example, Gallery and Contacts), and the like. The data storage area may store data (for example, a photo and a contact) created during use of the electronic device 101, and the like. In addition, the internal memory 121 may include a high-speed random access memory, or may include a non-volatile memory, for example, one or more magnetic disk storage devices, flash memory devices, or universal flash storage (UFS). In some embodiments, the processor 110 may run the instructions stored in the internal memory 121 and/or the instructions stored in the memory that is disposed in the processor 110, to enable the electronic device 101 to perform the page element display method provided in the embodiments of this application, other applications, and data processing. The electronic device 100 can implement audio functions, for example, a music playing function and a recording function, by using the audio module 170, the speaker 170A, the receiver 170B, the microphone 170C, the headset jack 170D, the application processor, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation strength may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyro sensor 180B may be configured to determine a motion posture of the electronic device 100. In some embodiments, an angular velocity of the electronic device 100 around three axes (that is, axes X, Y, and Z) may be determined by using the gyro sensor 180B. The gyro sensor 180B may be configured to perform image stabilization during photographing. For example, when a shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The acceleration sensor 180E may detect magnitudes of accelerations of the electronic device 100 in various directions (usually on three axes), and may detect a magnitude and a direction of gravity when the electronic device 100 is still. The acceleration sensor 180E may be further configured to identify a posture of the electronic device, and is used in an application such as switching between a landscape mode and a portrait mode or a pedometer.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided on the display 194. In some other embodiments, the touch sensor 180K may alternatively be disposed on a surface of the electronic device 100 and is located at a location different from that of the display 194.

Figure 2:
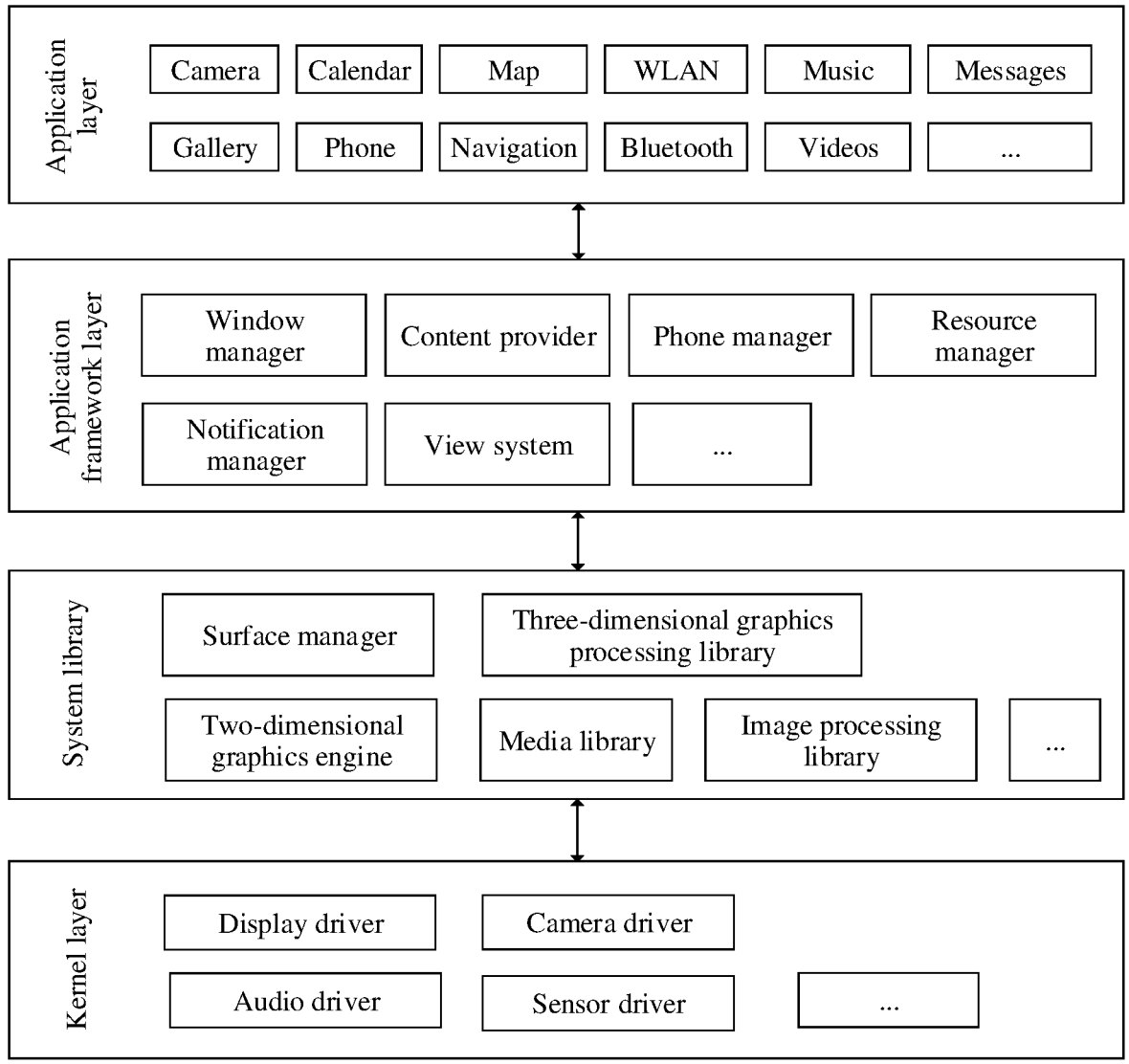
FIG. 2 is a schematic diagram of a software structure of an electronic device according to an embodiment of this application.

FIG. 2 is a block diagram of a software structure of an electronic device 100 according to an embodiment of this application. In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom. The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, an address book, and the like.

The view system includes a visual control, such as a control for displaying a text or a control for displaying a picture. The view system may be configured to construct an application. A display interface may include one or more views. For example, a display interface including a notification icon of Messages may include a text display view and a picture display view.

The phone manager is configured to provide a communication function of the electronic device 100, for example, management of a call status (including answering, declining, or the like).

The resource manager provides various resources for an application such as a localized character string, an icon, a picture, a layout file, and a video file.

The notification manager enables an application to display notification information in a status bar, and may be configured to convey a notification type message. The displayed notification information may automatically disappear after a short pause without user interaction. For example, the notification manager is configured to: notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or an indicator light blinks.

For a foldable electronic device, after a user folds a touchscreen of the electronic device (assuming that the touchscreen may be folded once), the screen may be divided into a screen A and a screen B. It is assumed that the electronic device controls the screen A to be lit up and continue to work, and the screen B is turned off and does not work. When the user holds the electronic device, the screen A may be lit up, and therefore the user may perform a corresponding operation on the screen A; and the screen B is turned off, and therefore the user may not perform any operation on the screen B.

A display manager service is configured to: after the electronic device detects an operation used by the user to trigger the screen A and the screen B to enter a cooperative work mode, adjust an actual display area of the screen to sizes of the screen A and the screen B, so that the screen B can display another application interface.

An activity manager service is configured to open an application interface on the screen B when the screen A and the screen B enter a cooperative work mode.

A window manager service is configured to adjust display locations of application interfaces on the screen A and the screen B on a same expanded screen when the screen A and the screen B enter a cooperative work mode.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to: manage a display subsystem, and provide fusion of 2D and 3D layers for a plurality of applications.

The media library supports playback and recording in a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

FIG. 3(a) to FIG. 3(d) show a group of graphical user interfaces (GUIs) of a mobile phone. FIG. 3(a) to FIG. 3(d) show a process in which a GUI changes when a user opens an application and performs a one-hand operation.

Figure 3A:
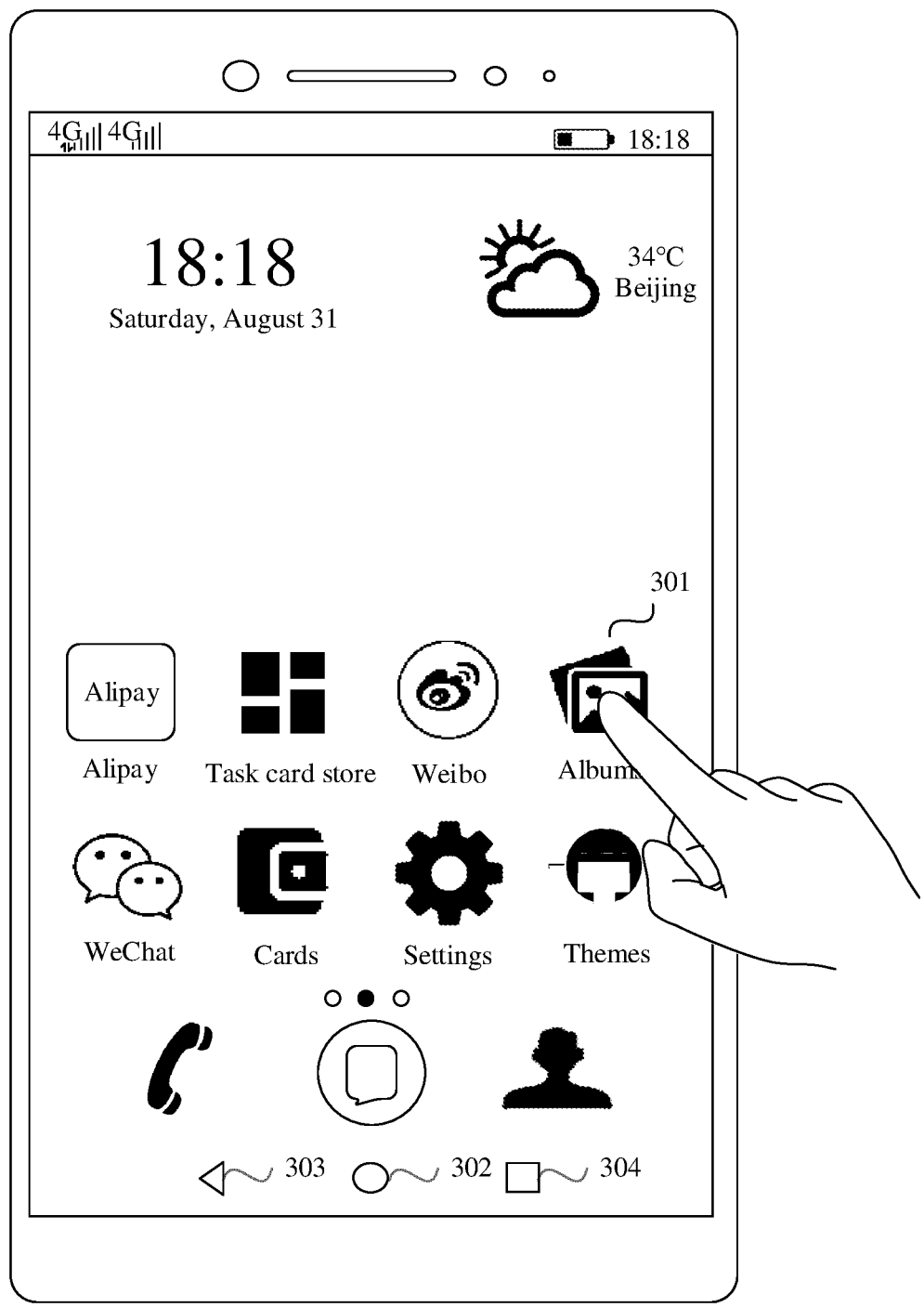
FIG. 3(a) to FIG. 3(d) are a schematic diagram of a group of GUIs.
Figure 3B:
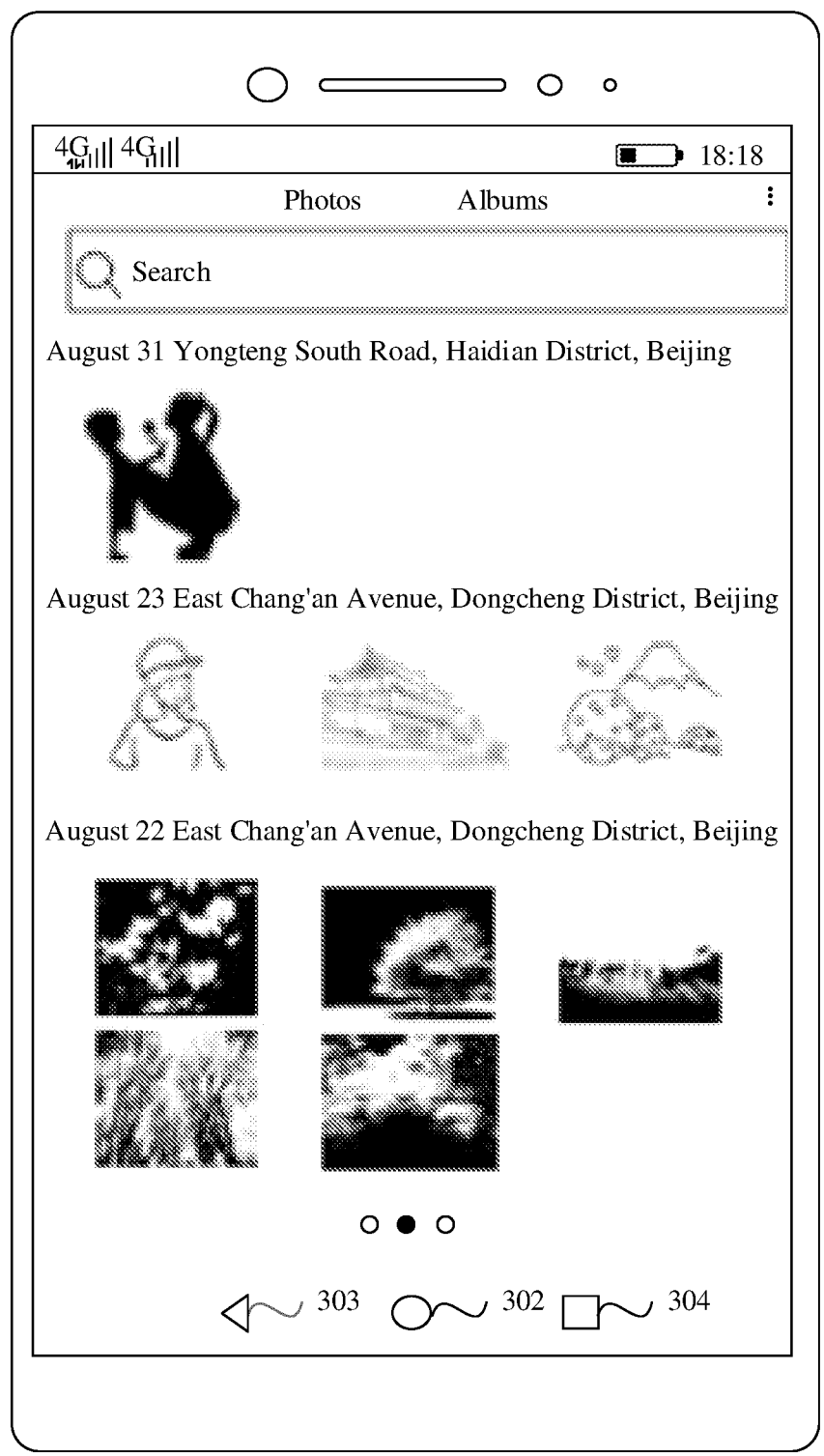
Figure 3C:
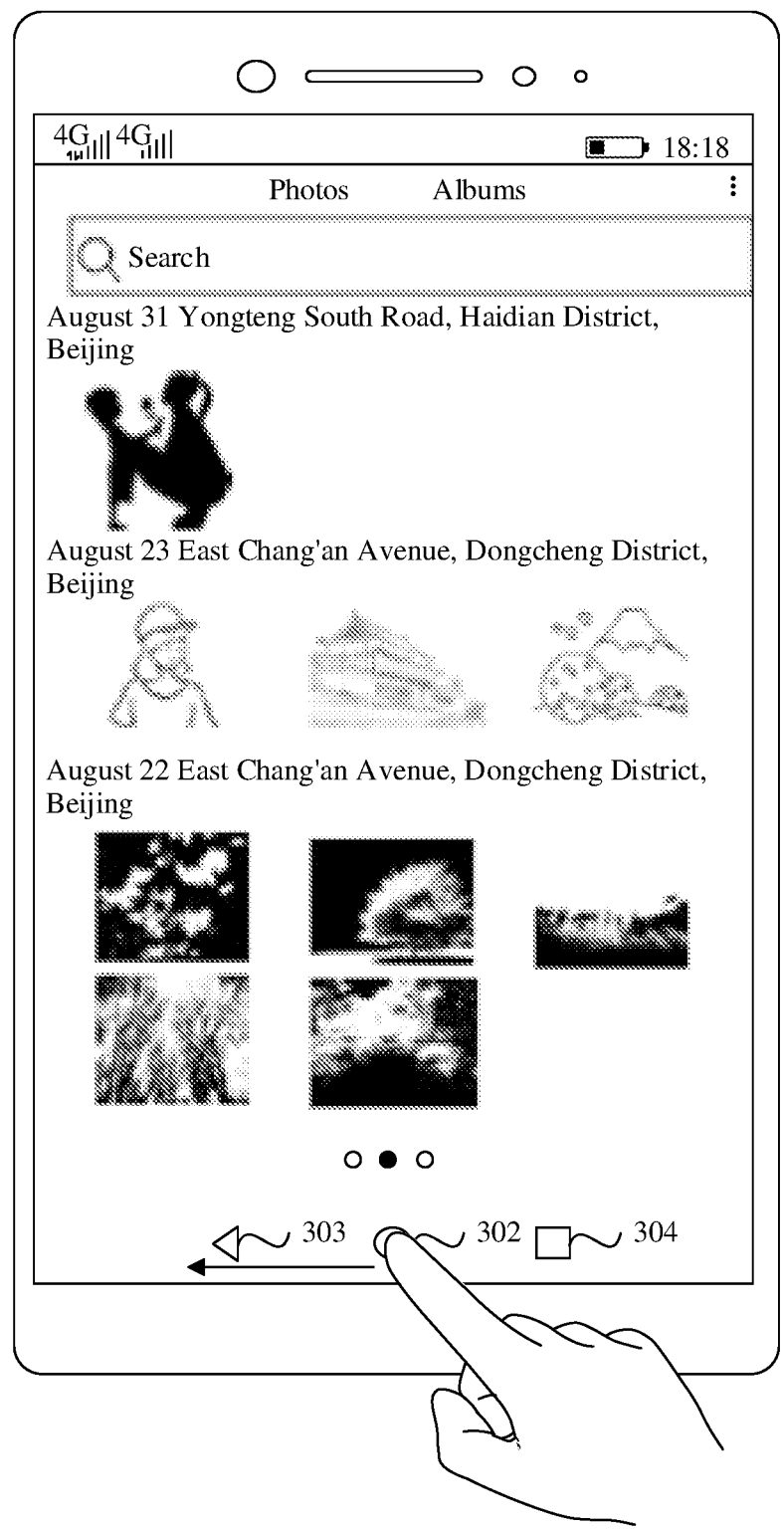
Figure 3D:
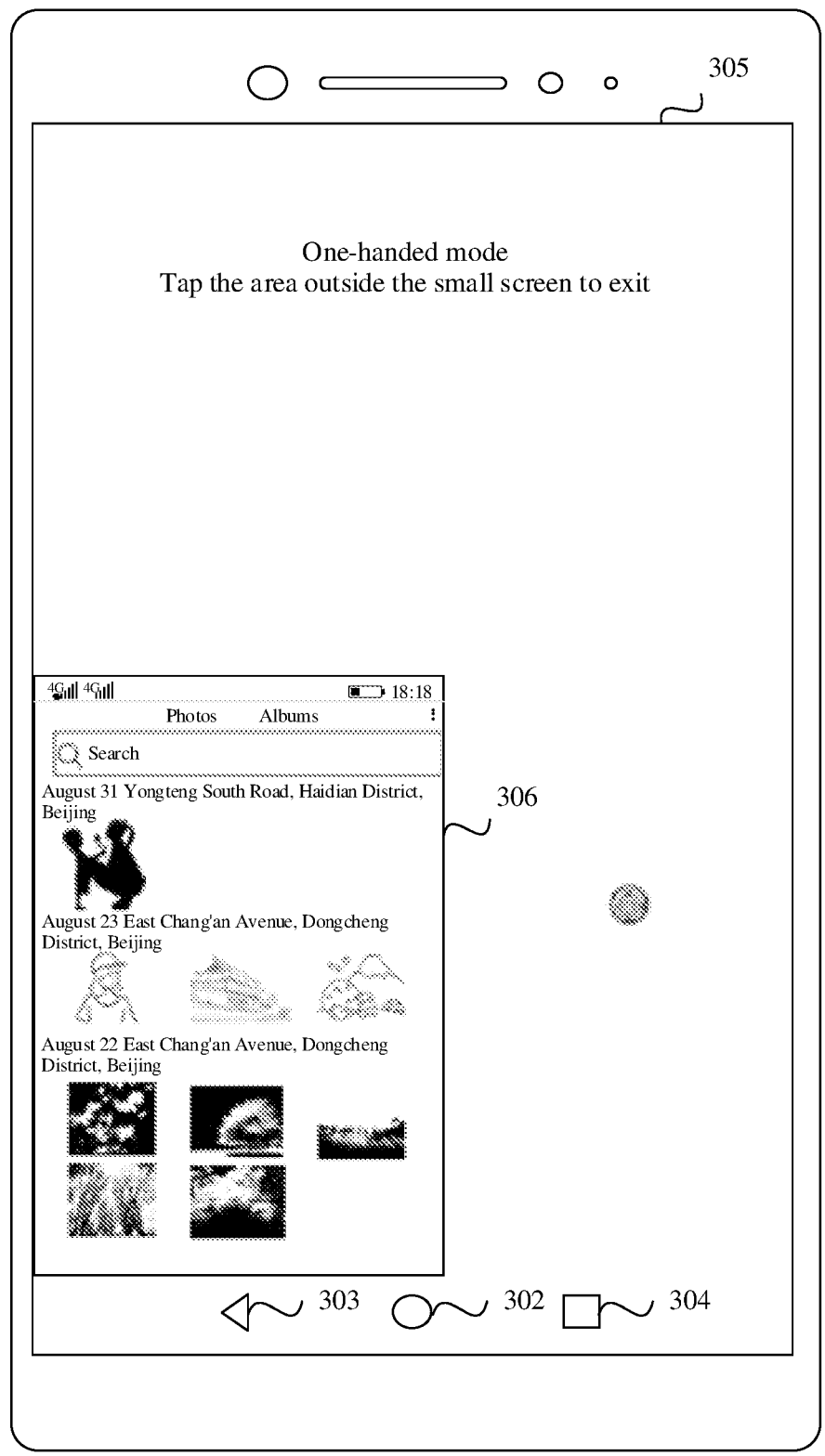

Refer to FIG. 3(a). The GUI is a home screen of the mobile phone. The home screen of the mobile phone includes three home screen pages, and each of the home screen pages includes one or more icons of one or more applications. A second home screen page is currently displayed on the home screen of the mobile phone, and the home screen page includes an icon of Alipay, an icon of Task card store, an icon of Weibo, an icon of Albums, an icon of WeChat, an icon of Cards, an icon of Settings, and an icon of Themes. As shown in FIG. 3(a), when the mobile phone detects that the user taps the icon 301 of Albums with a finger, a display interface of the application "Albums" is a GUI shown in FIG. 3(b). The display interface includes controls such as Photos, Albums, and Search. When the user enables a one-hand operation mode, in a GUI shown in FIG. 3(c), the user performs a slide operation from a control 302 to a control 303. After detecting the slide operation of the user from the control 302 to the control 303, the mobile phone may display a GUI shown in FIG. 3(d). The mobile phone may adjust an interface 305 displayed by the mobile phone to an interface 306 that is displayed by the mobile phone and that is set during a one-hand operation, and the interface currently displayed by the mobile phone occupies a lower left part of the screen of the mobile phone.

FIG. 4(a) to FIG. 4(d) show another group of graphical user interfaces (graphical user interfaces, GUIs) of a mobile phone. FIG. 4(a) to FIG. 4(d) show a process in which a GUI changes when a user opens an application and performs a one-hand operation.

Figure 4A:
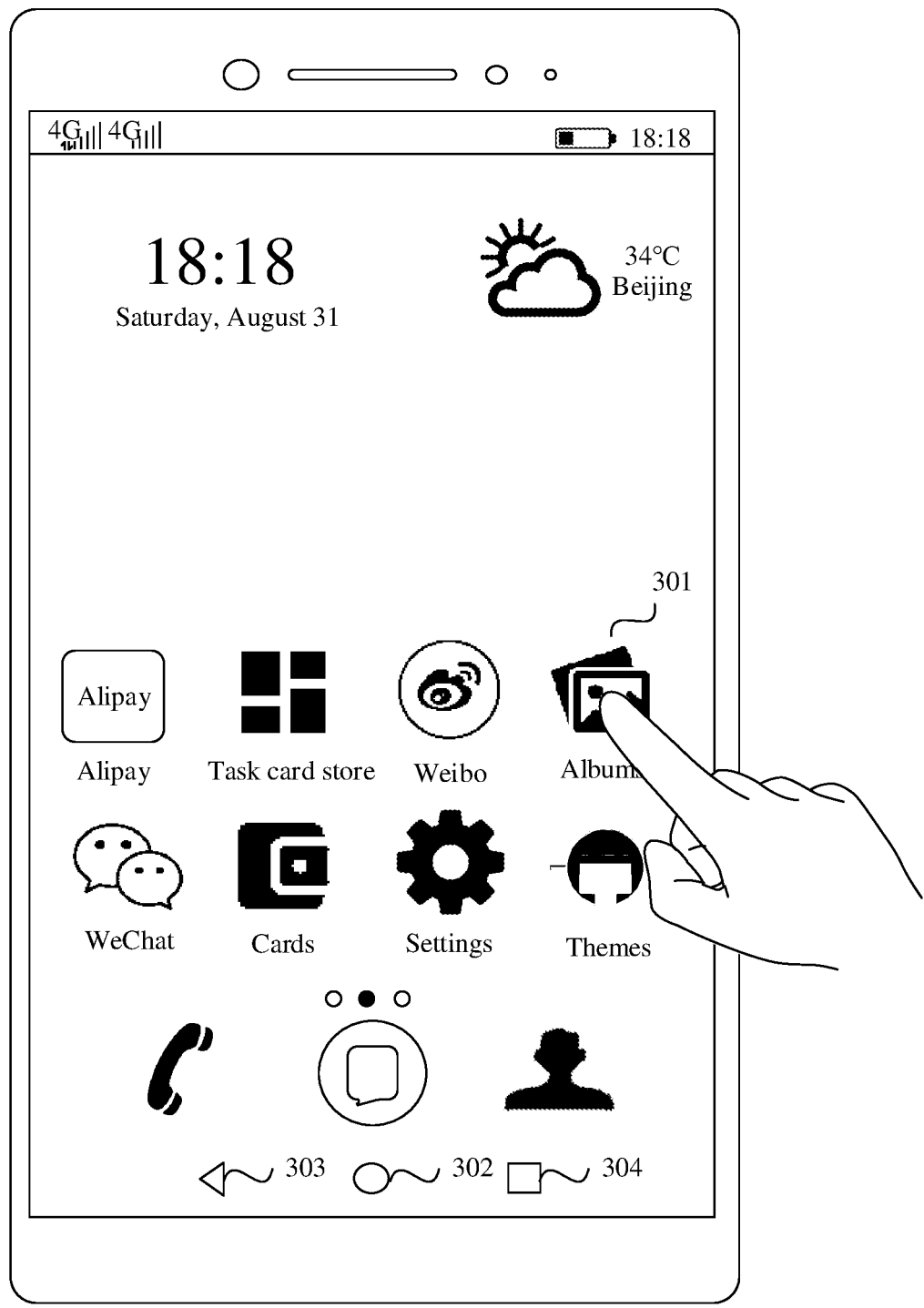
FIG. 4(a) to FIG. 4(d) are a schematic diagram of another group of GUIs.
Figure 4B:
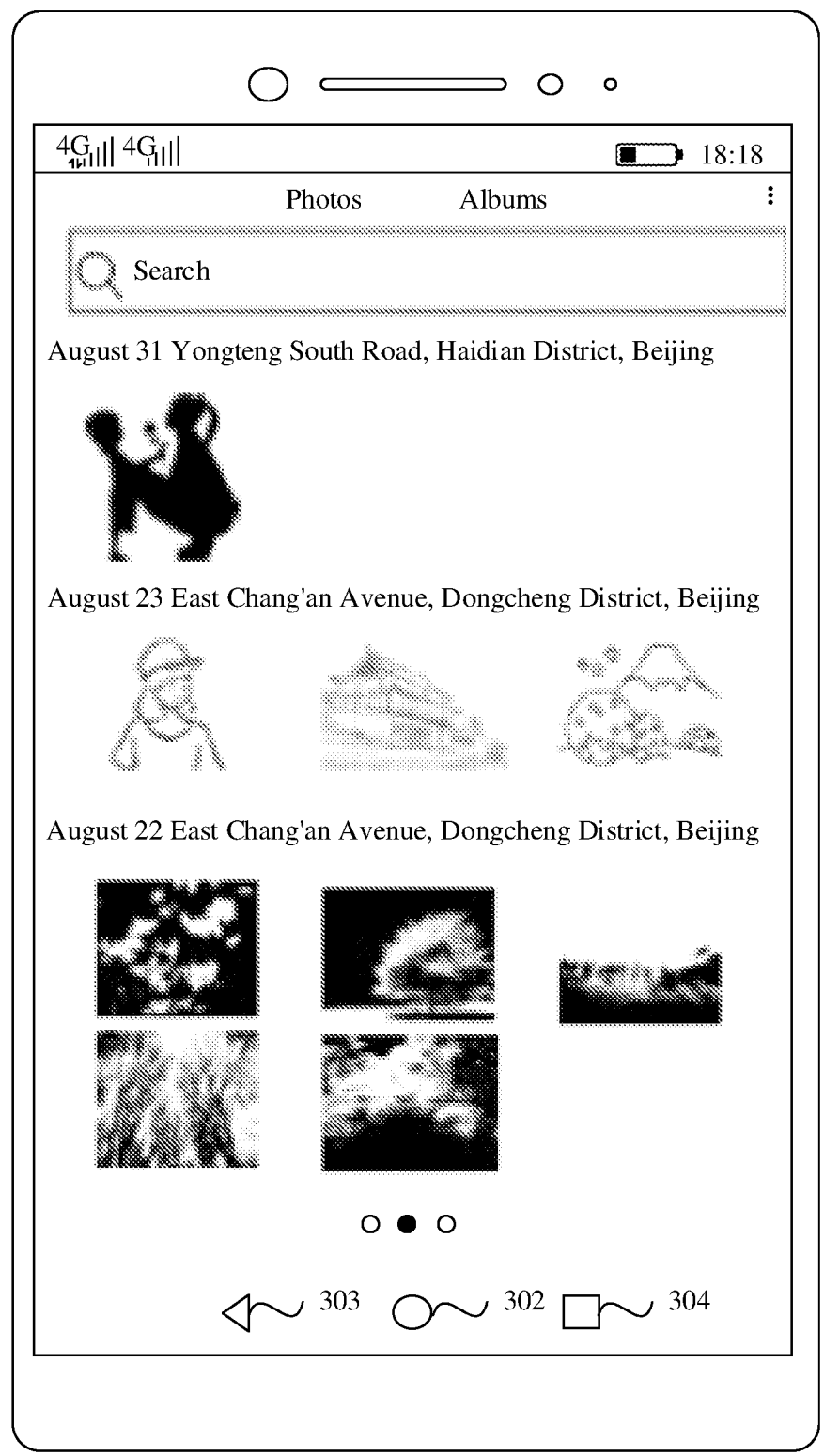
Figure 4C:
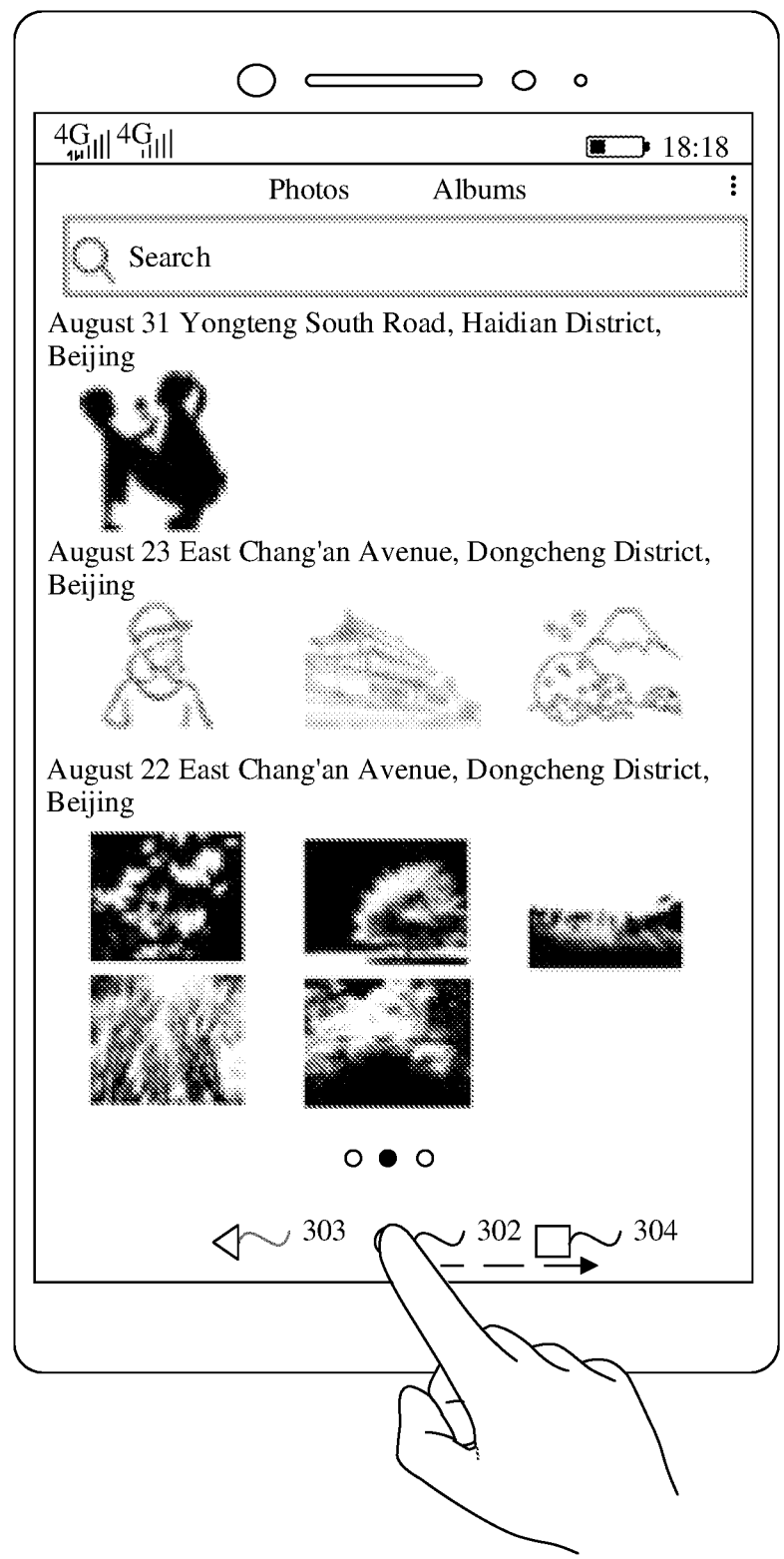
Figure 4D:
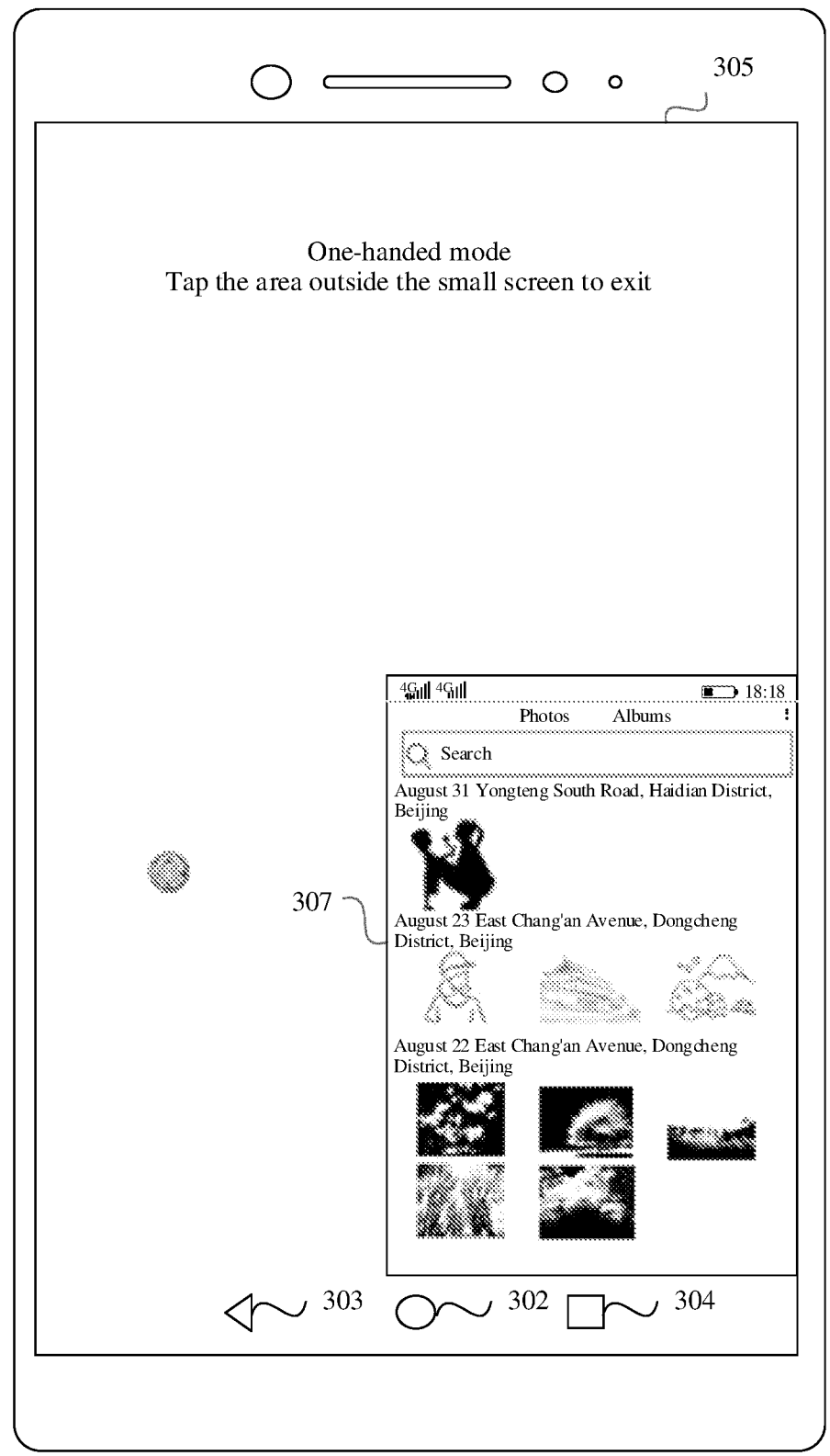

Refer to FIG. 4(a). The GUI is a home screen of the mobile phone. The home screen of the mobile phone includes three home screen pages, and each of the home screen pages includes one or more icons of one or more applications. A second home screen page is currently displayed on the home screen of the mobile phone, and the home screen page includes an icon of Alipay, an icon of Task card store, an icon of Weibo, an icon of Albums, an icon of WeChat, an icon of Cards, an icon of Settings, and an icon of Themes. As shown in FIG. 4(a), when the mobile phone detects that the user taps the icon 301 of Albums with a finger, a display interface of the application "Albums" is a GUI shown in FIG. 4(b). The display interface includes controls such as Photos, Albums, and Search. When the user enables a one-hand operation mode, in a GUI shown in FIG. 4(c), the user performs a slide operation from a control 302 to a control 304. After detecting the slide operation of the user from the control 302 to the control 304, the mobile phone may display a GUI shown in FIG. 4(d). The mobile phone may adjust an interface 305 displayed by the mobile phone to an interface 307 that is displayed by the mobile phone and that is set during a one-hand operation, and the interface currently displayed by the mobile phone occupies a lower right part of the screen of the mobile phone.

For example, as shown in FIG. 3(a) to FIG. 3(d) and FIG. 4(a) to FIG. 4(d), the interface originally displayed by the mobile phone may be 6.2 inches, and the interface that is displayed by the mobile phone and that may be selected during a one-hand operation may be 4.5 inches, 4.0 inches, or 3.5 inches.

As shown in FIG. 3(a) to FIG. 3(d) and FIG. 4(a) to FIG. 4(d), when the user performs a one-hand operation, the interface displayed by the mobile phone is scaled down. Consequently, user experience on a large screen is poor.

FIG. 5(a) to FIG. 5(d) show another group of GUIs of a mobile phone. FIG. 5(a) to FIG. 5(d) show a process in which a GUI changes when a user opens an application and performs a one-hand operation.

Figure 5A:
FIG. 5(a) to FIG. 5(d) are a schematic diagram of still another group of GUIs.
Figure 5B:
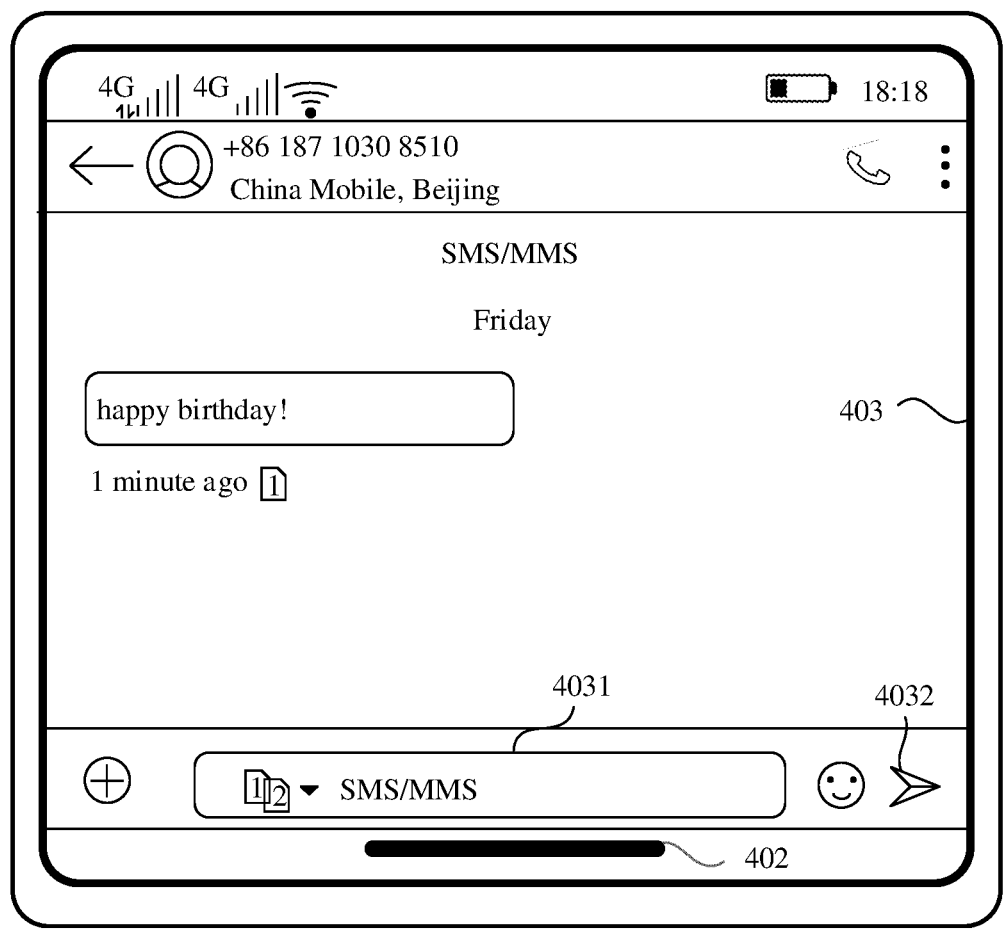
Figure 5C:
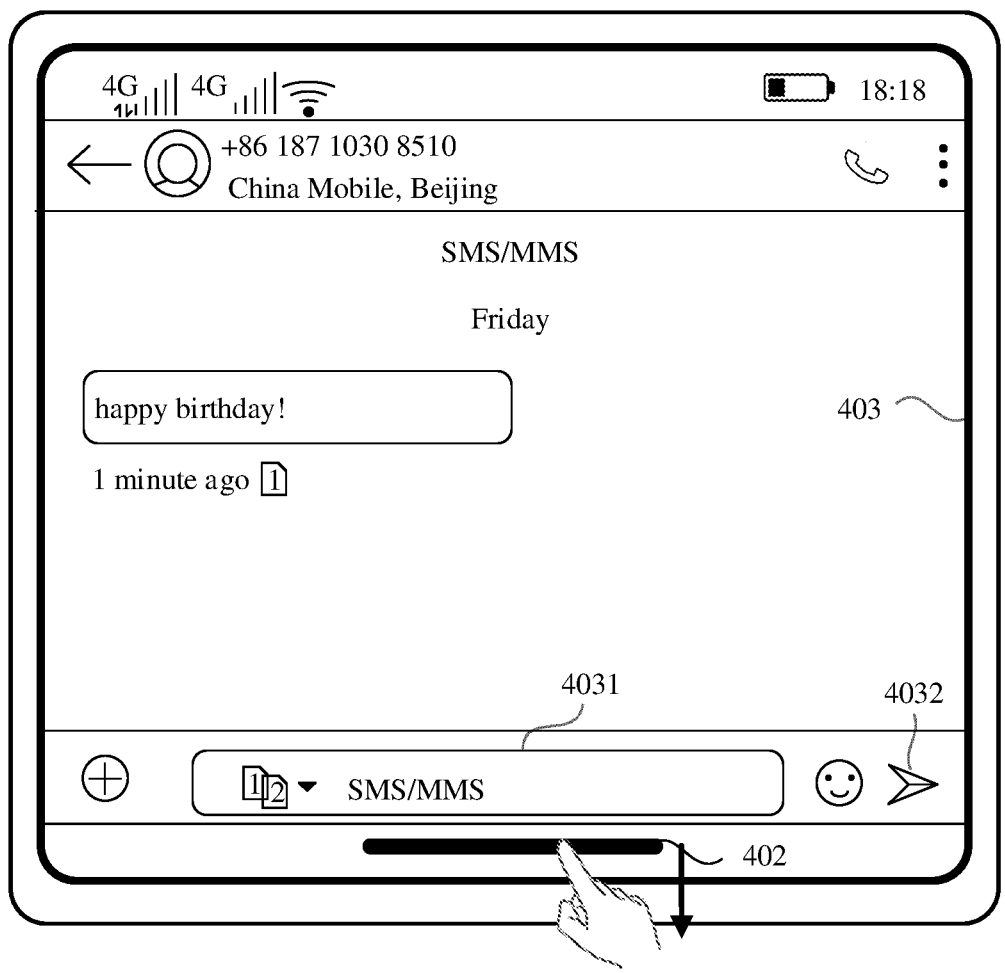
Figure 5D:
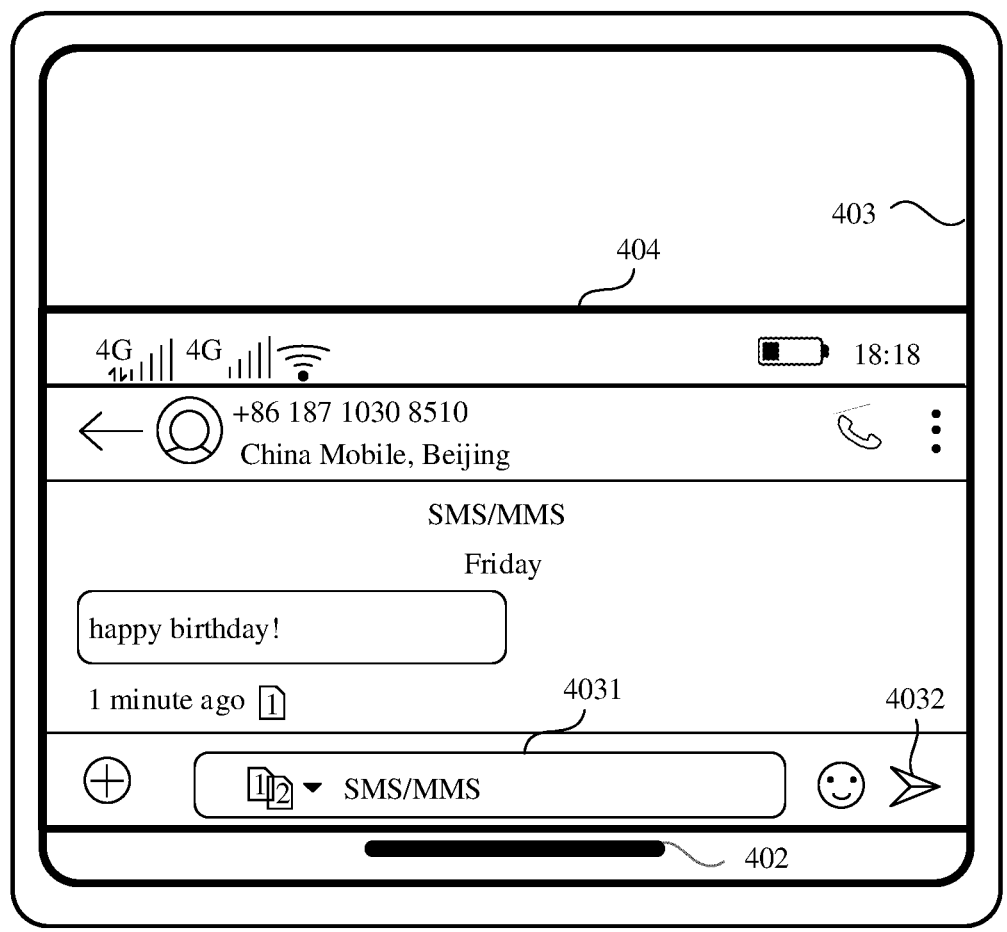

Refer to FIG. 5(a). The foldable electronic device is in an expanded state. In this case, an entire area of the electronic device is a home screen of the electronic device. The home screen of the electronic device includes three home screen pages, and each of the home screen pages includes one or more icons of one or more applications. A second home screen page is currently displayed on the home screen of the electronic device, and the home screen page includes an icon of Alipay, an icon of Task card store, an icon of Weibo, an icon of Albums, an icon of WeChat, an icon of Alarm, an icon of Settings, an icon of Themes, an icon of Phone, an icon of Messages, an icon of Contacts, and an icon of Camera. As shown in FIG. 5(a), when the electronic device detects that the user taps the icon 401 of Messages with a finger, a display interface of the application "Messages" is a GUI shown in FIG. 5(b). The display interface 403 includes a text input window 4031. The user may input to-be-replied information in the text input window 4031, tap a control 4032, and then send the replied information to a user whose mobile number is 18710308510. When the user enables a one-hand operation mode, in a GUI shown in FIG. 5(c), the user performs a slide down operation from a control 402. After detecting the slide down operation of the user from the control 402, the electronic device may display a GUI shown in FIG. 5(d). The electronic device may adjust the interface 403 displayed by the electronic device to an interface 404 that is displayed by the electronic device and that is set during a one-hand operation, and the interface currently displayed by the electronic device occupies a lower part of the screen of the electronic device.

FIG. 6(a) to FIG. 6(d) show another group of GUIs of a mobile phone. FIG. 6(a) to FIG. 6(d) show a process in which a GUI changes when a user opens an application and performs a one-hand operation.

Figure 6A:
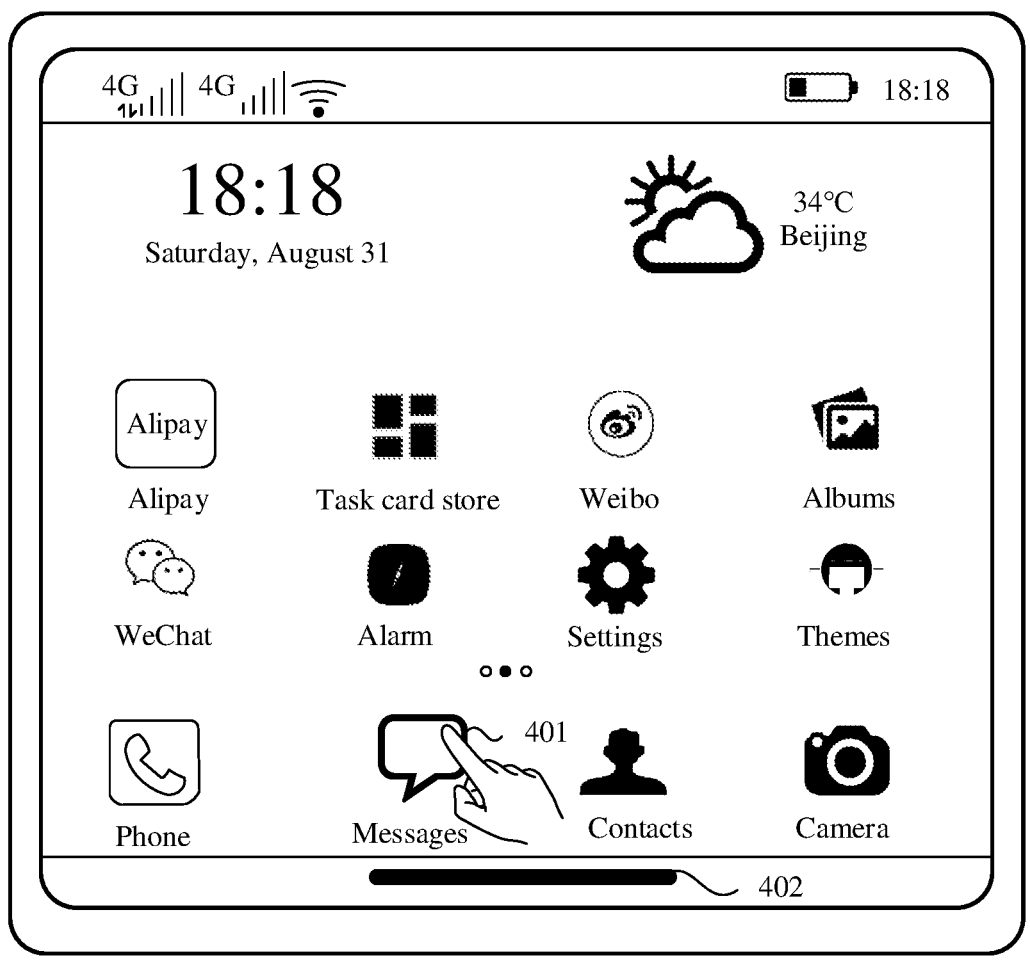
FIG. 6(a) to FIG. 6(d) are a schematic diagram of still another group of GUIs.
Figure 6B:
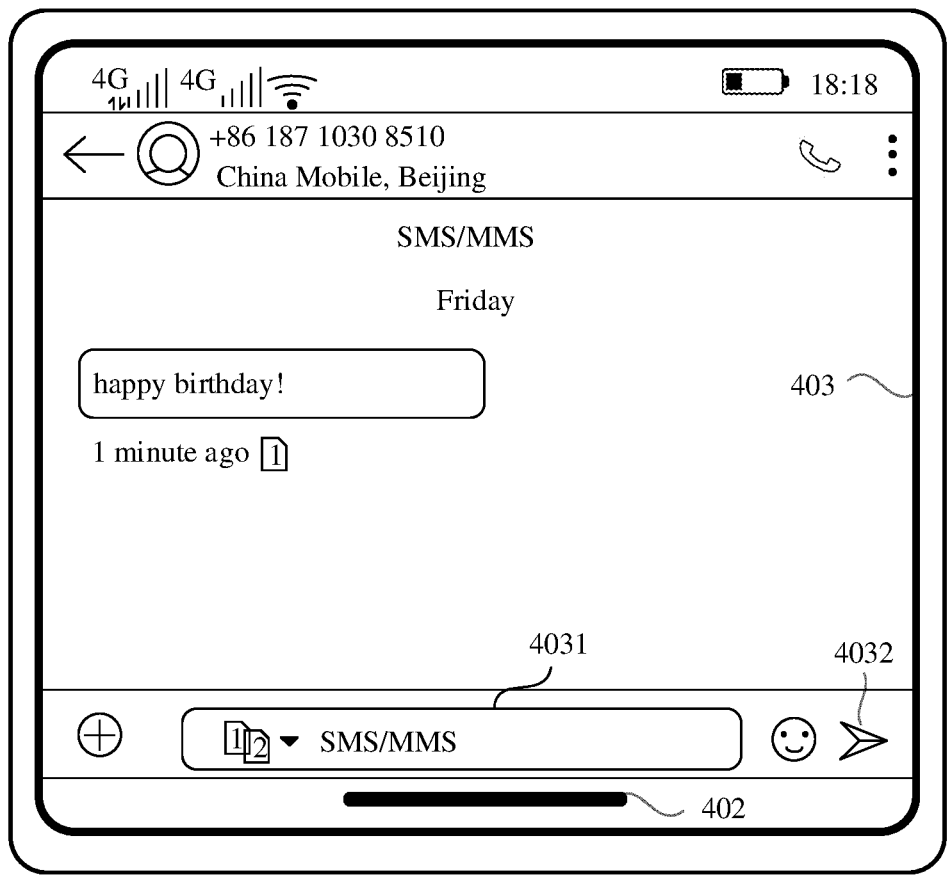
Figure 6C:
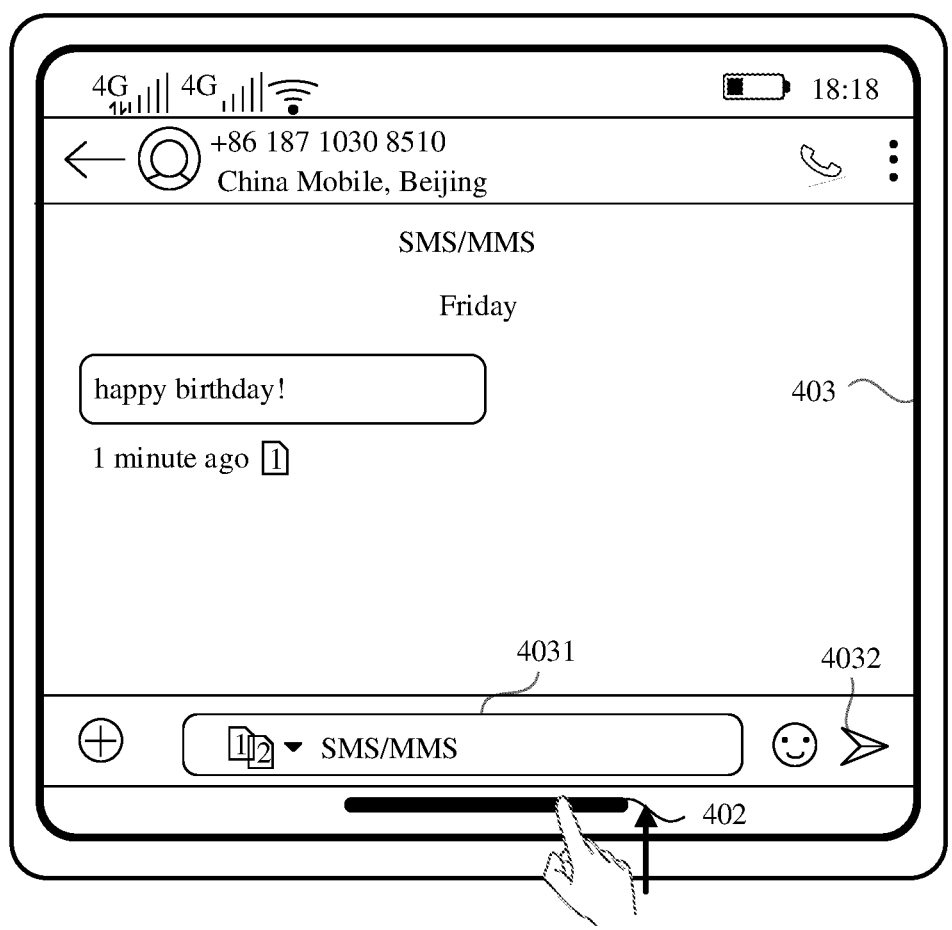
Figure 6D:
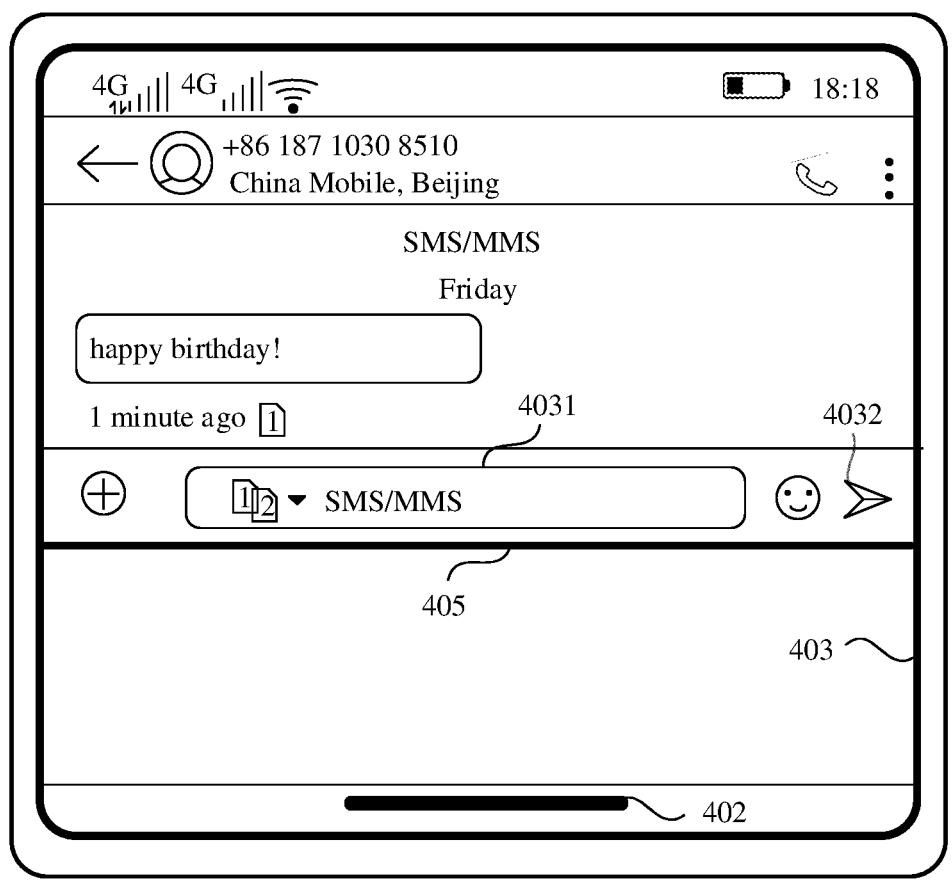

Refer to FIG. 6(a). The foldable electronic device is in an expanded state. In this case, an entire area of the electronic device is a home screen of the electronic device. The home screen of the electronic device includes three home screen pages, and each of the home screen pages includes one or more icons of one or more applications. A second home screen page is currently displayed on the home screen of the electronic device, and the home screen page includes an icon of Alipay, an icon of Task card store, an icon of Weibo, an icon of Albums, an icon of WeChat, an icon of Alarm, an icon of Settings, an icon of Themes, an icon of Phone, an icon of Messages, an icon of Contacts, and an icon of Camera. As shown in FIG. 6(a), when the electronic device detects that the user taps the icon 401 of Messages with a finger, a display interface of the application "Messages" is a GUI shown in FIG. 6(b). The display interface 403 includes a text input window 4031. The user may input to-be-replied information in the text input window 4031, tap a control 4032, and then send the replied information to a user whose mobile number is 18710308510. When the user enables a one-hand operation mode, in a GUI shown in FIG. 6(c), the user performs a slide up operation from a control 402. After detecting the slide up operation of the user from the control 402, the electronic device may display a GUI shown in FIG. 6(d). The electronic device may adjust the interface 403 displayed by the electronic device to an interface 405 that is displayed by the electronic device and that is set during a one-hand operation, and the interface currently displayed by the electronic device occupies an upper part of the screen of the electronic device.

For example, as shown in FIG. 5(a) to FIG. 5(d) and FIG. 6(a) to FIG. 6(d), the interface originally displayed by the electronic device may be 8 inches, and the interface that is displayed by the electronic device and that may be selected during a one-hand operation may be 6 inches, 5.5 inches, or 5 inches.

As shown in FIG. 5(a) to FIG. 5(d) and FIG. 6(a) to FIG. 6(d), when the user performs a one-hand operation, because a width of the screen of the electronic device is large, even if the user performs the one-hand operation, it is inconvenient to perform an operation on the other end of the electronic device held by the user. In addition, the interface displayed by the electronic device is also scaled down. Consequently, user experience on a large screen is poor.

Therefore, an operation method that can improve user experience needs to be provided as soon as possible.

For ease of understanding, a mobile phone having the structures shown in FIG. 1 and FIG. 2 is used as an example in the following embodiments of this application, and the operation method provided in the embodiments of this application is specifically described with reference to the accompanying drawings.

FIG. 7(a) to FIG. 7(h) show GUIs of a mobile phone. FIG. 7(a) to FIG. 7(h) show a process in which a display interface on a home screen of the mobile phone changes when a user performs an operation on the mobile phone.

Figure 7A:
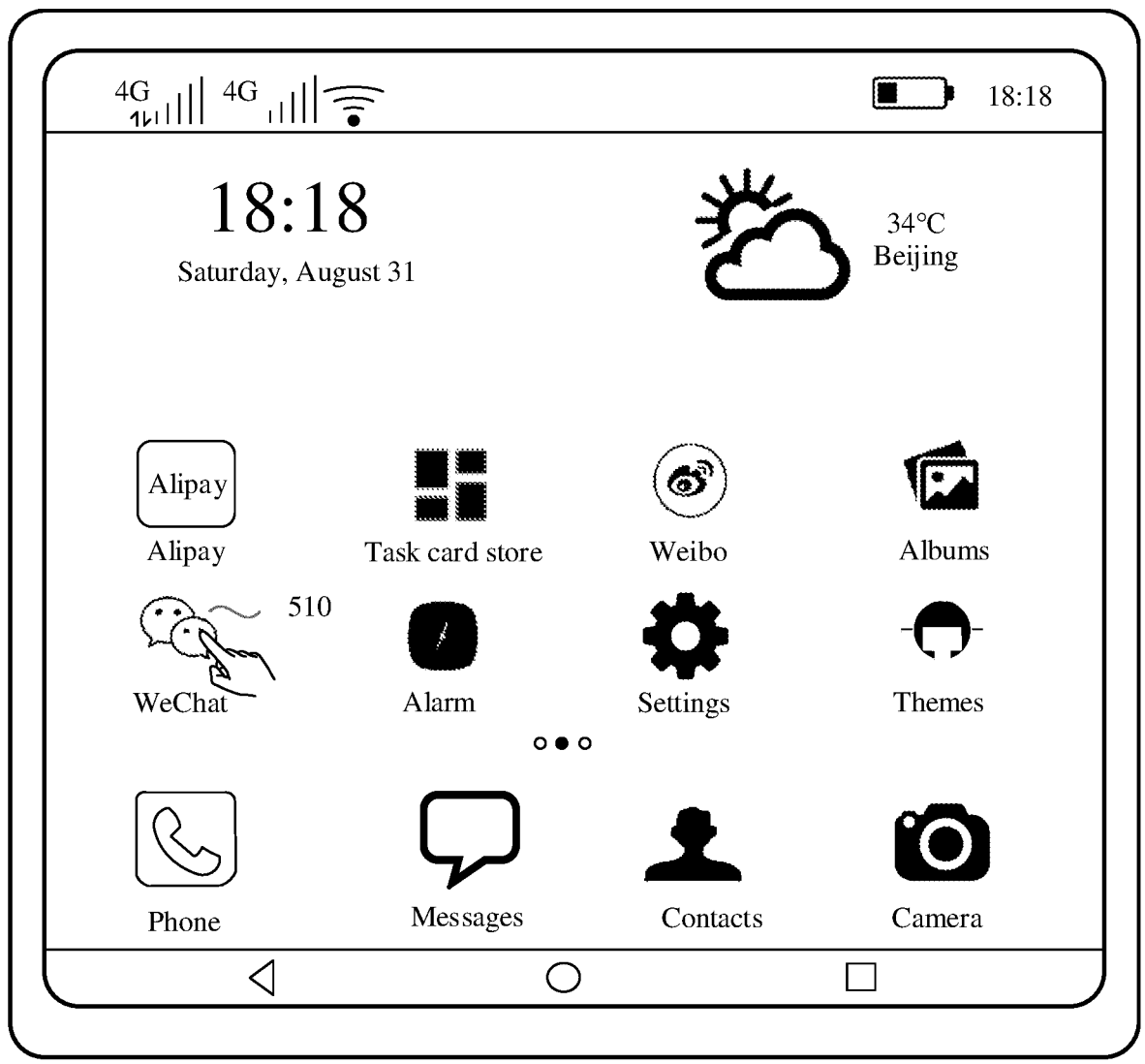
FIG. 7(a) to FIG. 7(h) are a schematic diagram of a group of GUIs according to an embodiment of this application.
Figure 7B:
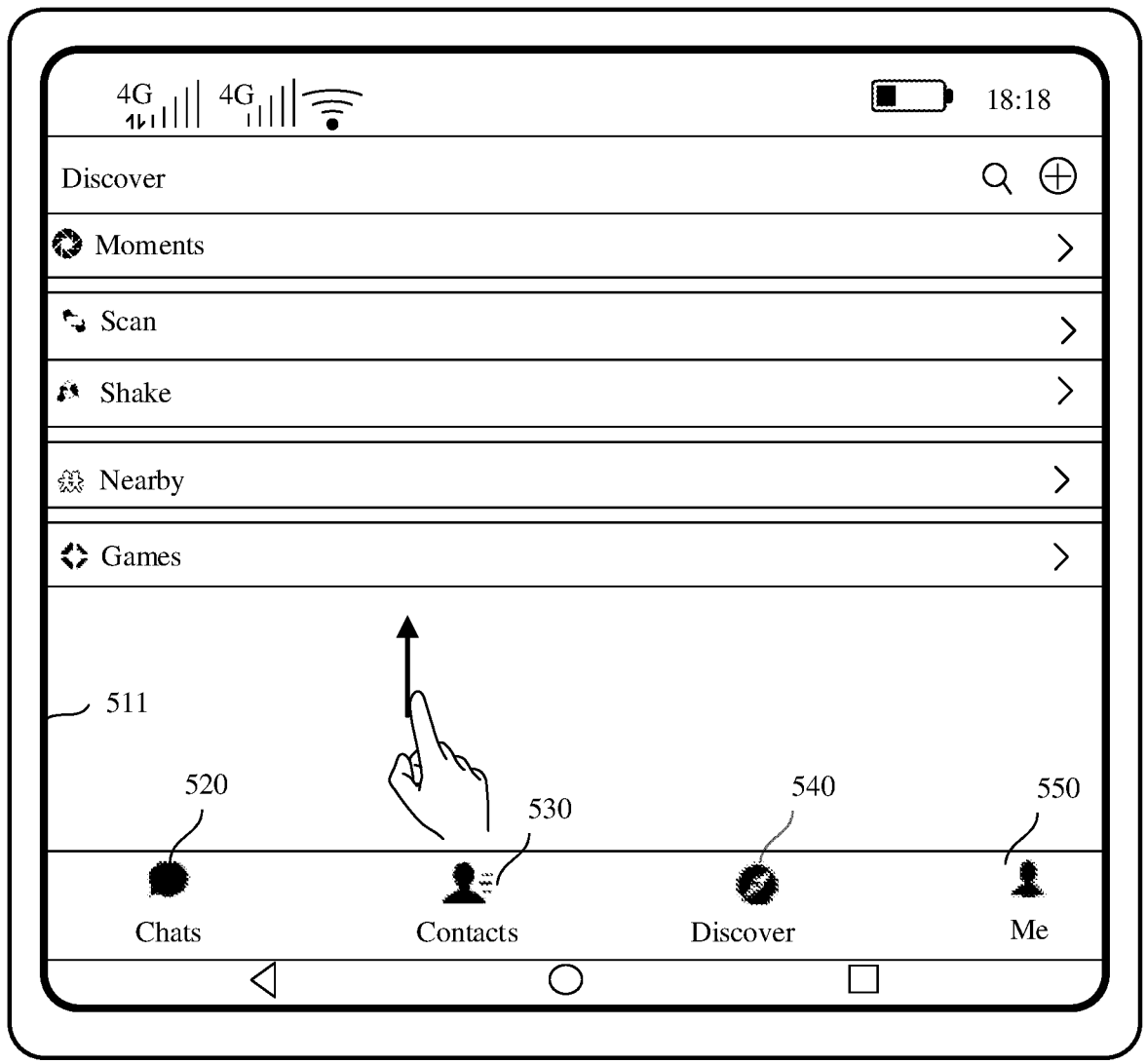
Figure 7C:
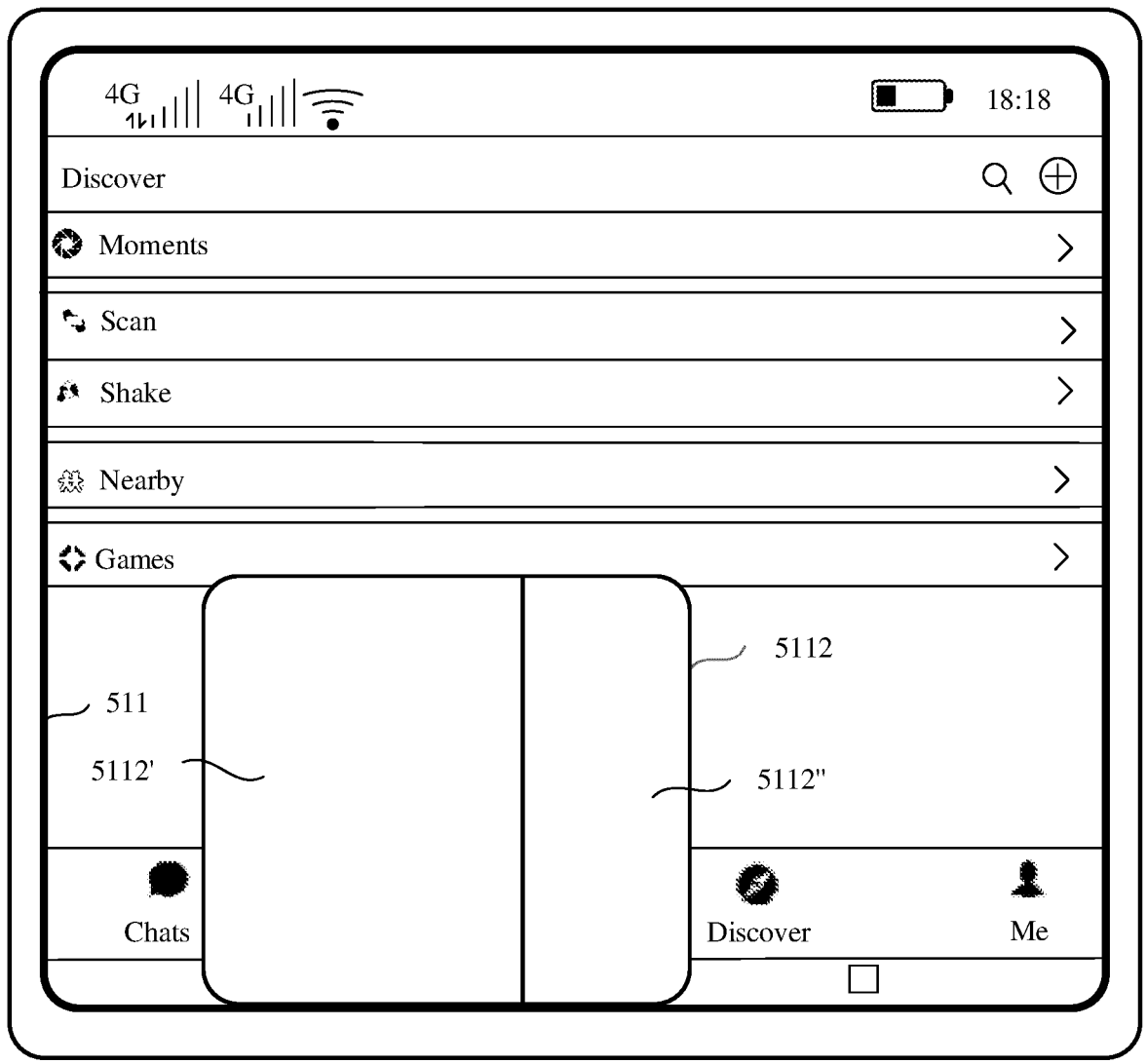
Figure 7D:
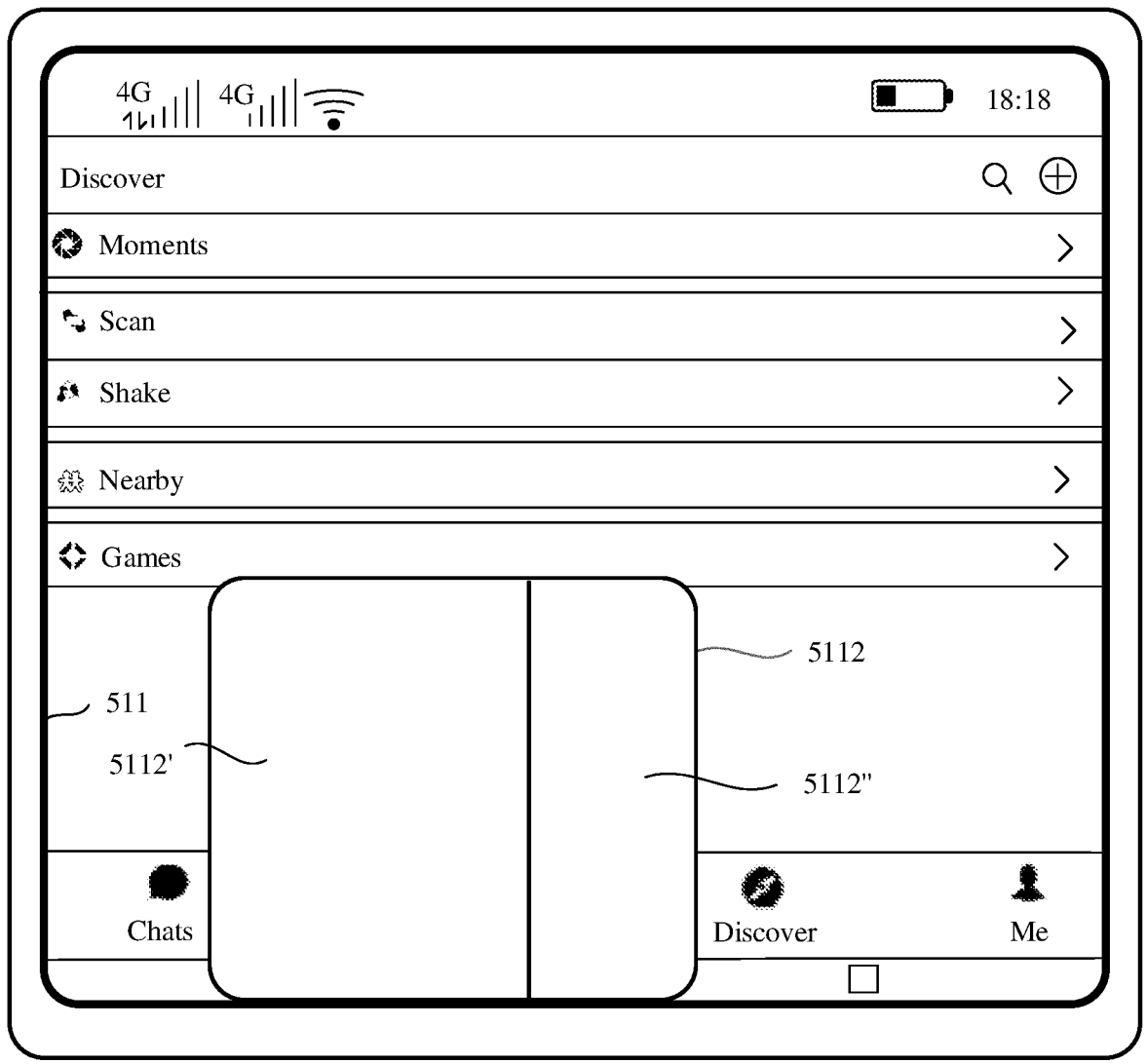
Figure 7E:
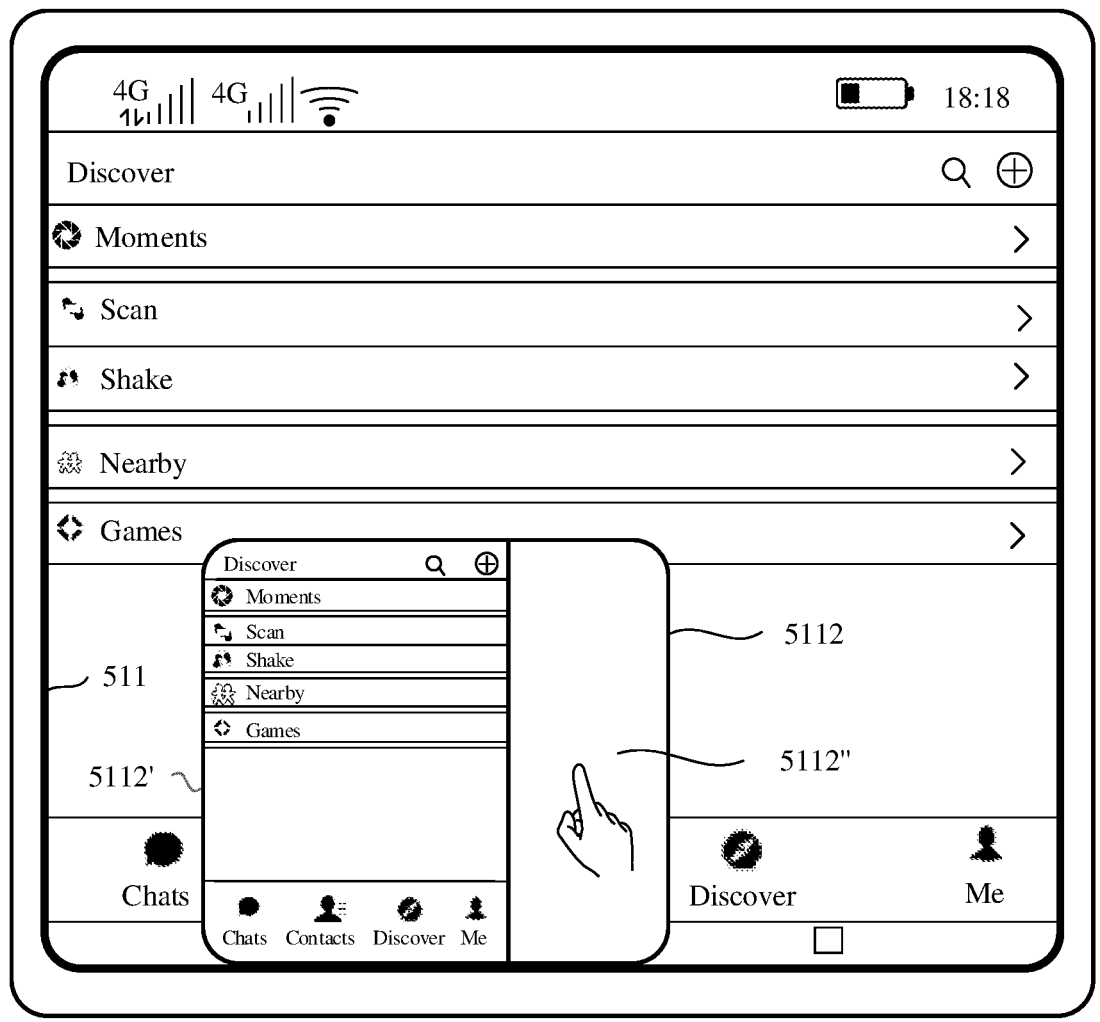
Figure 7F:
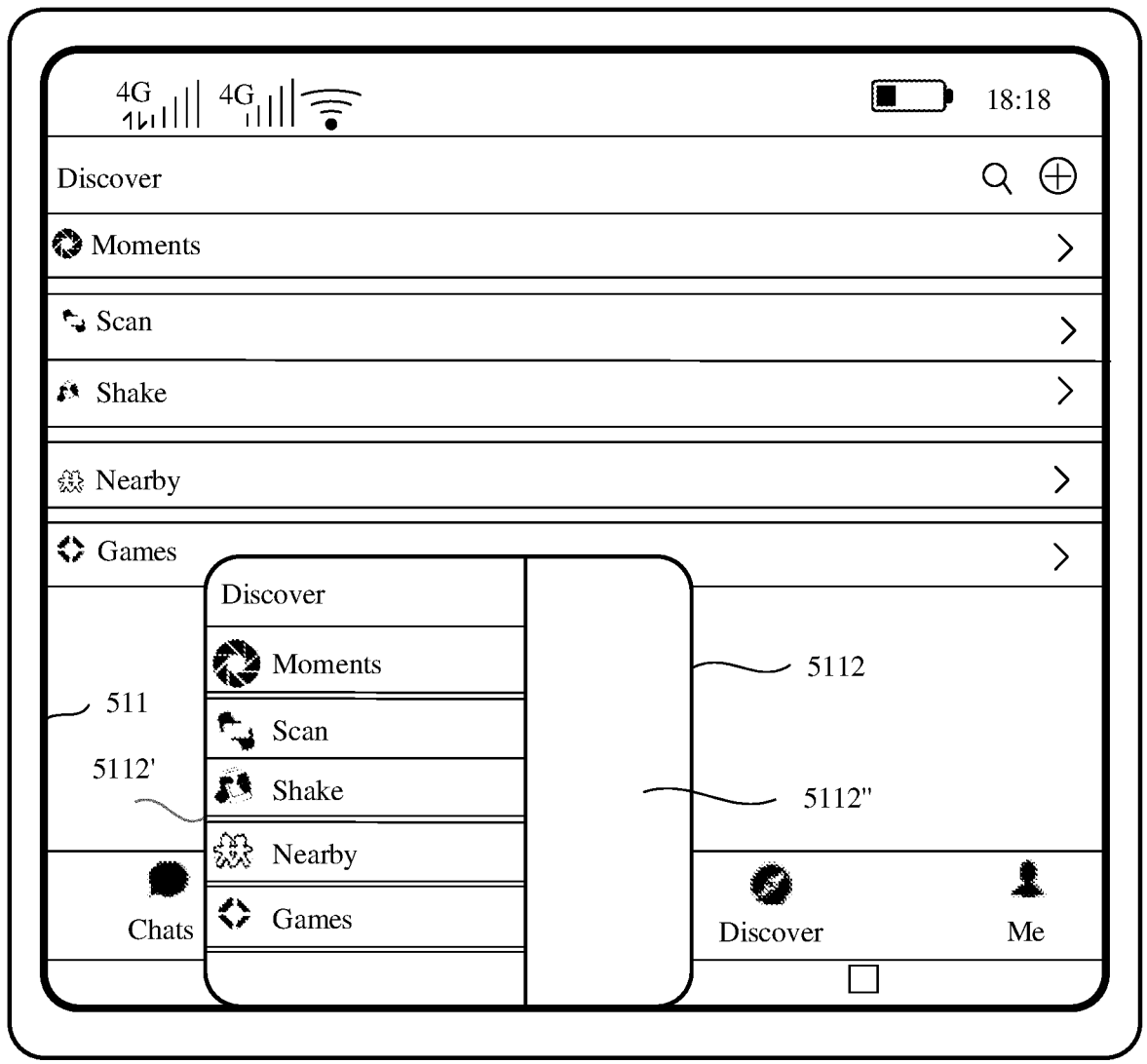
Figure 7G:
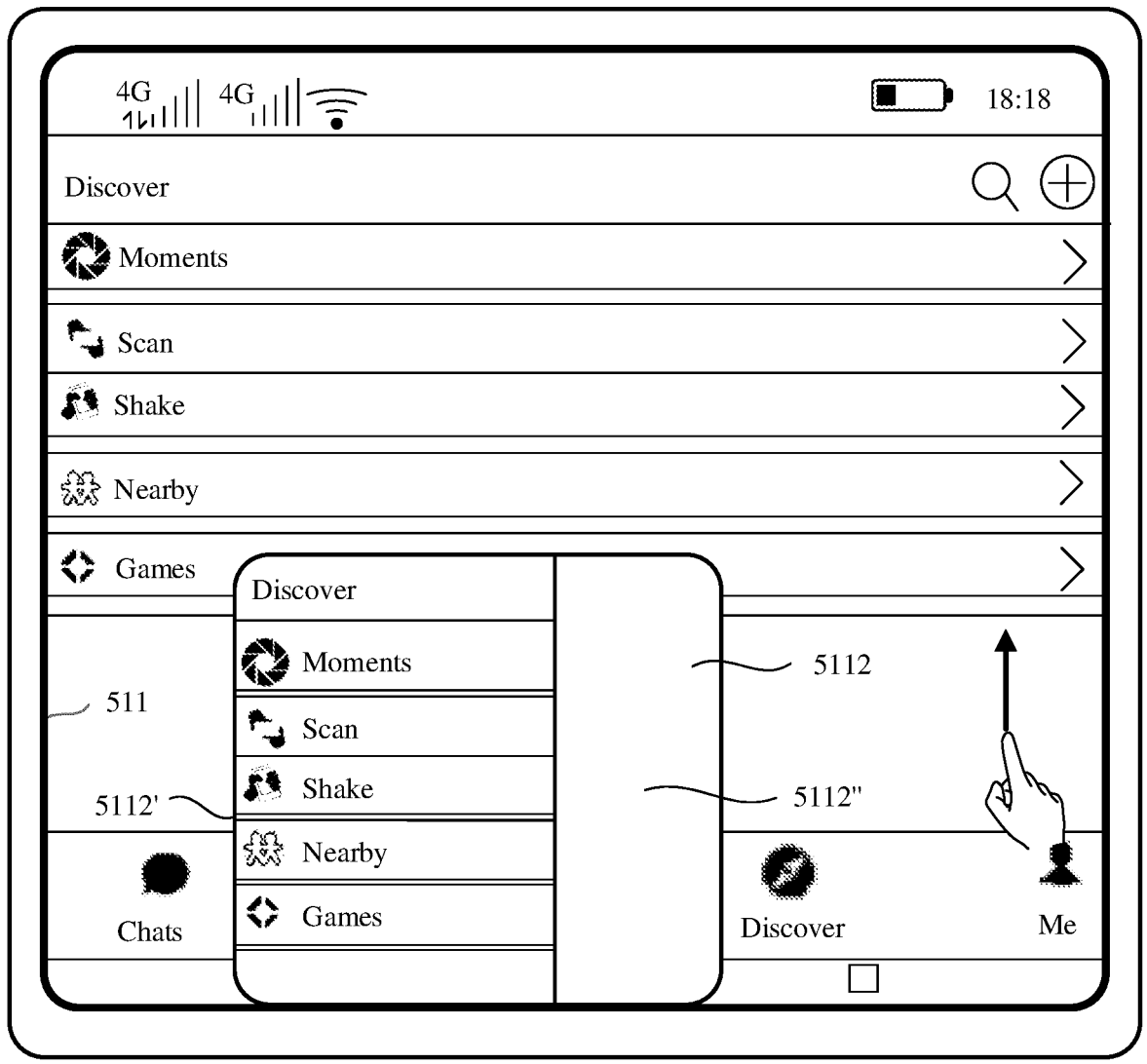
Figure 7H:
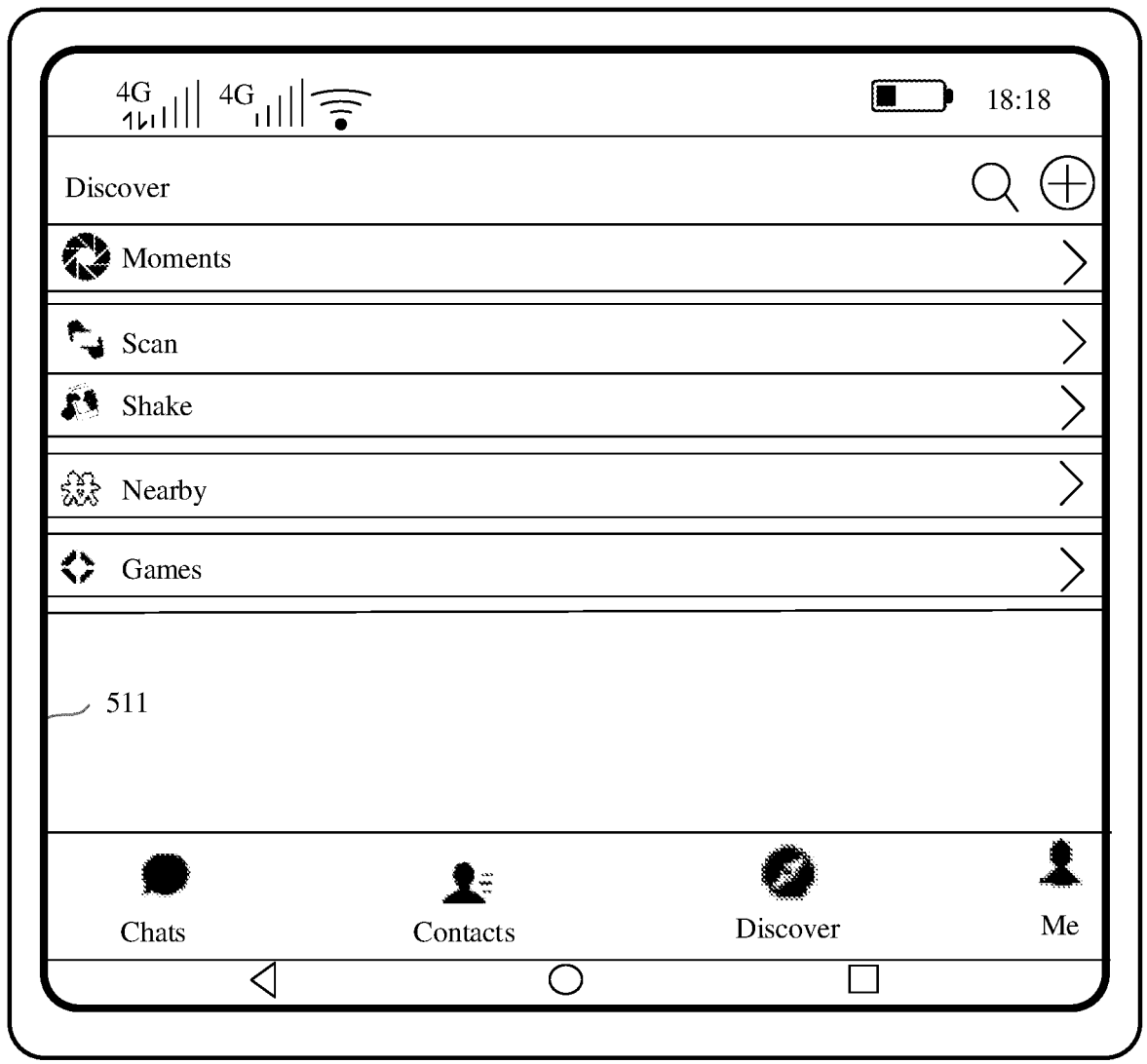

Refer to FIG. 7(a). The foldable electronic device is in an expanded state. In this case, an entire area of the electronic device is a home screen of the electronic device. The home screen of the electronic device includes three home screen pages, and each of the home screen pages includes one or more icons of one or more applications. A second home screen page is currently displayed on the home screen of the electronic device, and the home screen page includes an icon of Alipay, an icon of Task card store, an icon of Weibo, an icon of Albums, an icon of WeChat, an icon of Alarm, an icon of Settings, an icon of Themes, an icon of Phone, an icon of Messages, an icon of Contacts, and an icon of Camera. As shown in FIG. 7(a), when the electronic device detects that the user taps the icon 510 of WeChat with a finger, a display interface of the application "WeChat" is a GUI shown in FIG. 7(b). The display interface 511 includes Chats 520, Contacts 530, Discover 540, and Me 550. As shown in FIG. 7(b), the display interface is an interface displayed after an operation that the user taps Discover 540. After detecting an operation that the user slides upward at any location in a blank area in the display interface 511, the electronic device may display a GUI shown in FIG. 7(c). The electronic device displays another display window 5112. An area occupied by the display window 5112 is less than an area occupied by the display interface 511. The display window 5112 may be displayed along four boundary lines of the display interface 511. During the operation that the user slides upward at the any location in the blank area in the display interface 511, a boundary line with a shortest distance from the action in the four boundary lines of the display interface 511 is a boundary line on which the display window 5112 abuts. The display window 5112 may also be displayed at any location in the display interface 511. When the user touches and holds and drags the display window 5112, the user may adjust a location of the display window 5112 in the display interface 511, so that the user conveniently performs a specific operation on content displayed in the display window 5112. The display window 5112 includes two areas: a first area 5112' and a second area 5112". In a GUI shown in FIG. 7(d), the user taps any location in the second area 5112". After the electronic device detects an operation that the user taps the second area 5112", the first area 5112' may display a GUI shown in FIG. 7(e). Content displayed in the first area 5112' is content displayed in the display interface 511, that is, an interface currently displayed by the application "WeChat". In this case, it may be understood that the content displayed in the display interface 511 is mirrored to the first area 5112', to be specific, the content displayed in the first area 5112' is the same as the content displayed in the display interface 511. A unique difference lies in that a size of the display interface 511 is different from a size of the first area 5112'. After the electronic device detects an operation that the user double-taps the second area 5112", the first area 5112' may display a GUI shown in FIG. 7(f), that is, the content displayed in the first area 5112' shown in FIG. 7(e) is scaled up. In this case, the content displayed in the display interface 511 is synchronized with the content displayed in the first area 5112' in FIG. 7(f). To be specific, it may be understood that the content displayed in the first area 5112' in FIG. 7(f) is mirrored to the display interface 511 shown in FIG. 7(g). In this case, after detecting again an operation that the user slides upward at any location in the blank area in the display interface 511, the electronic device may display a GUI shown in FIG. 7(h), that is, hide the display window 5112.

FIG. 8(a) to FIG. 8(h) show GUIs of a mobile phone. FIG. 8(a) to FIG. 8(h) show a process in which a display interface on a home screen of the mobile phone changes when a user performs an operation on the mobile phone.

Figure 8A:
FIG. 8(a) to FIG. 8(h) are a schematic diagram of another group of GUIs according to an embodiment of this application.
Figure 8B:
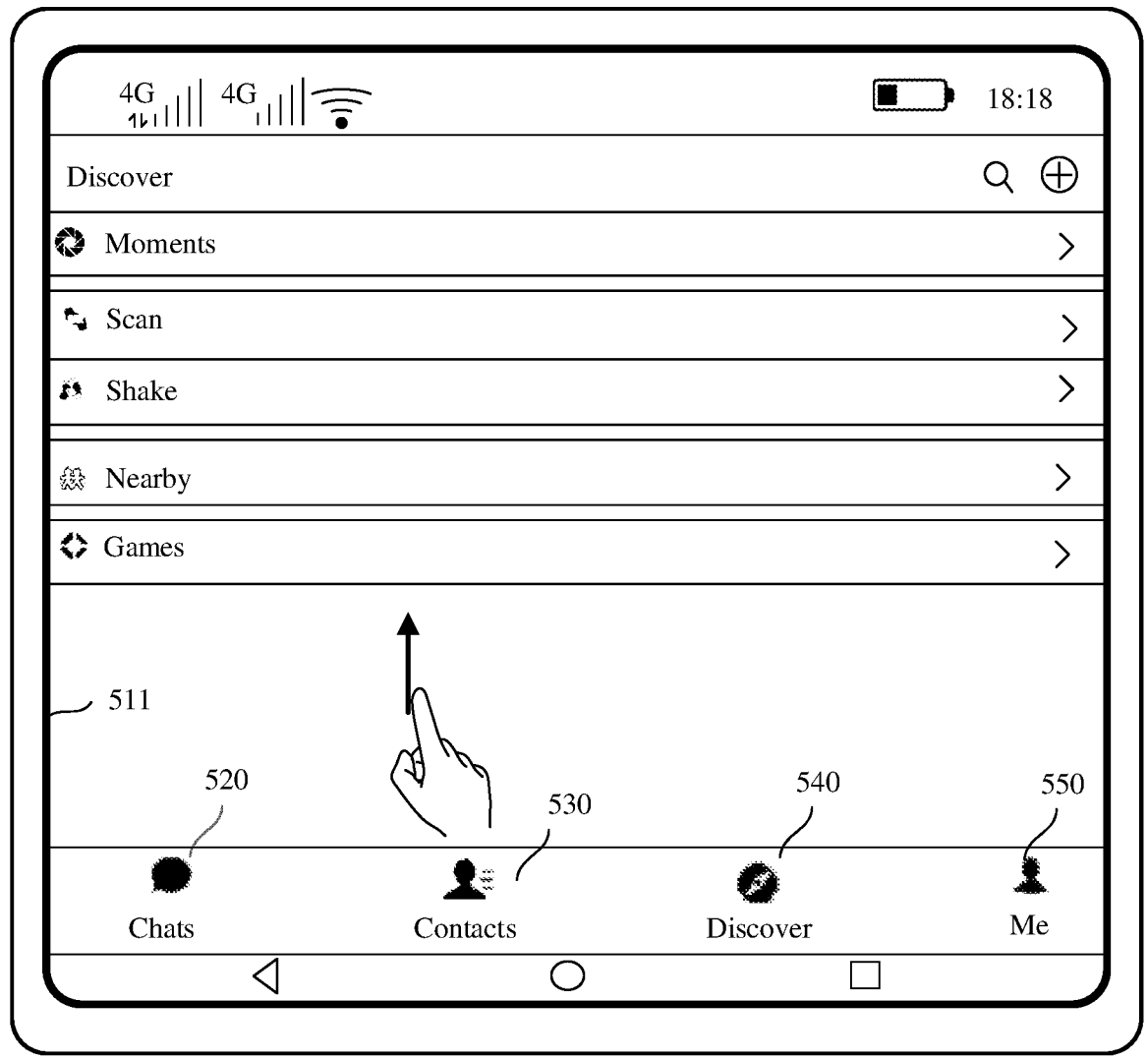
Figure 8C:
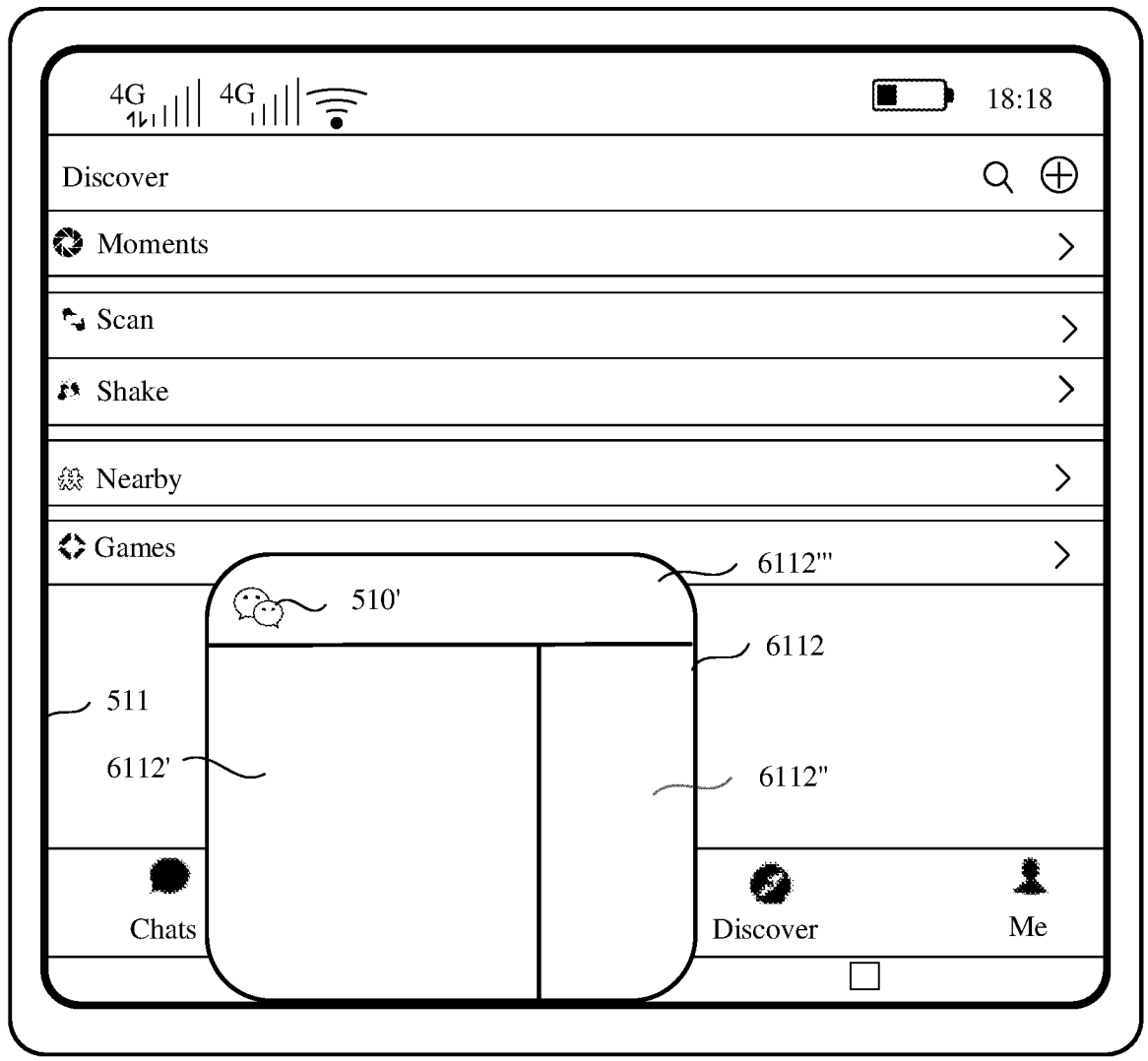
Figure 8D:
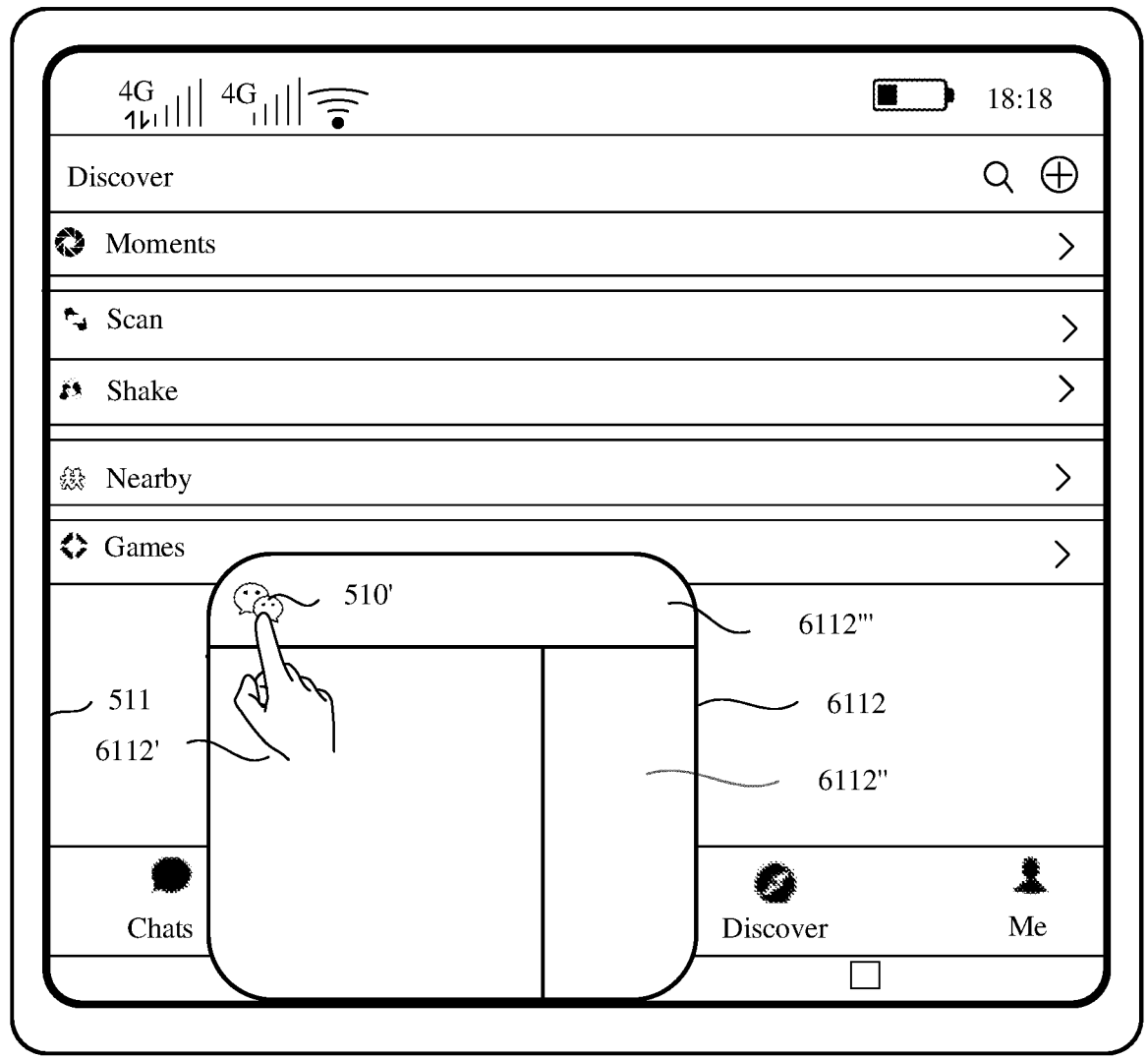
Figure 8E:
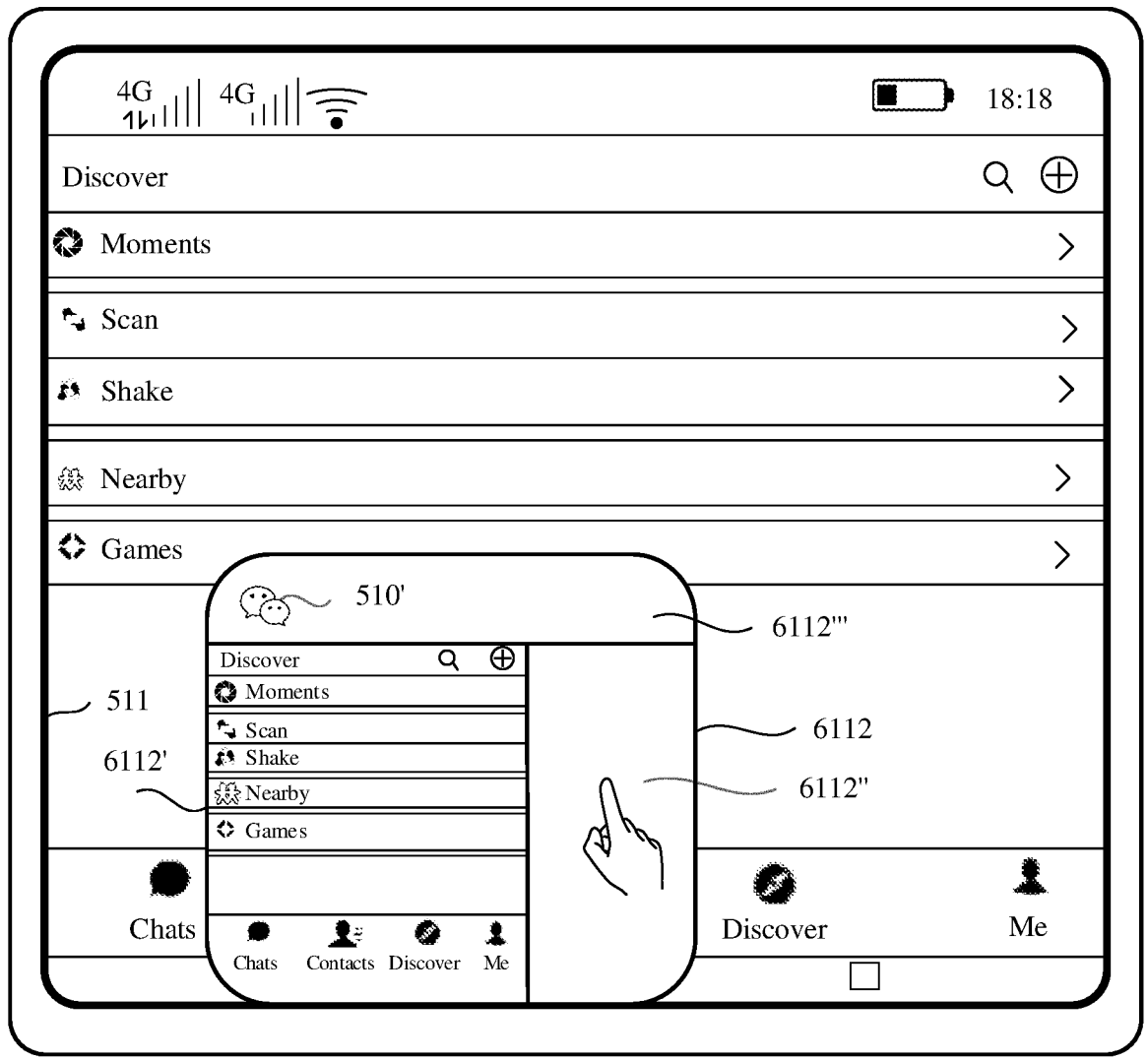
Figure 8F:
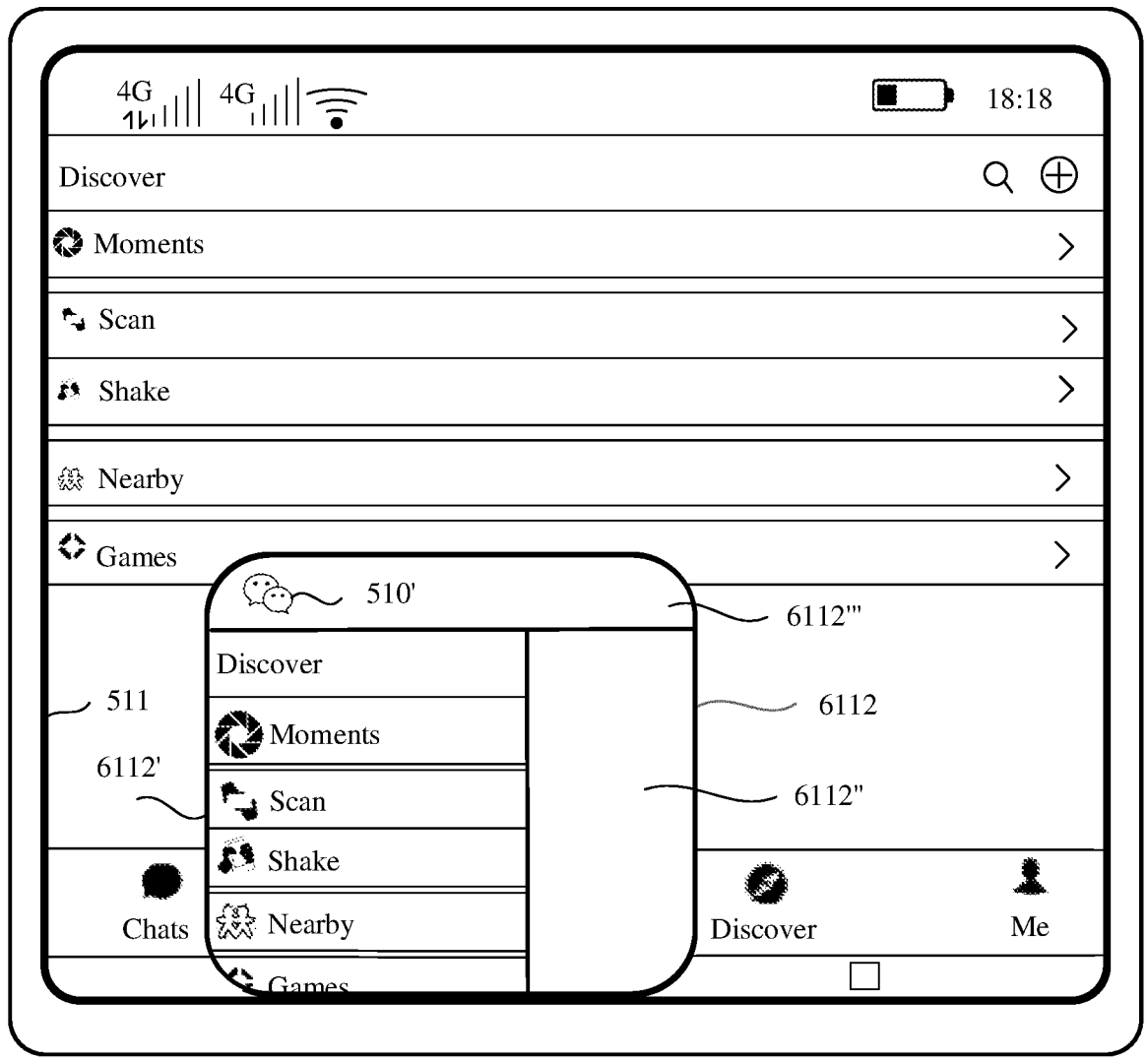
Figure 8G:
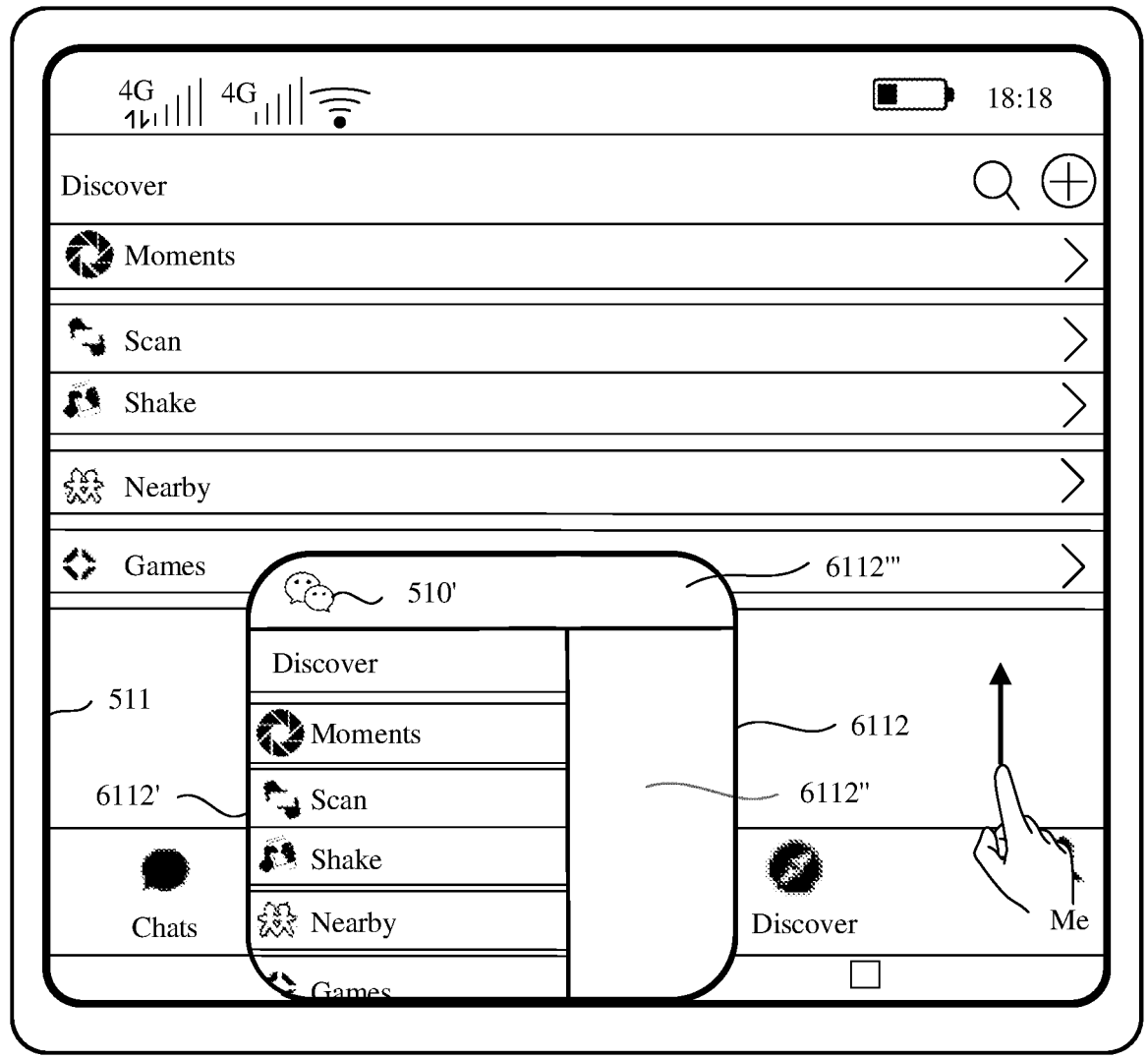

Refer to FIG. 8(a). The foldable electronic device is in an expanded state. In this case, an entire area of the electronic device is a home screen of the electronic device. The home screen of the electronic device includes three home screen pages, and each of the home screen pages includes one or more icons of one or more applications. A second home screen page is currently displayed on the home screen of the electronic device, and the home screen page includes an icon of Alipay, an icon of Task card store, an icon of Weibo, an icon of Albums, an icon of WeChat, an icon of Alarm, an icon of Settings, an icon of Themes, an icon of Phone, an icon of Messages, an icon of Contacts, and an icon of Camera. As shown in FIG. 8(a), when the electronic device detects that the user taps the icon 510 of WeChat with a finger, a display interface of the application "WeChat" is a GUI shown in FIG. 8(b). The display interface 511 includes Chats 520, Contacts 530, Discover 540, and Me 550. As shown in FIG. 8(b), the display interface is an interface displayed after the electronic device detects an operation that the user taps Discover 5113. After detecting an operation that the user slides upward at any location in a blank area in the display interface 511, the electronic device may display a GUI shown in FIG. 8(c). The electronic device displays another display window 6112. An area occupied by the display window 6112 is less than an area occupied by the display interface 511. The display window 6112 may be displayed along four boundary lines of the display interface 511. During the operation that the user slides upward at the any location in the blank area in the display interface 511, a boundary line with a shortest distance from the action in the four boundary lines of the display interface 511 is a boundary line on which the display window 6112 abuts. The display window 6112 may also be displayed at any location in the display interface 511. When the user touches and holds and drags the display window 6112, the user may adjust a location of the display window 6112 in the display interface 511, so that the user conveniently performs a specific operation on content displayed in the display window 6112. The display window 6112 includes three areas: a first area 6112', a second area 6112", and a third area 6112'". The third area 6112'" displays an application list currently opened by the electronic device. The application list may be an icon of an application, or the application list may be a thumbnail of an application opening interface. In this case, as shown in FIG. 8(c), the third area 6112'" displays an icon 510' of the application "WeChat" currently opened by the electronic device. In a GUI shown in FIG. 8(d), the user taps the icon 510'. After the electronic device detects an operation that the user taps the icon 510', the first area 6112' may display a GUI shown in FIG. 8(e). Content displayed in the first area 6112' is content displayed in the display interface 511, that is, an interface currently displayed by the application "WeChat". In this case, it may be understood that the content displayed in the display interface 511 is mirrored to the first area 6112', to be specific, the content displayed in the first area 6112' is the same as the content displayed in the display interface 511. A unique difference lies in that a size of the display interface 511 is different from a size of the first area 6112'. After the electronic device detects an operation that the user double-taps the second area 6112", the first area 6112' may display a GUI shown in FIG. 8(f), that is, the content displayed in the first area 6112' shown in FIG. 8(e) is scaled up. In this case, the content displayed in the display interface 511 is synchronized with the content displayed in the first area 6112' in FIG. 8(f). To be specific, it may be understood that the content displayed in the first area 6112' in FIG. 8(f) is mirrored to the display interface 511 shown in FIG. 8(g).

Figure 8H:
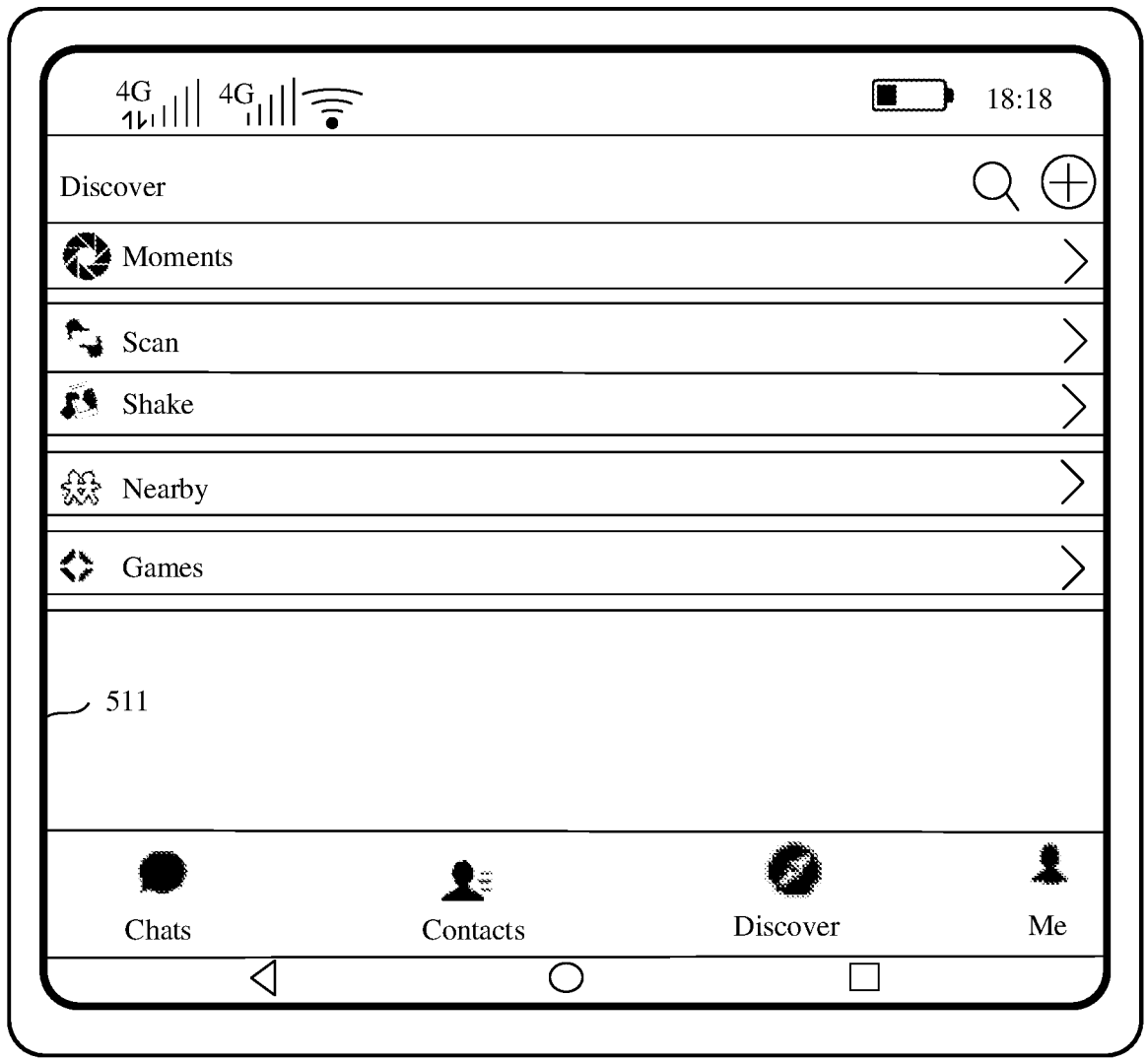

In this case, after detecting again an operation that the user slides upward at any location in the blank area in the display interface 511, the electronic device may display a GUI shown in FIG. 8(h), that is, hide the display window 5112.

FIG. 9(a) to FIG. 9(h) show GUIs of a mobile phone. FIG. 9(a) to FIG. 9(h) show a process in which a display interface on a home screen of the mobile phone changes when a user performs an operation on the mobile phone.

Figure 9A:
FIG. 9(a) to FIG. 9(h) are a schematic diagram of still another group of GUIs according to an embodiment of this application.

Refer to FIG. 9(a). The foldable electronic device is in an expanded state. In this case, an entire area of the electronic device is a home screen of the electronic device. The home screen of the electronic device includes three home screen pages, and each of the home screen pages includes one or more icons of one or more applications. A second home screen page is currently displayed on the home screen of the electronic device, and the home screen page includes an icon of Alipay, an icon of Task card store, an icon of Weibo, an icon of Albums, an icon of WeChat, an icon of Alarm, an icon of Settings, an icon of Themes, an icon of Phone, an icon of Messages, an icon of Contacts, and an icon of Camera. As shown in FIG. 9(a), when the electronic device separately detects that the user taps the icon 510 of WeChat with a finger and the user taps the icon 560 of Alarm with a finger, a display interface 911 of the application "WeChat" and a display interface 912 of the application "Alarm" may be GUIs shown in FIG. 9(b). The display interface 911 of the application "WeChat" and the display interface 912 of the application "Alarm" fully occupy the home screen of the electronic device. After detecting an operation that the user slides upward at any location in a blank area in a display interface 511, the electronic device may display a GUI shown in FIG. 9(c). The electronic device displays another display window 9112. An area occupied by the display window 9112 is less than an area occupied by the display interface 511. The display window 9112 may be displayed along four boundary lines of the display interface 511. During the operation that the user slides upward at the any location in the blank area in the display interface 511, a boundary line with a shortest distance from the action in the four boundary lines of the display interface 511 is a boundary line on which the display window 9112 abuts. The display window 9112 may also be displayed at any location in the display interface 511. When the user touches and holds and drags the display window 9112, the user may adjust a location of the display window 9112 in the display interface 511, so that the user conveniently performs a specific operation on content displayed in the display window 9112. The display window 9112 includes three areas: a first area 9112', a second area 9112", and a third area 9112'". The third area 9112' displays an application list currently opened by the electronic device. The application list may be an icon of an application, or the application list may be a thumbnail of an application opening interface. In this case, as shown in FIG. 9(c), the third area 6112'" displays an icon 510' of the application "WeChat" currently opened by the electronic device and an icon 560' of the application "Alarm" currently opened by the electronic device. In a GUI shown in FIG. 9(d), the user taps the icon 560'. After the electronic device detects an operation that the user taps the icon 560', the first area 9112' may display a GUI shown in FIG. 9(e). Content displayed in the first area 9112' is content displayed in the display interface 912, that is, an interface currently displayed by the application "Alarm". In this case, it may be understood that the content displayed in the display interface 912 is mirrored to the first area 9112', to be specific, the content displayed in the first area 9112' is the same as the content displayed in the display interface 912. A unique difference lies in that a size of the display interface 912 is different from a size of the first area 9112'. After the electronic device detects an operation that the user double-taps the second area 9112", the first area 9112' may display a GUI shown in FIG. 9(*f*), that is, the content displayed in the first area 9112' shown in FIG. 9(*e*) is scaled up. In this case, the content displayed in the display interface 912 is synchronized with the content displayed in the first area 9112' in FIG. 9(*f*). To be specific, it may be understood that the content displayed in the first area 9112' in FIG. 9(*f*) is mirrored to the display interface 912 shown in FIG. 9(*g*). In this case, after detecting again an operation that the user slides upward at any location in the blank area in the display interface 511, the electronic device may display a GUI shown in FIG. 9(*h*), that is, hide the display window 9112.

FIG. 10(*a*) to FIG. 10(*h*) show GUIs of a mobile phone. FIG. 10(*a*) to FIG. 10(*h*) show a process in which a display interface on a home screen of the mobile phone changes when a user performs an operation on the mobile phone.

Refer to FIG. 10(*a*). The foldable electronic device is in an expanded state. In this case, an entire area of the electronic device is a home screen of the electronic device. The home screen of the electronic device includes three home screen pages, and each of the home screen pages includes one or more icons of one or more applications. A second home screen page is currently displayed on the home screen of the electronic device, and the home screen page includes an icon of Alipay, an icon of Task card store, an icon of Weibo, an icon of Albums, an icon of WeChat, an icon of Alarm, an icon of Settings, an icon of Themes, an icon of Phone, an icon of Messages, an icon of Contacts, and an icon of Camera. As shown in FIG. 10(*a*), when the electronic device detects that the user taps the icon 510 of WeChat with a finger, a display interface of the application "WeChat" is a GUI shown in FIG. 10(*b*). The display interface 511 includes Chats 520, Contacts 530, Discover 540, and Me 550. As shown in FIG. 10(*b*), the display interface is an interface displayed after the electronic device detects an operation that the user taps Discover 5113. After detecting an operation that the user slides upward at any location in a blank area in the display interface 511, the electronic device may display a GUI shown in FIG. 10(*c*). The electronic device displays another display window 6112. An area occupied by the display window 6112 is less than an area occupied by the display interface 511. The display window 6112 may be displayed along four boundary lines of the display interface 511. During the operation that the user slides upward at the any location in the blank area in the display interface 511, a boundary line with a shortest distance from the action in the four boundary lines of the display interface 511 is a boundary line on which the display window 6112 abuts. The display window 6112 may also be displayed at any location in the display interface 511. When the user touches and holds and drags the display window 6112, the user may adjust a location of the display window 6112 in the display interface 511, so that the user conveniently performs a specific operation on content displayed in the display window 6112. The display window 6112 includes three areas: a first area 6112', a second area 6112", and a third area 6112'''. The third area 6112''' displays an application list currently opened by the electronic device. The application list may be an icon of an application, or the application list may be a thumbnail of an application opening interface. In this case, as shown in FIG. 10(*c*), the third area 6112''' displays an icon 510' of the application "WeChat" currently opened by the electronic device. In a GUI shown in FIG. 10(*d*), the user taps the icon 510'. After the electronic device detects an operation that the user taps the icon 510', the first area 6112' may display a GUI shown in FIG. 10(*e*). Content displayed in the first area 6112' is content displayed in the display interface 511, that is, an interface currently displayed by the application "WeChat". In this case, it may be understood that the content displayed in the display interface 511 is mirrored to the first area 6112', to be specific, the content displayed in the first area 6112' is the same as the content displayed in the display interface 511. A unique difference lies in that a size of the display interface 511 is different from a size of the first area 6112'. After the electronic device detects an operation that the user double-taps the second area 6112", the first area 6112' may display a GUI shown in FIG. 10(*f*), that is, the content displayed in the first area 6112' shown in FIG. 10(*e*) is scaled up, and the first area 6112' is appropriately scaled up. In this case, the content displayed in the display interface 511 is synchronized with the content displayed in the first area 6112' in FIG. 10(*f*). To be specific, it may be understood that the content displayed in the first area 6112' in FIG. 10(*f*) is mirrored to the display interface 511 shown in FIG. 10(*g*). In this case, after detecting again an operation that the user slides upward at any location in the blank area in the display interface 511, the electronic device may display a GUI shown in FIG. 10(*h*), that is, hide the display window 5112.

FIG. 11(*a*) to FIG. 11(*h*) show GUIs of a mobile phone. FIG. 11(*a*) to FIG. 11(*h*) show a process in which a display interface on a home screen of the mobile phone changes when a user performs an operation on the mobile phone.

Refer to FIG. 11(*a*). The foldable electronic device is in an expanded state. In this case, an entire area of the electronic device is a home screen of the electronic device. The home screen of the electronic device includes three home screen pages, and each of the home screen pages includes one or more icons of one or more applications. A second home screen page is currently displayed on the home screen of the electronic device, and the home screen page includes an icon of Alipay, an icon of Task card store, an icon of Weibo, an icon of Albums, an icon of WeChat, an icon of Alarm, an icon of Settings, an icon of Themes, an icon of Phone, an icon of Messages, an icon of Contacts, and an icon of Camera. As shown in FIG. 11(*a*), when the electronic device separately detects that the user taps the icon 510 of WeChat with a finger and the user taps the icon 560 of Alarm with a finger, a display interface 911 of the application "WeChat" and a display interface 912 of the application "Alarm" may be GUIs shown in FIG. 11(*b*). The display interface 911 of the application "WeChat" and the display interface 912 of the application "Alarm" fully occupy the home screen of the electronic device. After detecting an operation that the user slides upward at any location in a blank area in a display interface 511, the electronic device may display a GUI shown in FIG. 11(*c*). The electronic device displays another display window 9112. An area occupied by the display window 9112 is less than an area occupied by the display interface 511. The display window 9112 may be displayed along four boundary lines of the display interface 511. During the operation that the user slides upward at the any location in the blank area in the display interface 511, a boundary line with a shortest distance from the action in the four boundary lines of the display interface 511 is a boundary line on which the display window 9112 abuts. The display window 9112 may also be displayed at any location in the display interface 511. When the user touches and holds and drags the display window 9112, the user may adjust a location of the display window 9112 in the display interface 511, so that the user conveniently performs a specific operation on content displayed in the display window 9112. The display window 9112 includes three areas: a first area 9112', a second area 9112", and a third area 9112'". The third area 9112' displays an application list currently opened by the electronic device. The application list may be an icon of an application, or the application list may be a thumbnail of an application opening interface. In this case, as shown in FIG. 11(c), the third area 6112'" displays an icon 510' of the application "WeChat" currently opened by the electronic device and an icon 560' of the application "Alarm" currently opened by the electronic device. In a GUI shown in FIG. 11(d), the user taps the icon 560'. After the electronic device detects an operation that the user taps the icon 560', the first area 9112' may display a GUI shown in FIG. 11(e). Content displayed in the first area 9112' is content displayed in the display interface 912, that is, an interface currently displayed by the application "Alarm". In this case, it may be understood that the content displayed in the display interface 912 is mirrored to the first area 9112', to be specific, the content displayed in the first area 9112' is the same as the content displayed in the display interface 912. A unique difference lies in that a size of the display interface 912 is different from a size of the first area 9112'. After the electronic device detects an operation that the user double-taps the second area 9112", the first area 9112' may display a GUI shown in FIG. 11(f), that is, the content displayed in the first area 9112' shown in FIG. 11(e) is scaled up, and the first area 9112' is appropriately scaled up. In this case, the content displayed in the display interface 912 is synchronized with the content displayed in the first area 9112' in FIG. 11(f). To be specific, it may be understood that the content displayed in the first area 9112' in FIG. 11(f) is mirrored to the display interface 912 shown in FIG. 11(g). In this case, after detecting again an operation that the user slides upward at any location in the blank area in the display interface 511, the electronic device may display a GUI shown in FIG. 11(h), that is, hide the display window 9112.

Figure 11H:
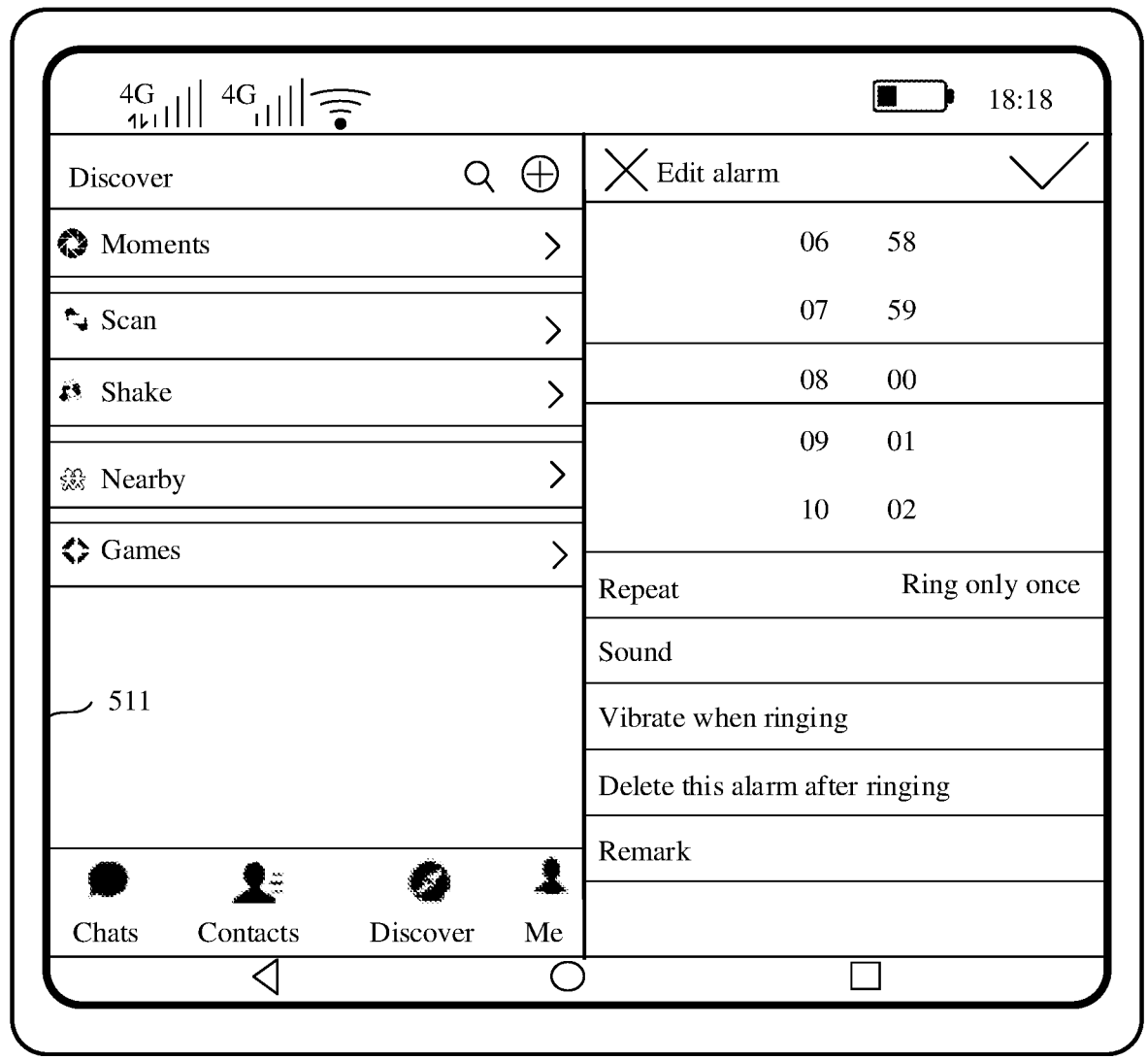
Figure 12A:
FIG. 12(*a*) to FIG. 12(*h*) are a schematic diagram of still another group of GUIs according to an embodiment of this application.
Figure 12B:
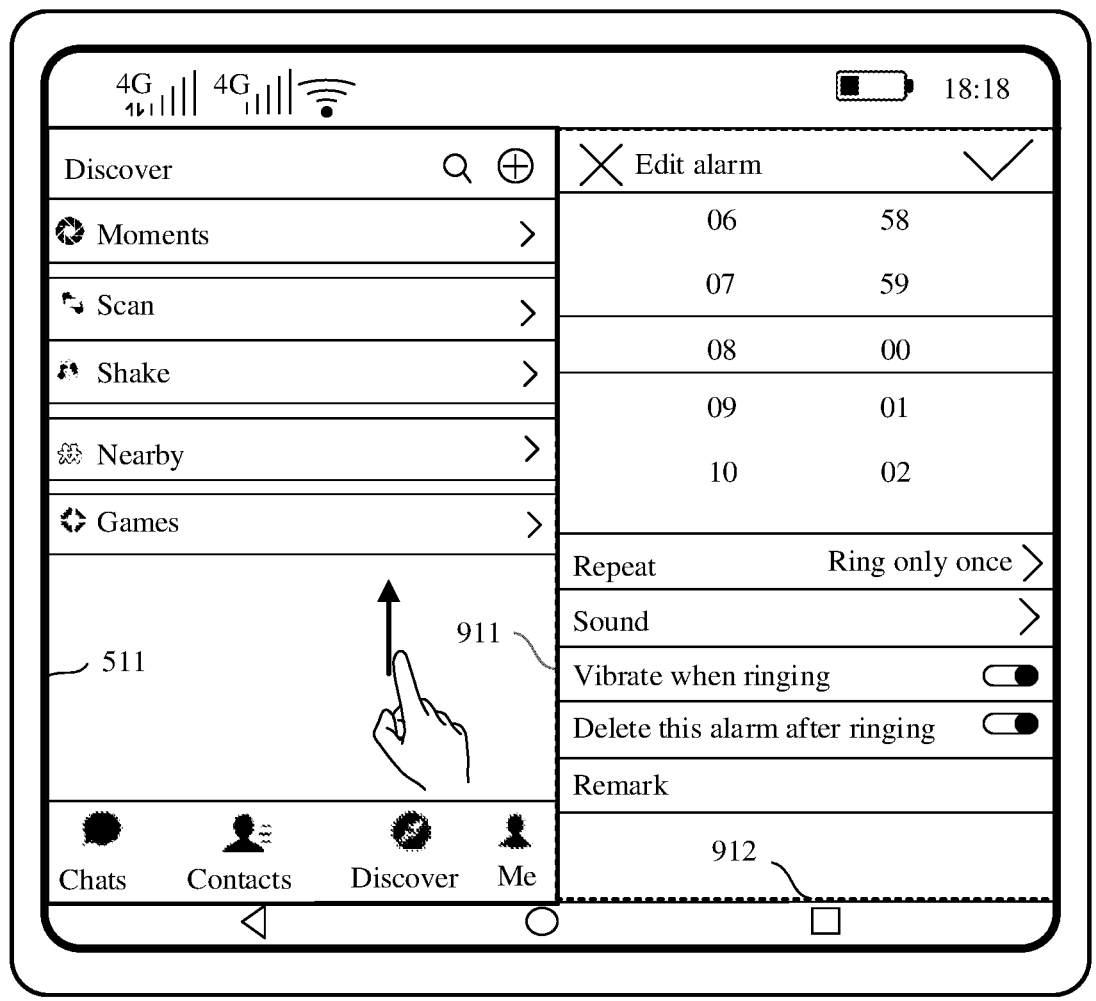
Figure 12C:
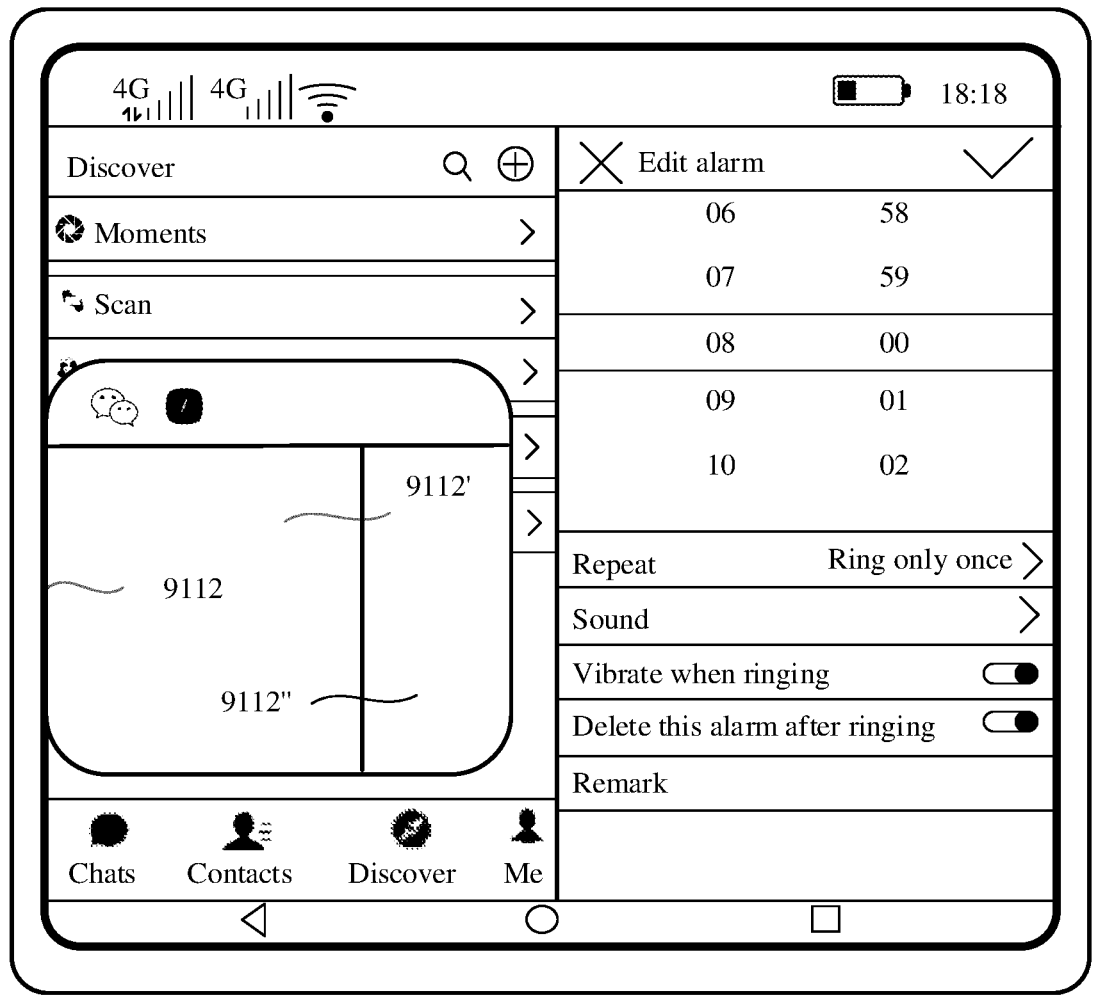

FIG. 12(a) to FIG. 12(h) show GUIs of a mobile phone. FIG. 12(a) to FIG. 11(h) show a process in which a display interface on a home screen of the mobile phone changes when a user performs an operation on the mobile phone.

Figure 12D:
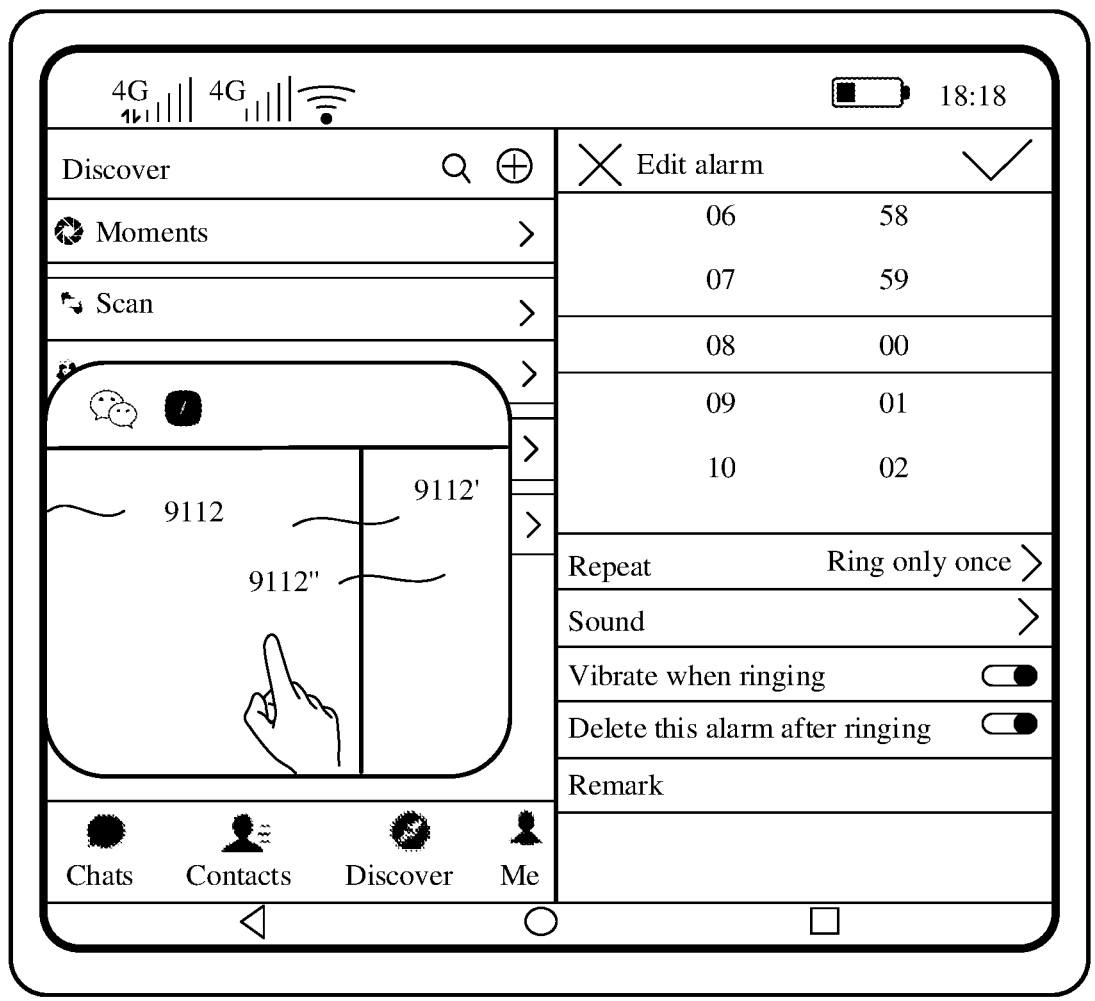
Figure 12E:
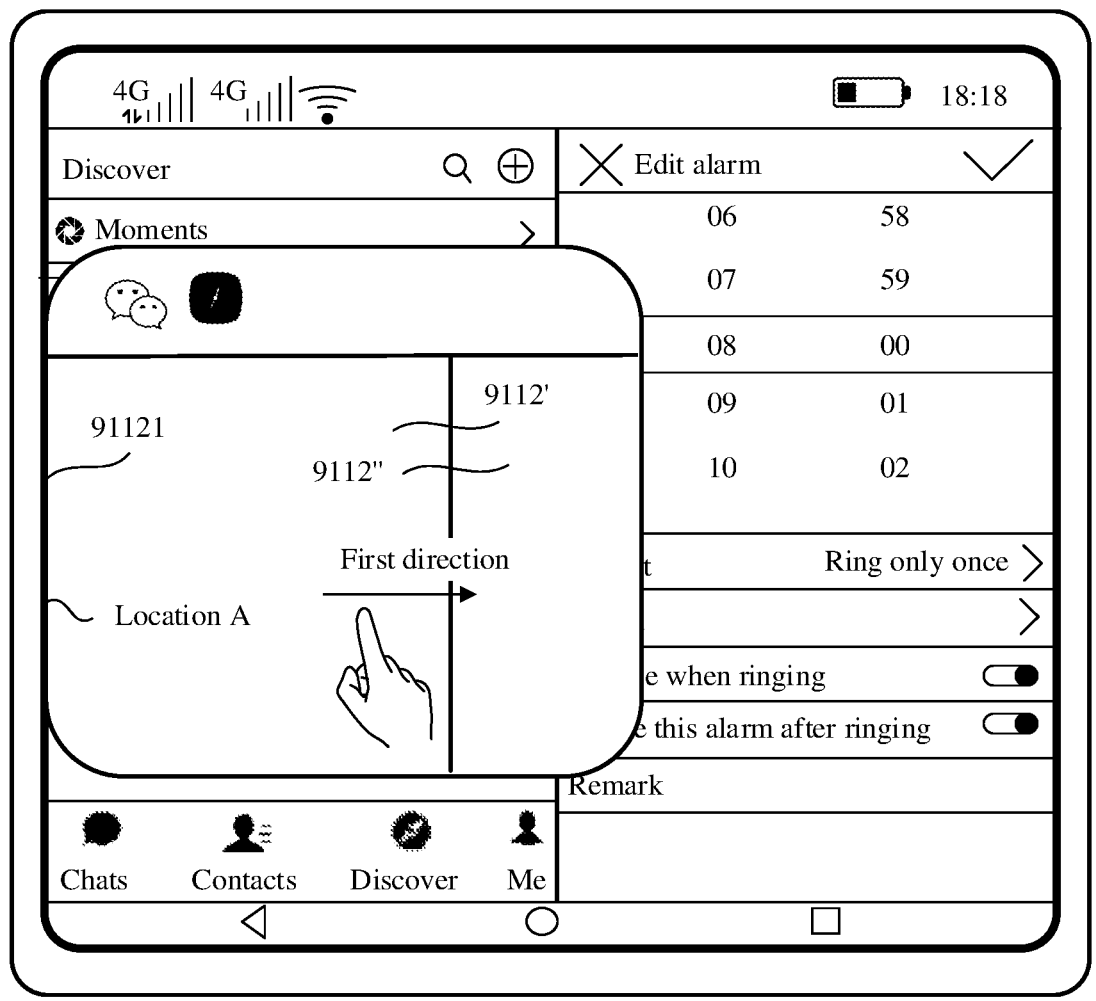
Figure 12F:
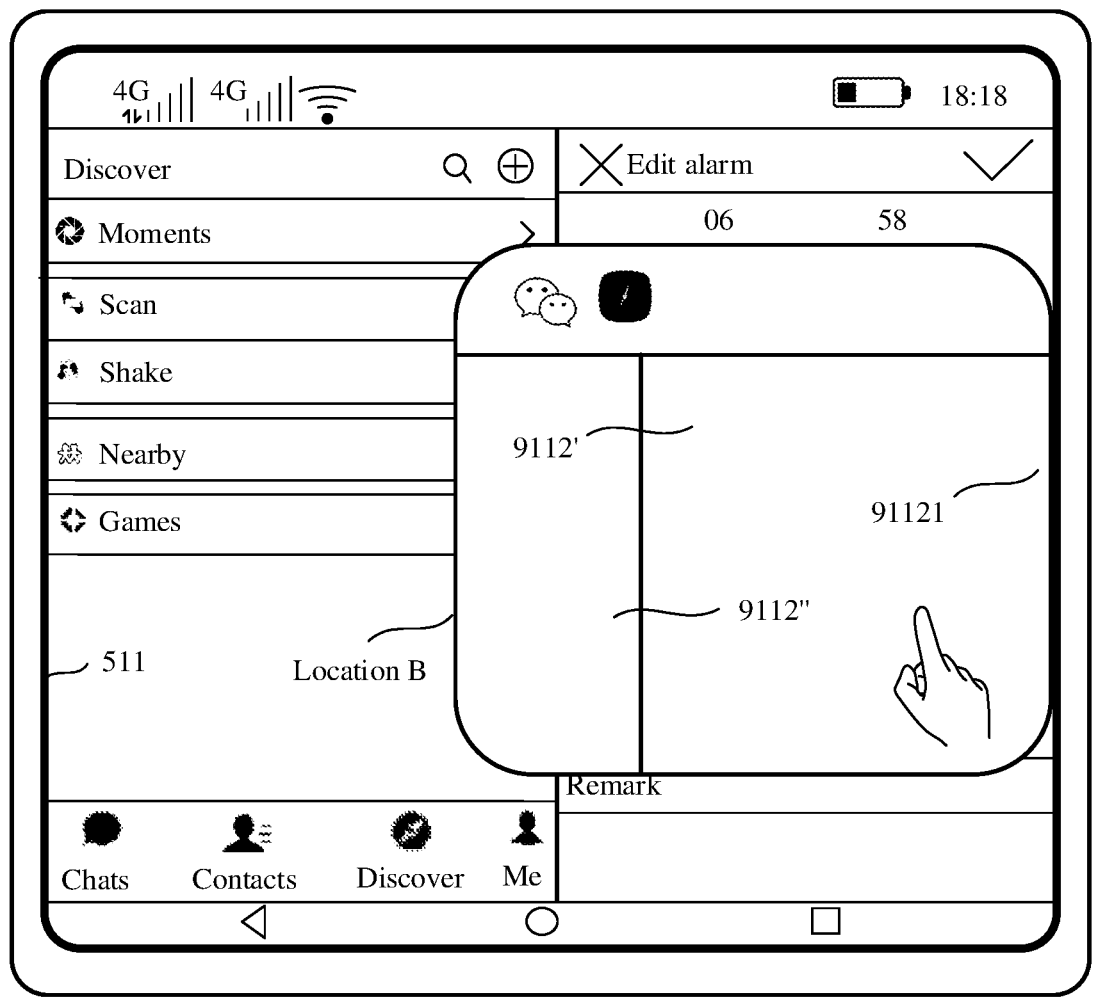
Figure 12G:
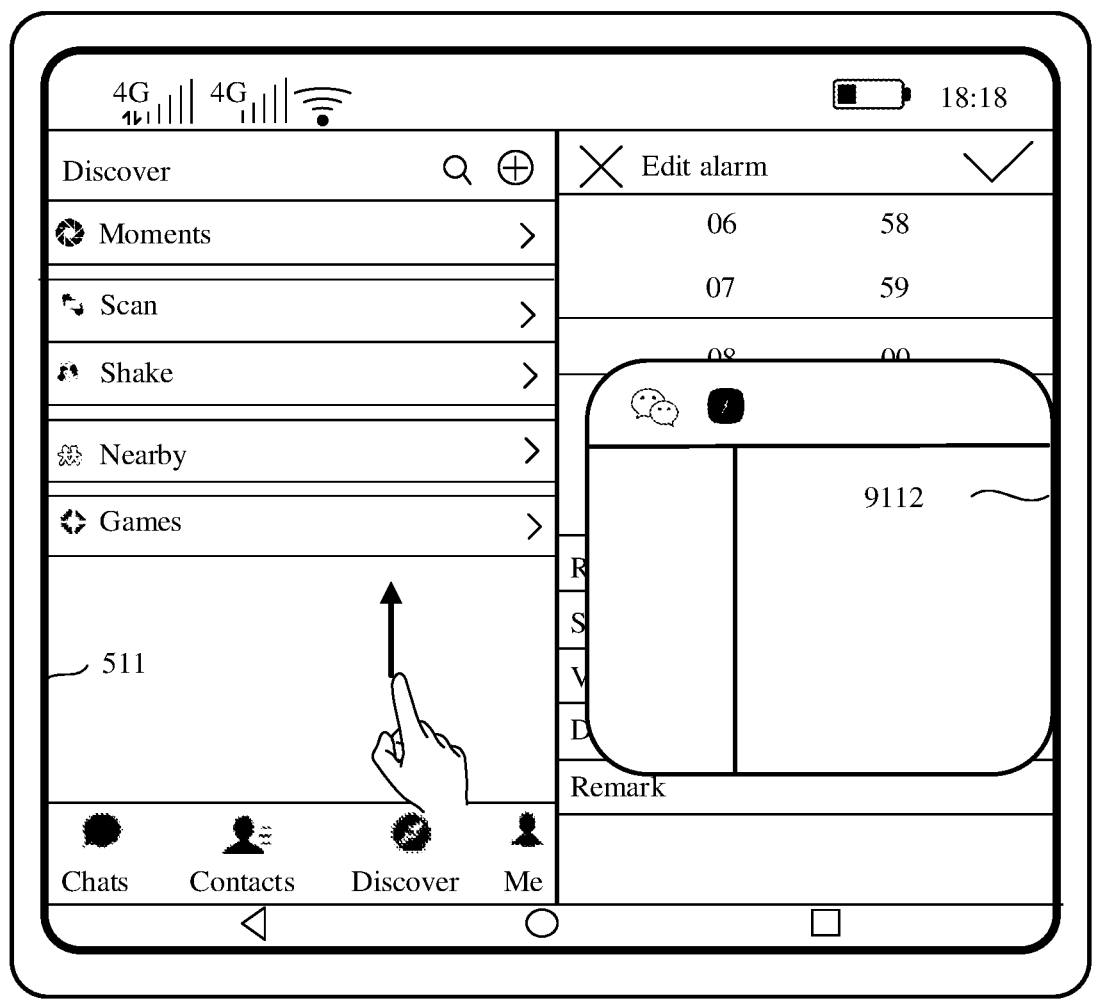
Figure 12H:
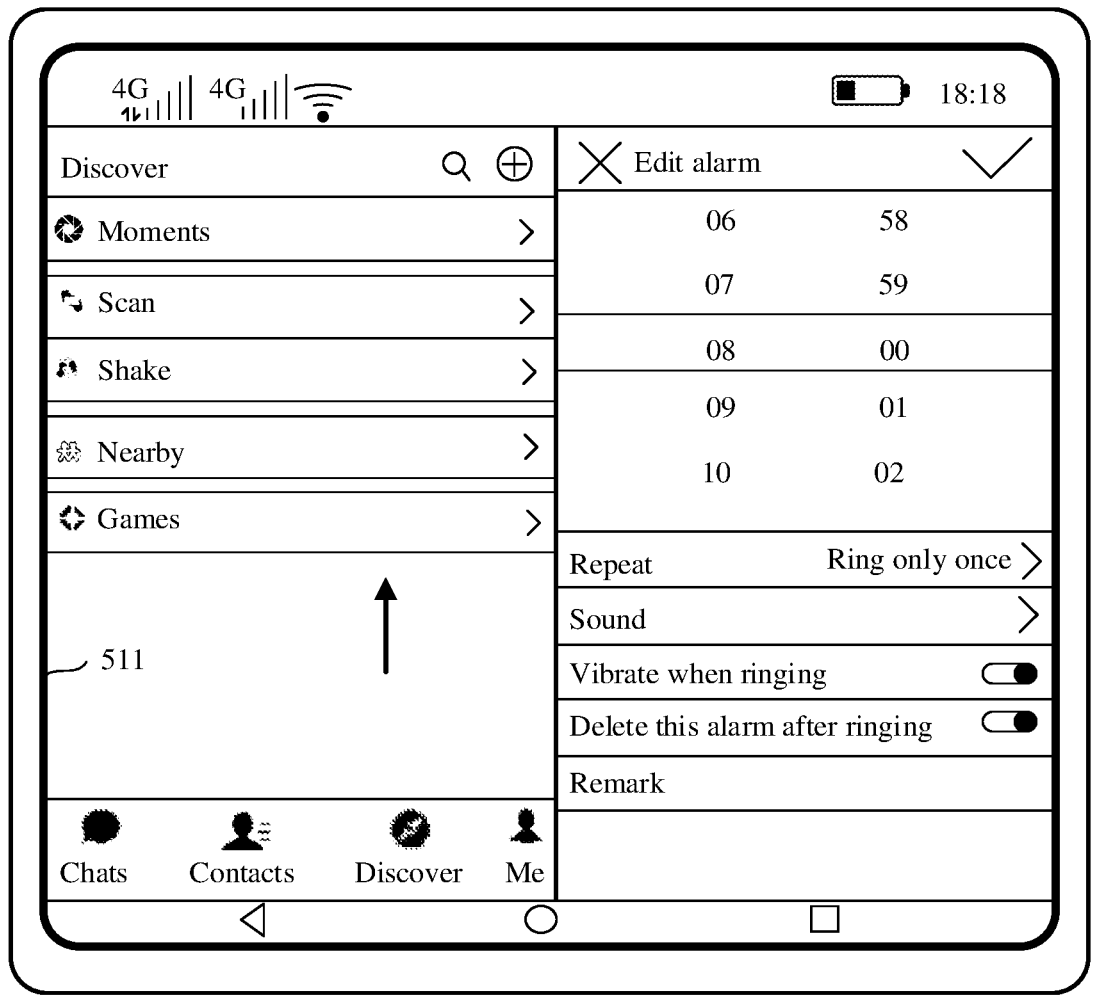

Refer to FIG. 12(a). The foldable electronic device is in an expanded state. In this case, an entire area of the electronic device is a home screen of the electronic device. The home screen of the electronic device includes three home screen pages, and each of the home screen pages includes one or more icons of one or more applications. A second home screen page is currently displayed on the home screen of the electronic device, and the home screen page includes an icon of Alipay, an icon of Task card store, an icon of Weibo, an icon of Albums, an icon of WeChat, an icon of Alarm, an icon of Settings, an icon of Themes, an icon of Phone, an icon of Messages, an icon of Contacts, and an icon of Camera. As shown in FIG. 12(a), when the electronic device separately detects that the user taps the icon 510 of WeChat with a finger and the user taps the icon 560 of Alarm with a finger, a display interface 911 of the application "WeChat" and a display interface 912 of the application "Alarm" may be GUIs shown in FIG. 12(b). The display interface 911 of the application "WeChat" and the display interface 912 of the application "Alarm" fully occupy the home screen of the electronic device. After detecting an operation that the user slides upward at any location in a blank area in a display interface 511, the electronic device may display a GUI shown in FIG. 12(c). The electronic device displays another display window 9112. The display window 9112 includes a first area 9112' and a second area 9112". An area occupied by the display window 9112 is less than an area occupied by the display interface 511. The display window 9112 may be displayed along four boundary lines of the display interface 511. During the operation that the user slides upward at the any location in the blank area in the display interface 511, a boundary line with a shortest distance from the action in the four boundary lines of the display interface 511 is a boundary line on which the display window 9112 abuts. The display window 9112 may also be displayed at any location in the display interface 511. When the user touches and holds and drags the display window 9112, the user may adjust a location of the display window 9112 in the display interface 511, so that the user conveniently performs a specific operation on content displayed in the display window 9112. In a GUI shown in FIG. 12(d), the user touches and holds the display window 9112. After the electronic device detects an operation that the user touches and holds the display window 9112, the user may adjust a size of the area occupied by the display window 9112. In a GUI shown in FIG. 12(e), the user performs a scale-up operation on the area occupied by the display window 9112, to obtain a display window 91121. The area occupied by the display window 9112 shown in FIG. 12(d) is less than the display window 91121 shown in FIG. 12(e). When dragging the display window 91121, the user may move the display window 91121 along any direction to any location on the electronic device. In this case, the first area 9112' and the second area 9112" in the display window 9112 move along with a location of the display window 9112 in the first interface 511. The first area 9112' is close to a side on which the user performs an operation. For example, as shown in FIG. 12(e), when the user drags the display window 9112 from a location A to a location B along a first direction, in a GUI shown in FIG. 12(f), the window 9112 is displayed at the location B, that is, the window 9112 is displayed on the right side of the electronic device. Locations of the first area 9112' and the second area 9112" are exchanged, and the first area 9112' is displayed at a location close to the right side of the electronic device. In this case, after detecting an operation that the user double-taps any location in a blank area in the window 91121, the electronic device may display a GUI shown in FIG. 12(g), that is, a size of the display window 91121 changes back to an original size of the display window 9112. In this case, after detecting again an operation that the user slides upward at any location in the blank area in the display interface 511, the electronic device may display a GUI shown in FIG. 12(h), that is, hide the display window 9112.

Figure 13A:
FIG. 13(*a*) to FIG. 13(*h*) are a schematic diagram of still another group of GUIs according to an embodiment of this application.

FIG. 13(a) to FIG. 13(h) show GUIs of a mobile phone. FIG. 13(a) to FIG. 5(h) show a process in which a display interface on a home screen of the mobile phone changes when a user performs an operation on the mobile phone.

Figure 13B:
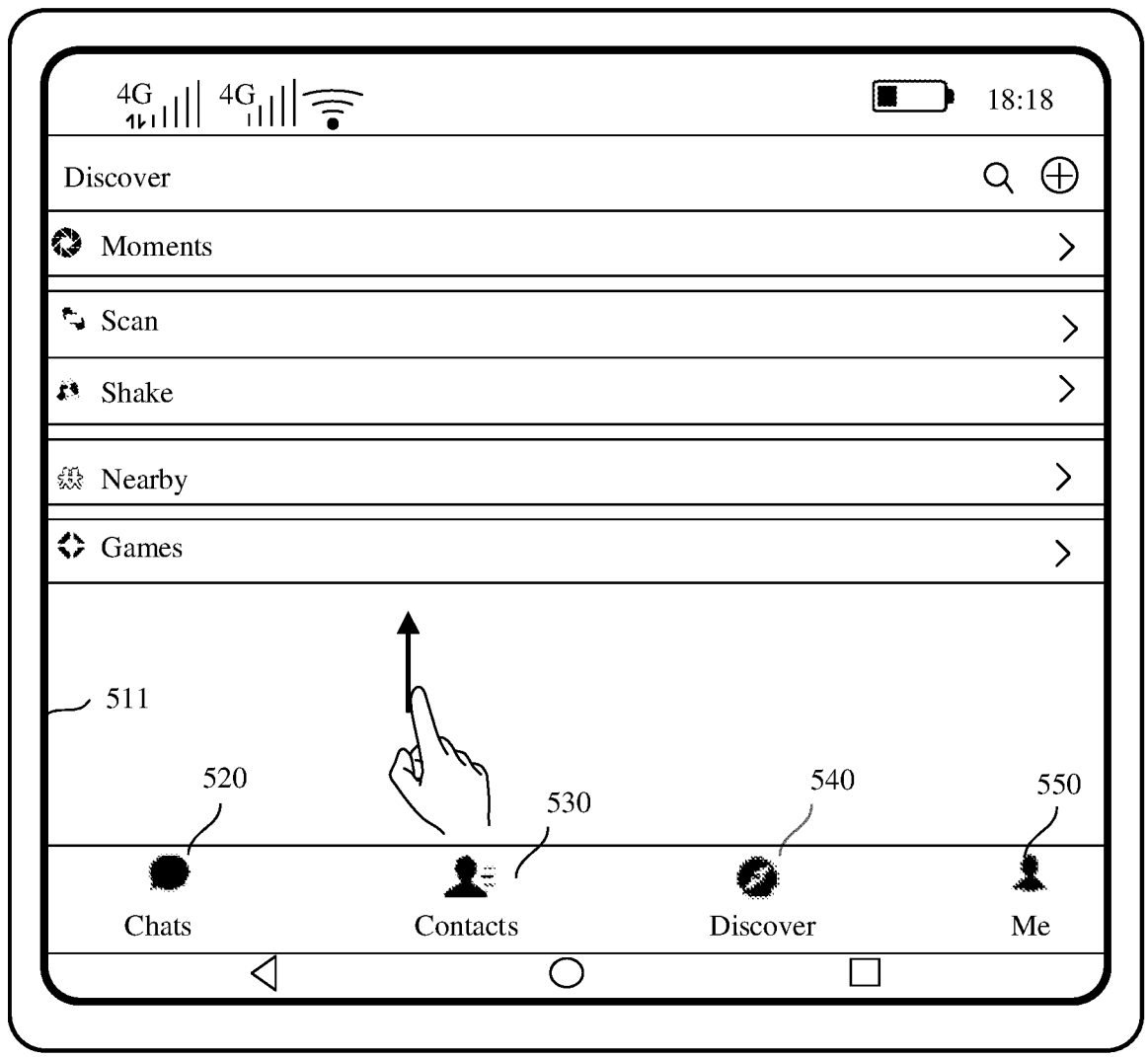
Figure 13C:
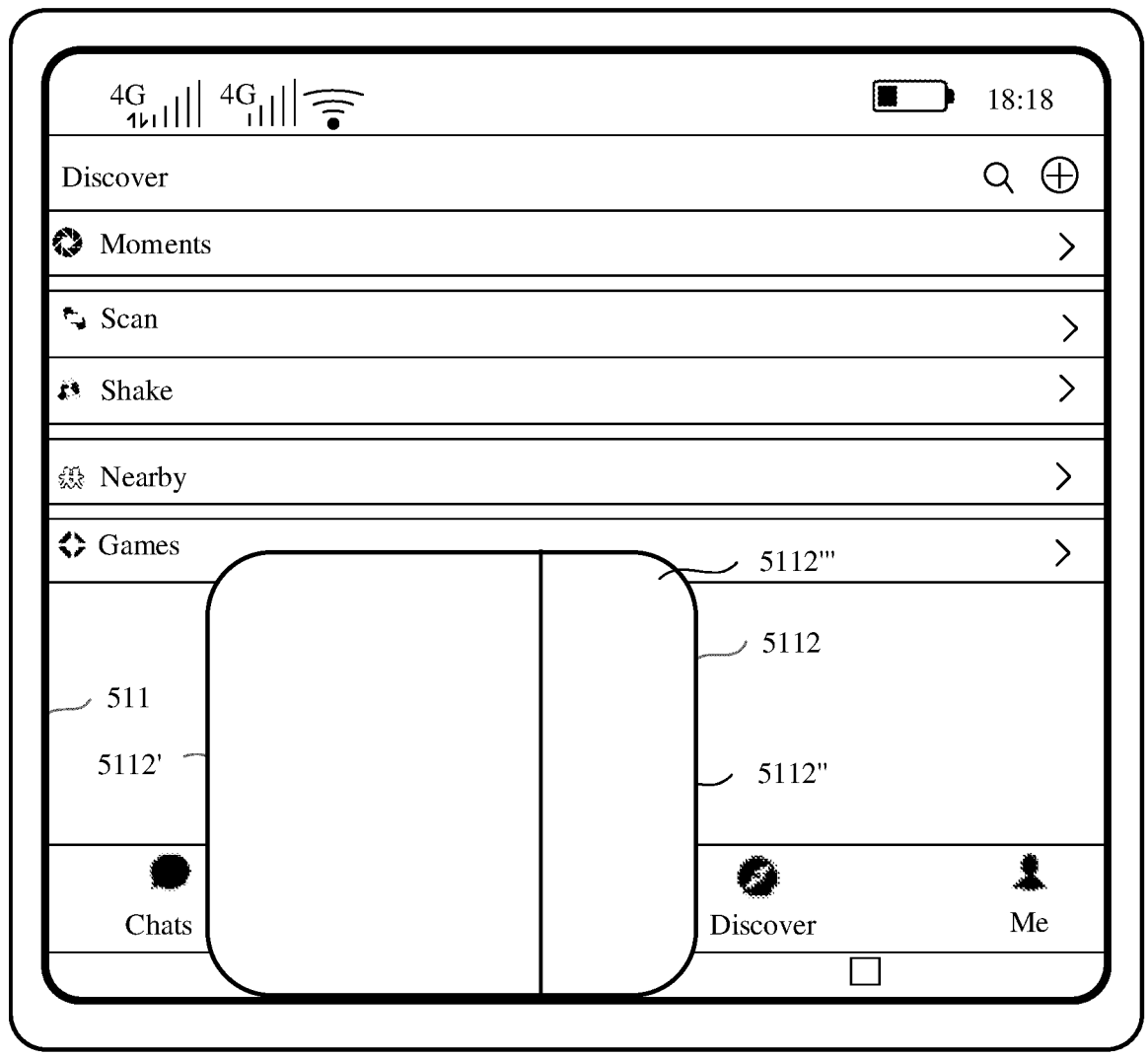
Figure 13D:
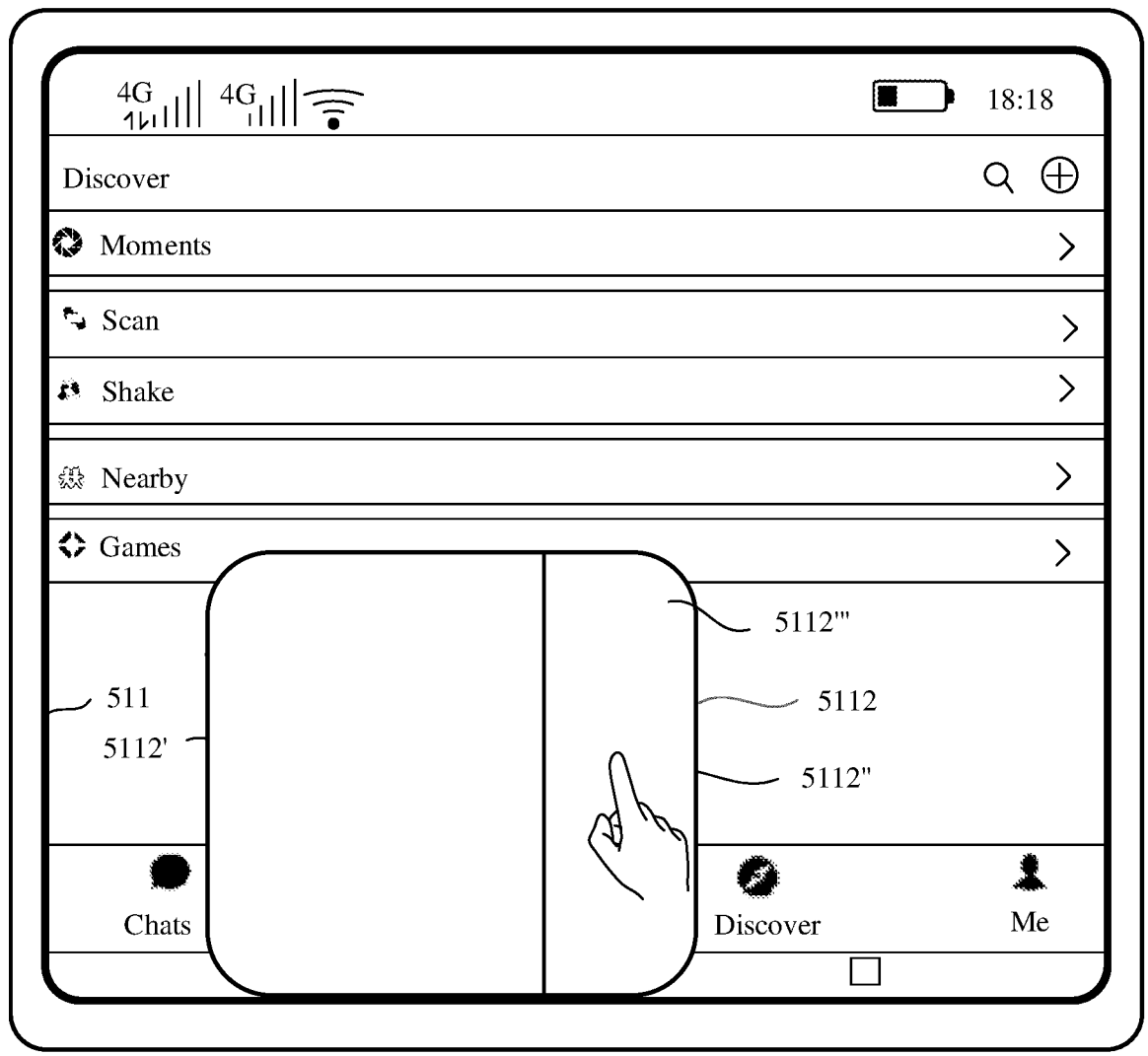
Figure 13E:
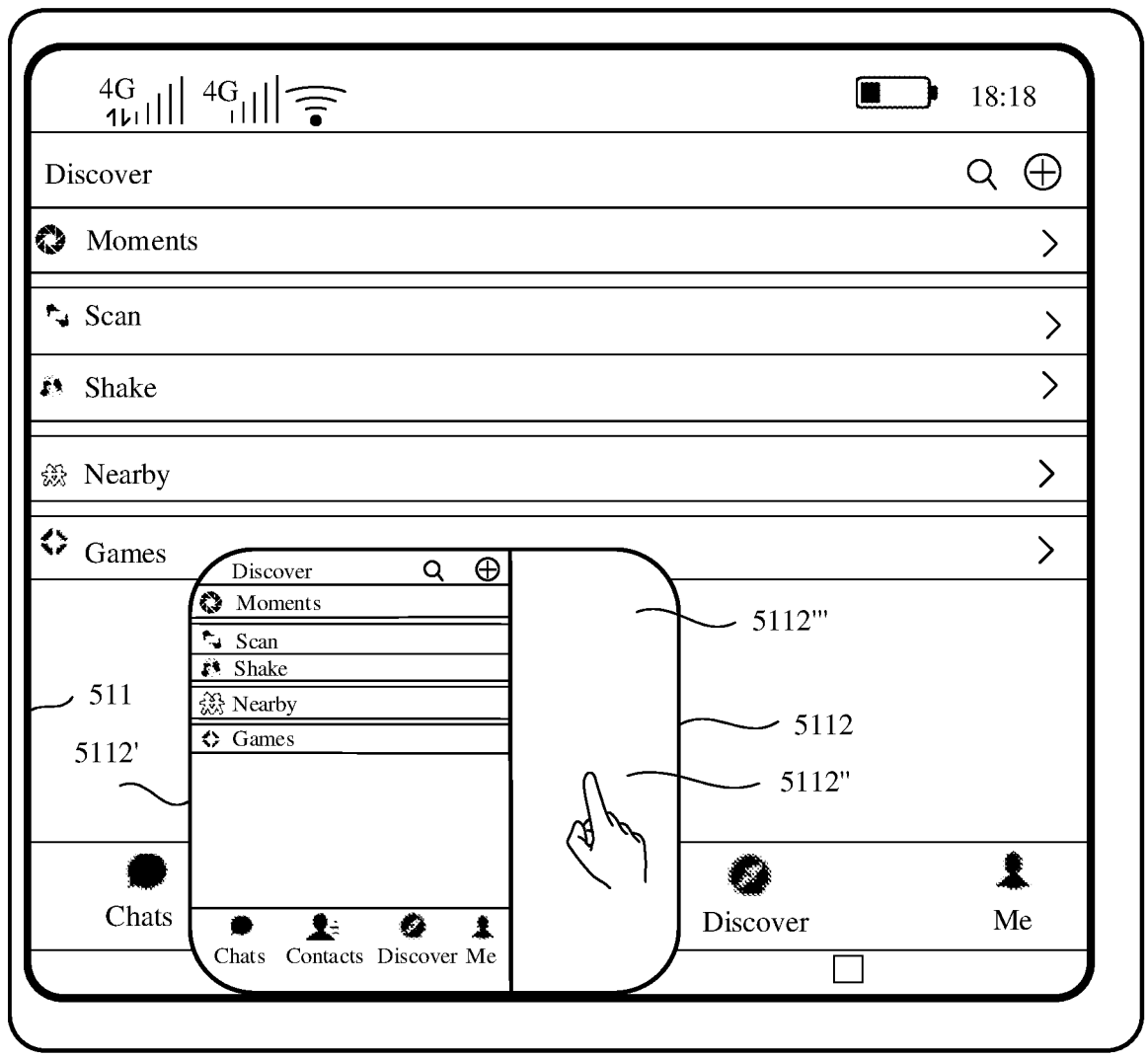
Figure 13F:
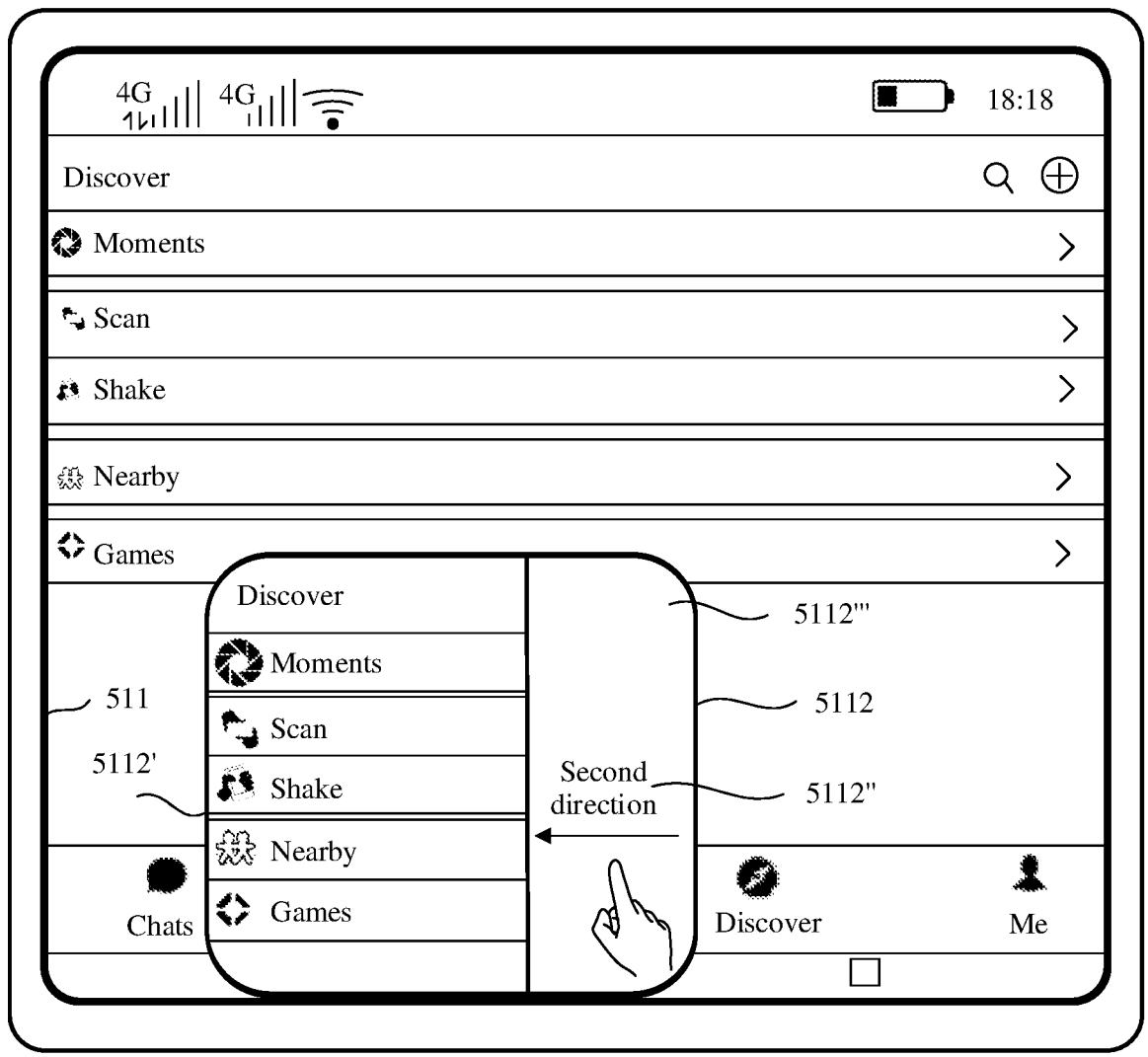
Figure 13G:
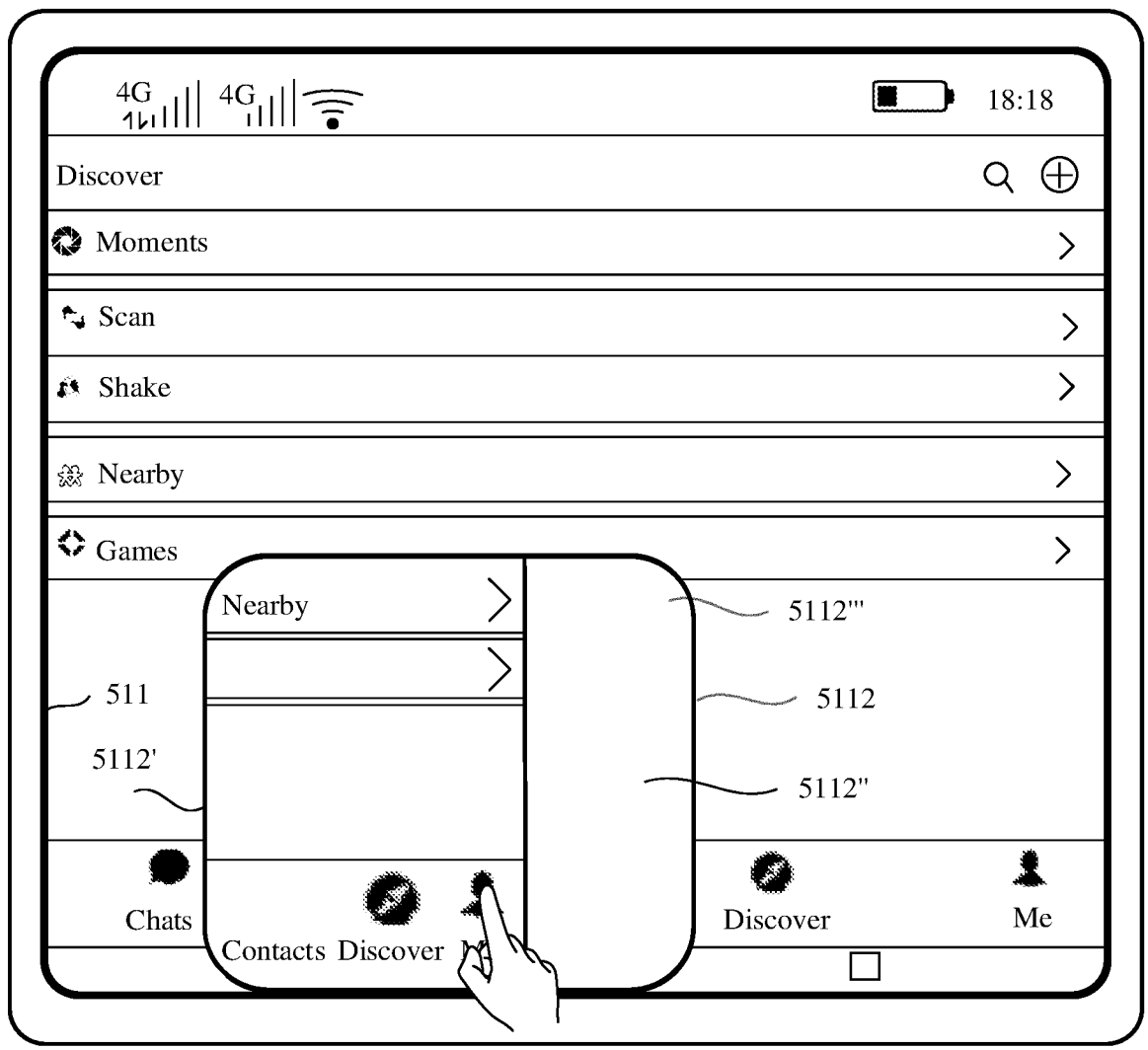
Figure 13H:
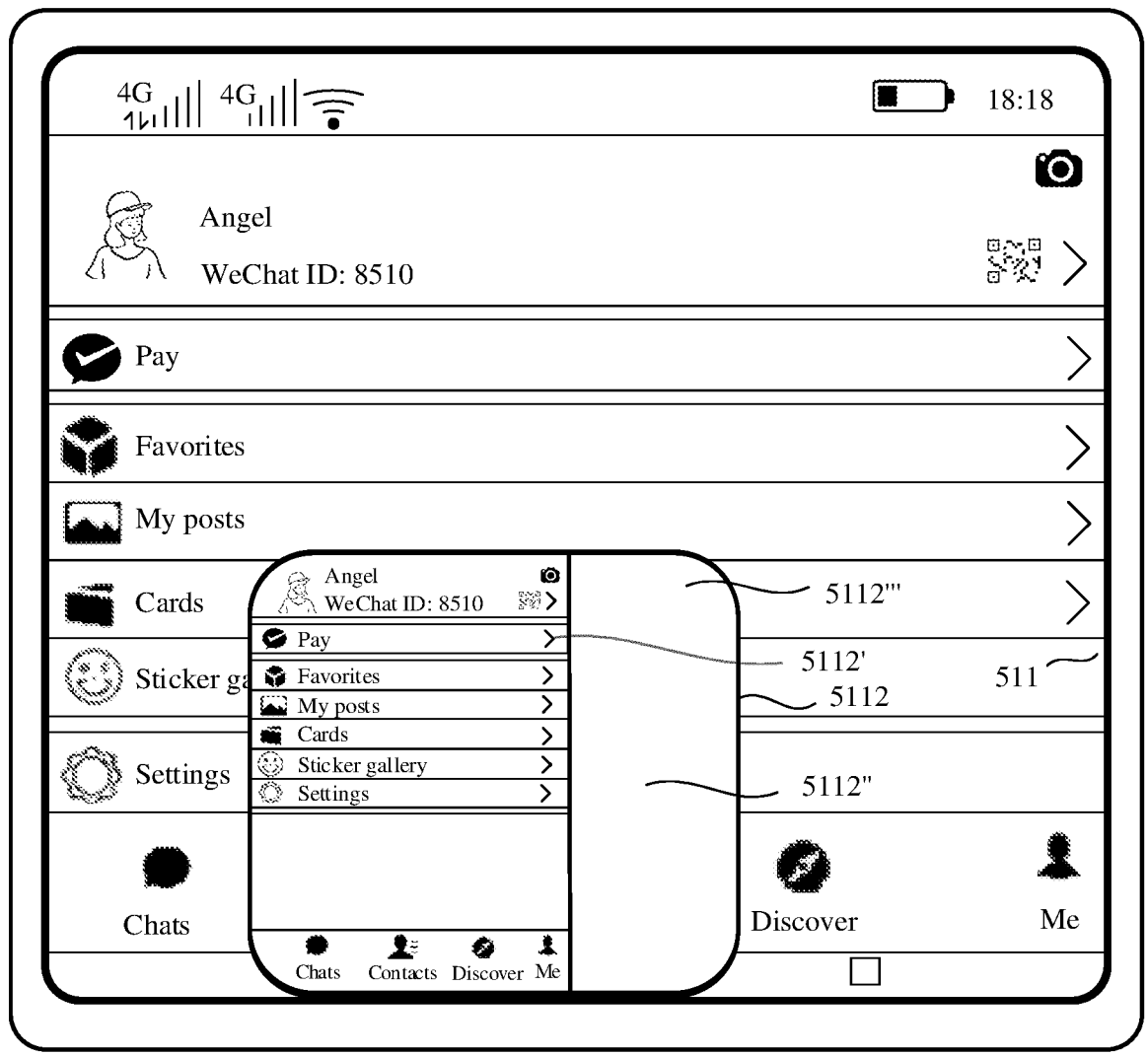

Refer to FIG. 13(a). The foldable electronic device is in an expanded state. In this case, an entire area of the electronic device is a home screen of the electronic device. The home screen of the electronic device includes three home screen pages, and each of the home screen pages includes one or more icons of one or more applications. A second home screen page is currently displayed on the home screen of the electronic device, and the home screen page includes an icon of Alipay, an icon of Task card store, an icon of Weibo, an icon of Albums, an icon of WeChat, an icon of Alarm, an icon of Settings, an icon of Themes, an icon of Phone, an icon of Messages, an icon of Contacts, and an icon of Camera. As shown in FIG. 13(a), when the electronic device detects that the user taps the icon 510 of WeChat with a finger, a display interface of the application "WeChat" is a GUI shown in FIG. 13(b). The display interface 511 includes Chats 520, Contacts 530, Discover 540, and Me 550. As shown in FIG. 13(b), the display interface is an interface displayed after an operation that the user taps Discover 540. After detecting an operation that the user slides upward at any location in a blank area in the display interface 511, the electronic device may display a GUI shown in FIG. 13(c). The electronic device displays another display window 5112. An area occupied by the display window 5112 is less than an area occupied by the display interface 511. The display window 5112 may be displayed along four boundary lines of the display interface 511. During the operation that the user slides upward at the any location in the blank area in the display interface 511, a boundary line with a shortest distance from the action in the four boundary lines of the display interface 511 is a boundary line on which the display window 5112 abuts. The display window 5112 may also be displayed at any location in the display interface 511. When the user touches and holds and drags the display window 5112, the user may adjust a location of the display window 5112 in the display interface 511, so that the user conveniently performs a specific operation on content displayed in the display window 5112. The display window 5112 includes two areas: a first area 5112' and a second area 5112". In a GUI shown in FIG. 13(d), the user taps any location in the second area 5112". After the electronic device detects an operation that the user taps the second area 5112", the first area 5112' may display a GUI shown in FIG. 13(e). Content displayed in the first area 5112' is content displayed in the display interface 511, that is, an interface currently displayed by the application "WeChat". In this case, it may be understood that the content displayed in the display interface 511 is mirrored to the first area 5112', to be specific, the content displayed in the first area 5112' is the same as the content displayed in the display interface 511. A unique difference lies in that a size of the display interface 511 is different from a size of the first area 5112'. After the electronic device detects an operation that the user double-taps the second area 5112", the first area 5112' may display a GUI shown in FIG. 13(f), that is, the content displayed in the first area 5112' shown in FIG. 13(e) is scaled up. In this case, content displayed in the first area 5112' is a part of the content displayed in the first area 5112' shown in FIG. 13(f). When the user needs to perform an operation on "Me" in the application WeChat, the user needs to slide along a second direction in the second area 5112", so that "Me" is in a range in which the user can perform an operation. To be specific, after the electronic device detects an operation that the user slides along the second direction in the second area 5112", content displayed in the second area 5112" may be shown in FIG. 13(g). When the electronic device detects that the user taps the control "Me", as shown in FIG. 15(h), the content displayed in the second area 5112" is synchronized with the content displayed in the first interface 511.

Figure 14A:
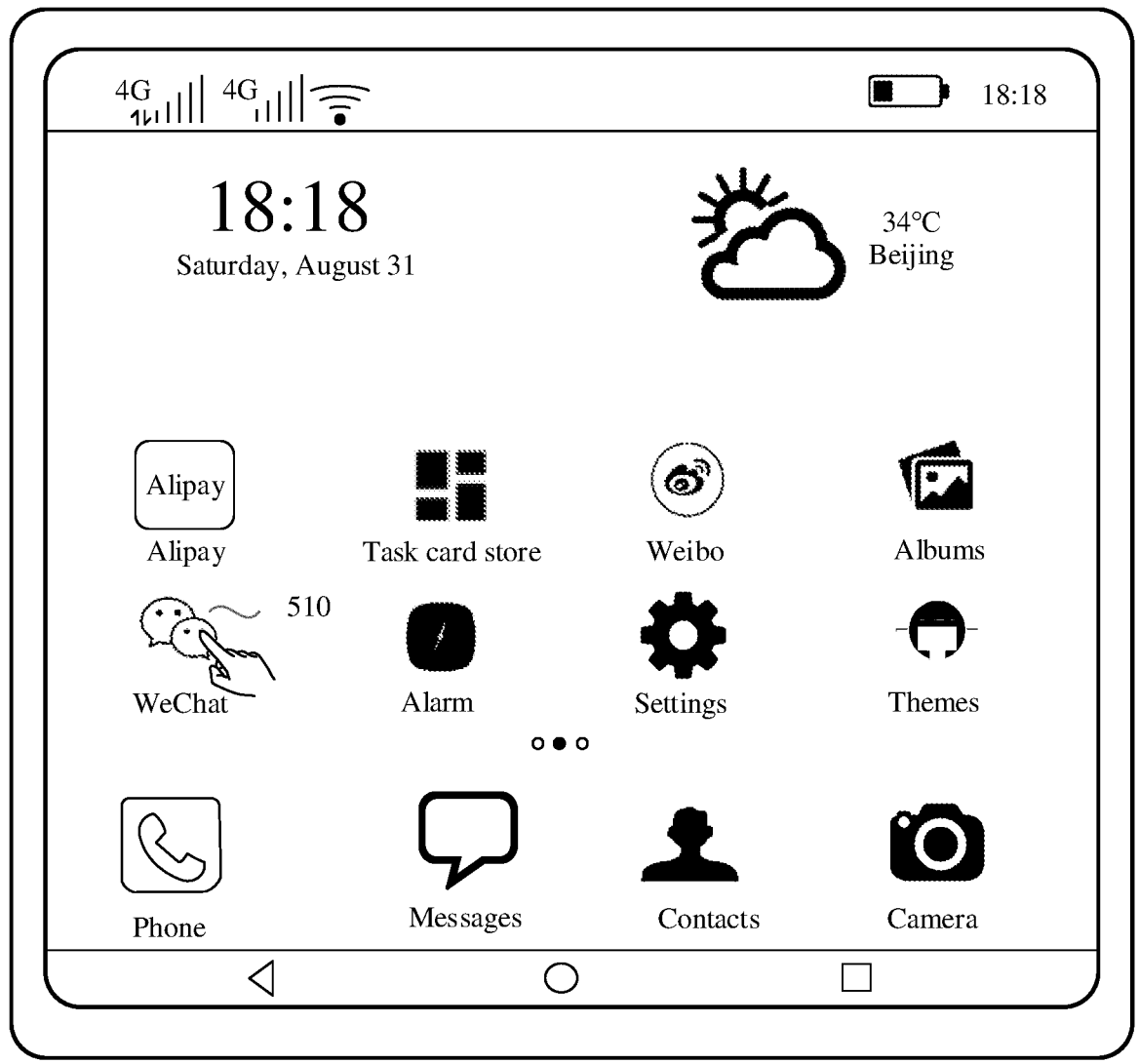
FIG. 14(*a*) to FIG. 14(*h*) are a schematic diagram of still another group of GUIs according to an embodiment of this application.

FIG. 14(a) to FIG. 14(h) show GUIs of a mobile phone. FIG. 14(a) to FIG. 11(h) show a process in which a display interface on a home screen of the mobile phone changes when a user performs an operation on the mobile phone.

Figure 14B:
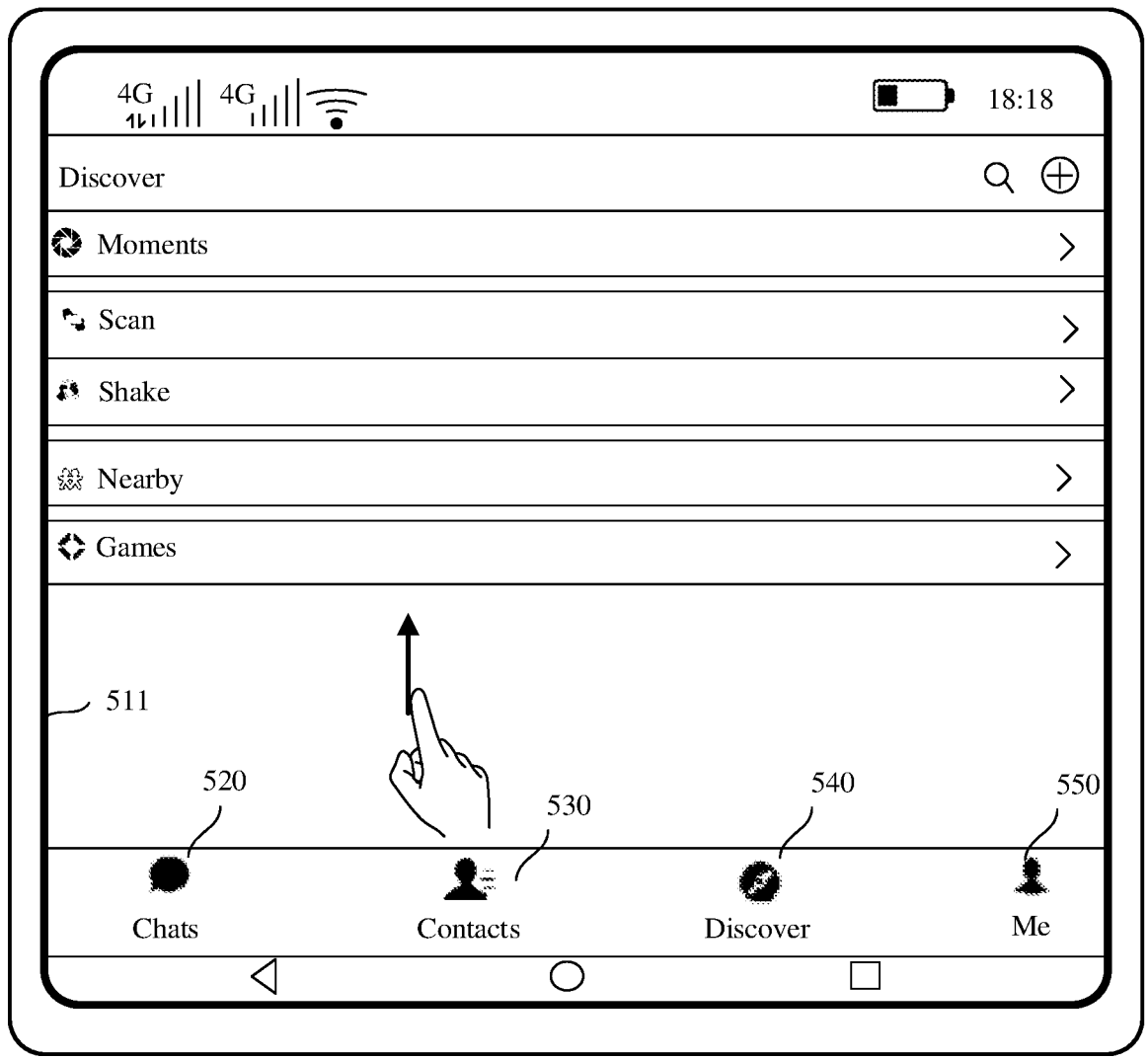
Figure 14C:
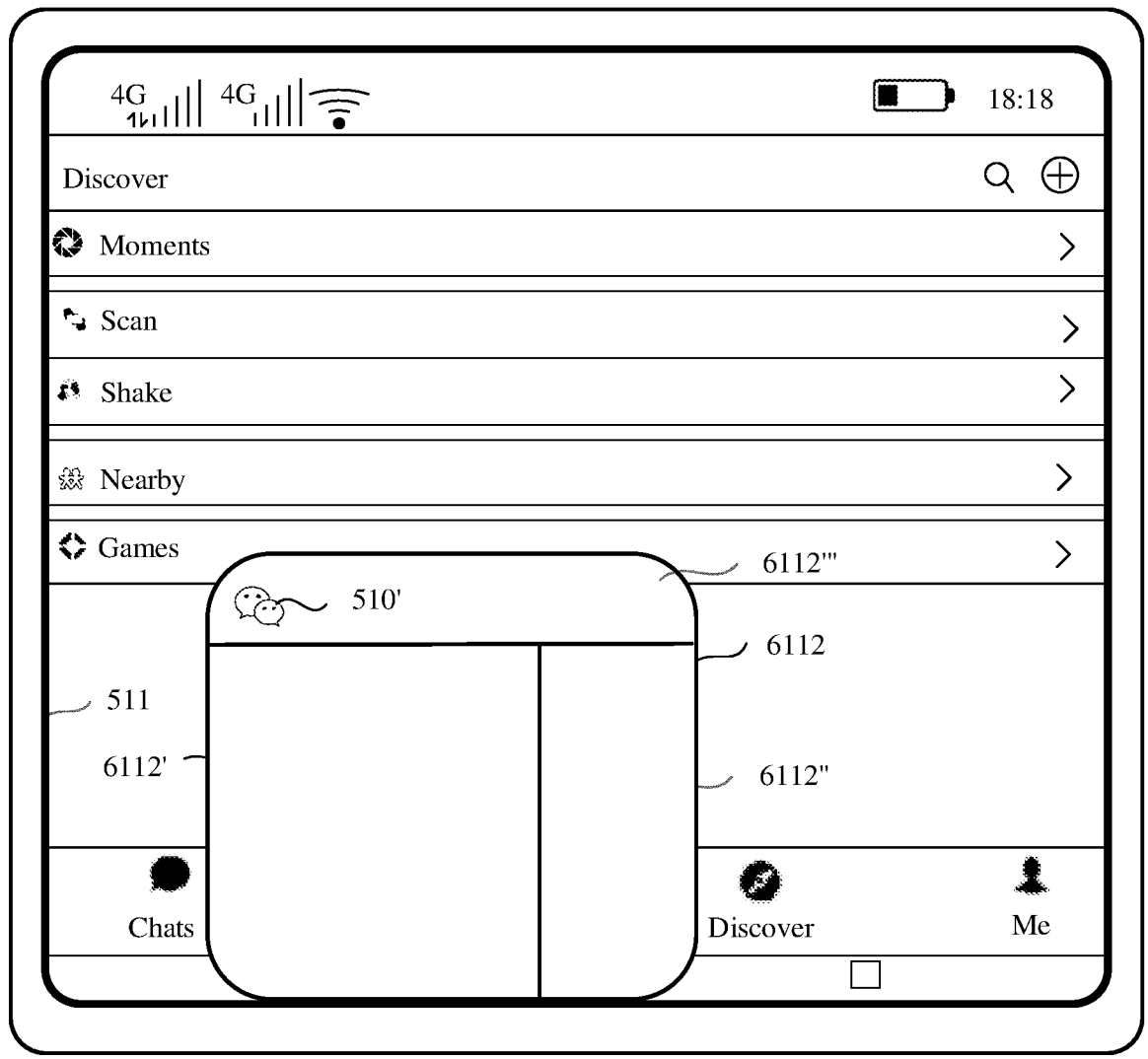
Figure 14D:
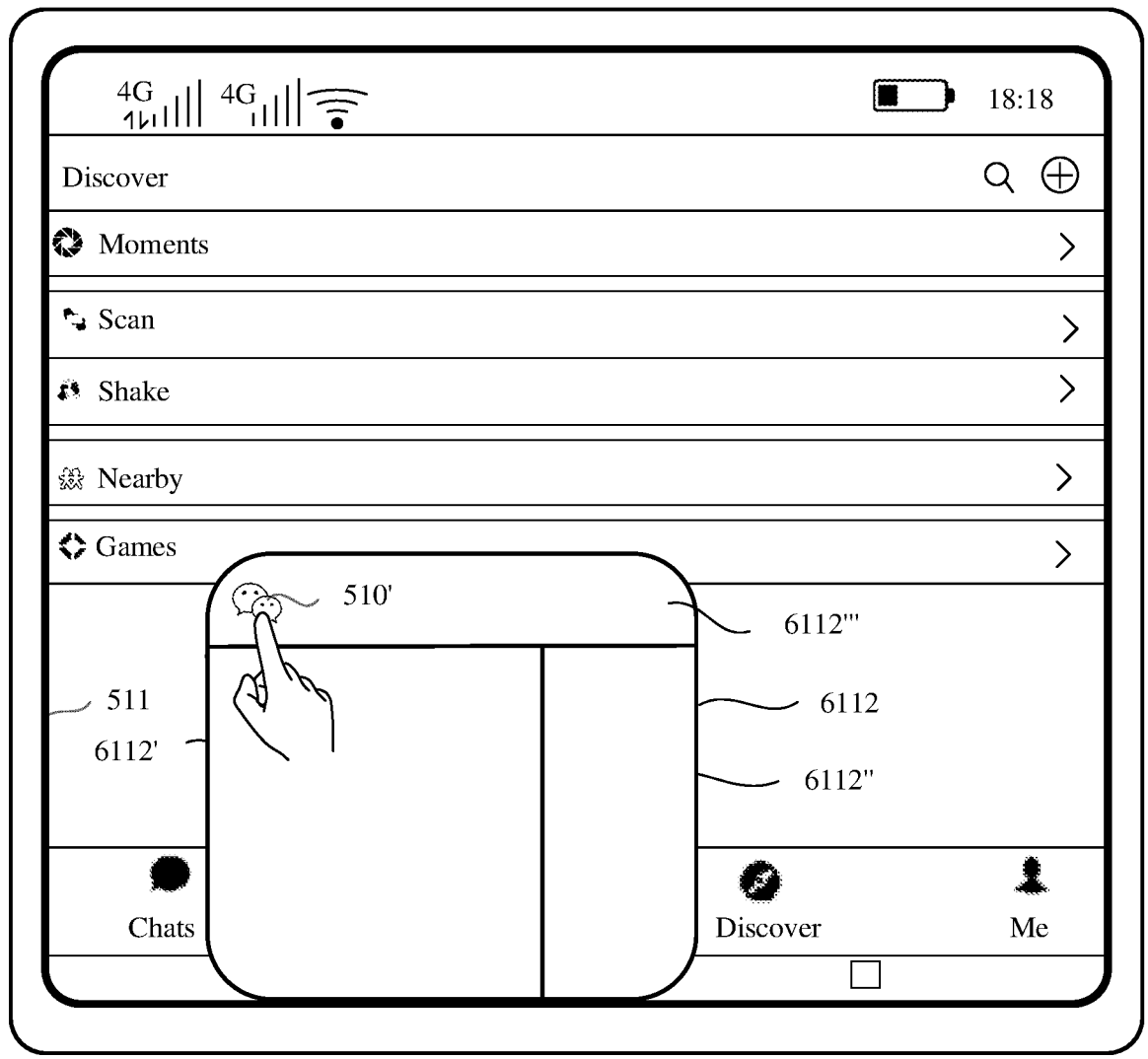
Figure 14E:
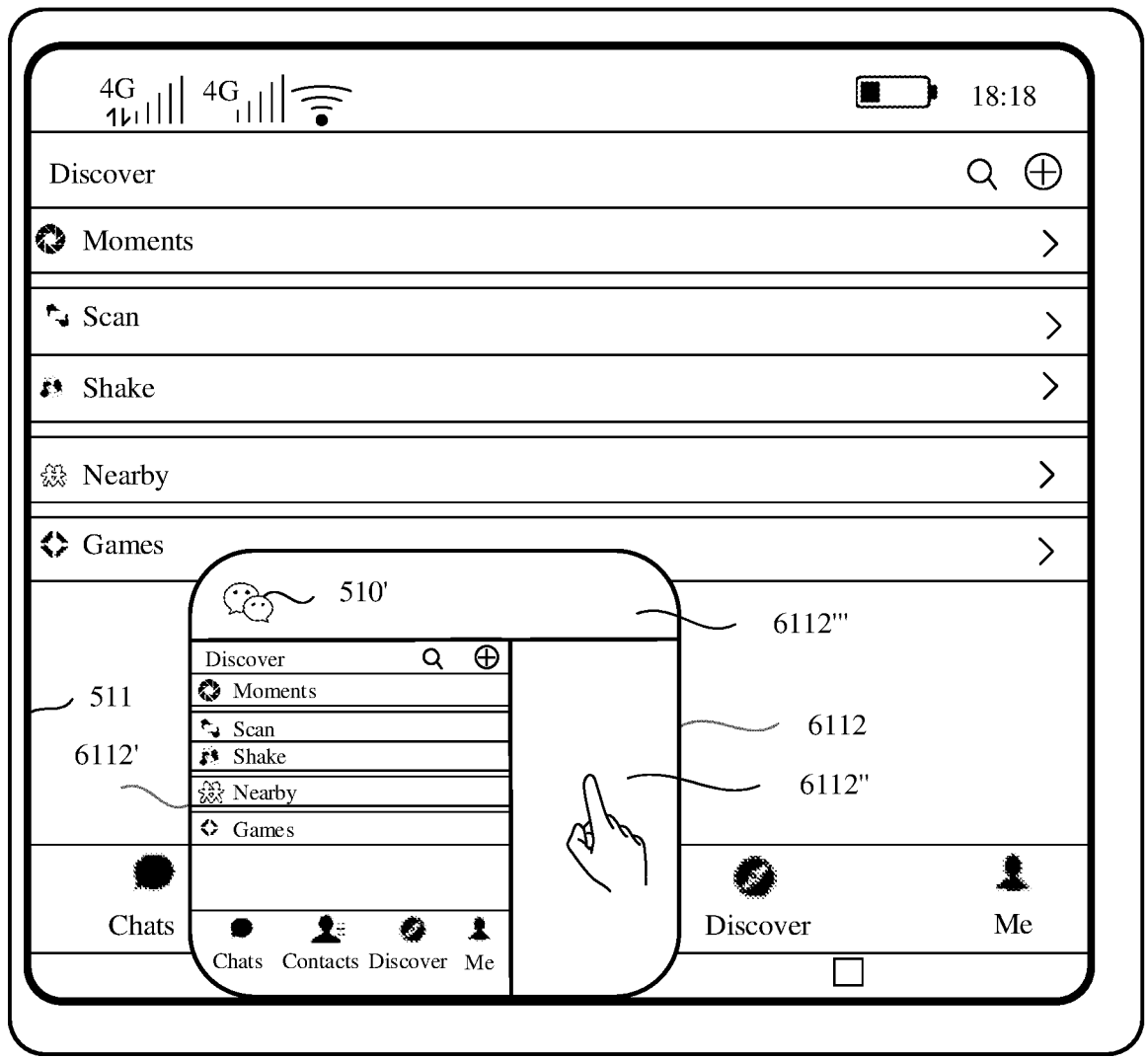
Figure 14F:
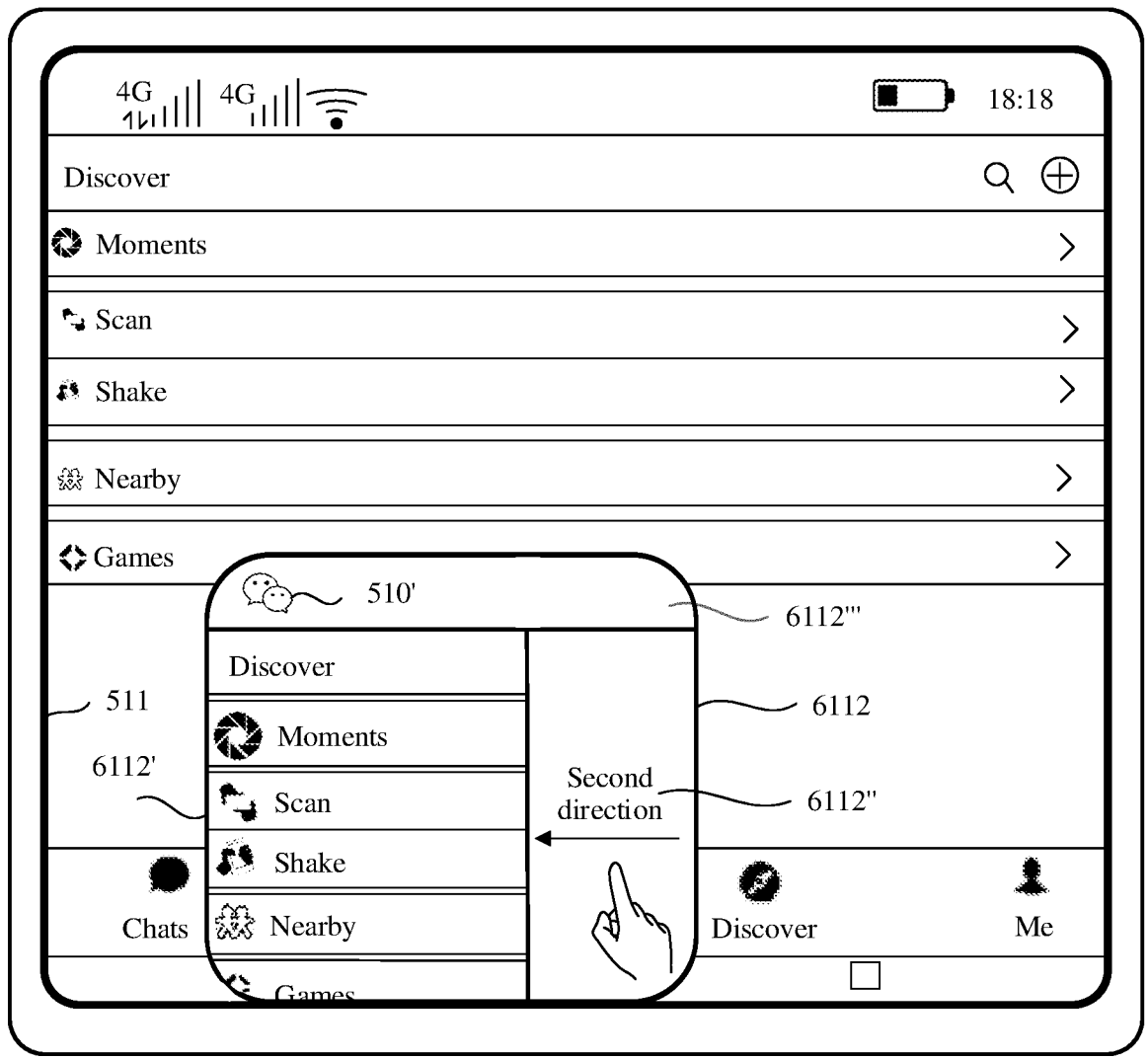
Figure 14G:
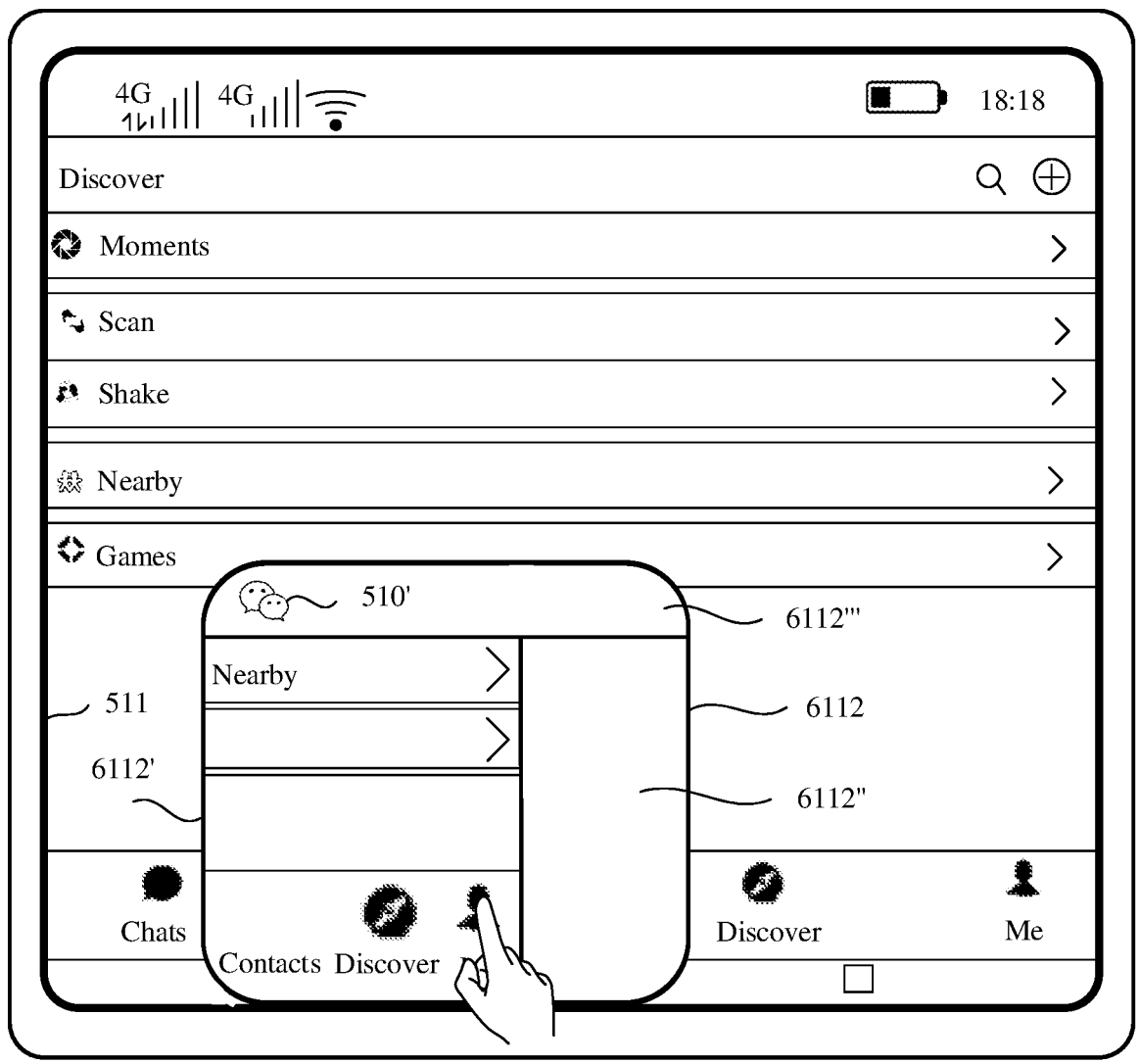
Figure 14H:
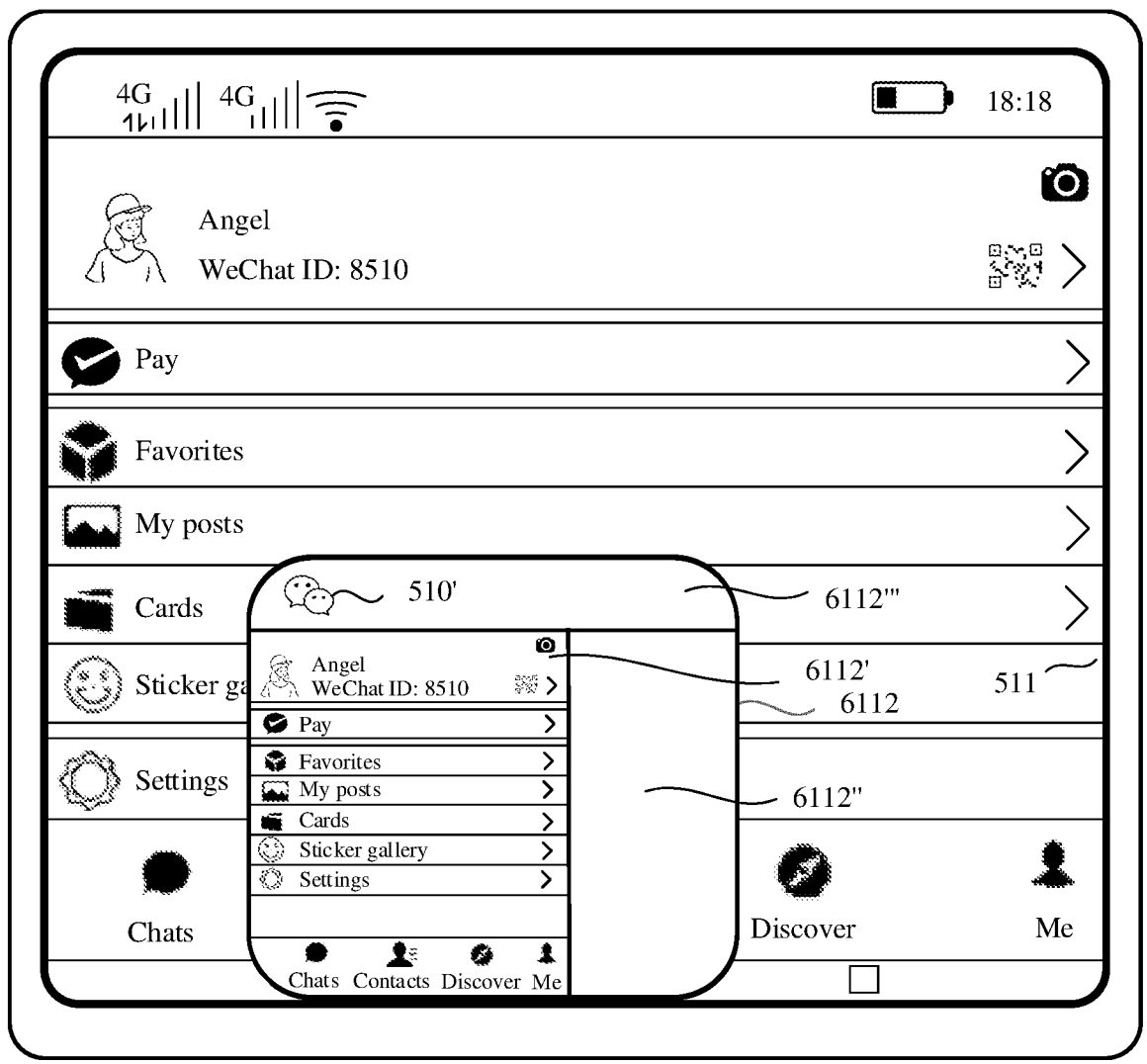

Refer to FIG. 14(a). The foldable electronic device is in an expanded state. In this case, an entire area of the electronic device is a home screen of the electronic device. The home screen of the electronic device includes three home screen pages, and each of the home screen pages includes one or more icons of one or more applications. A second home screen page is currently displayed on the home screen of the electronic device, and the home screen page includes an icon of Alipay, an icon of Task card store, an icon of Weibo, an icon of Albums, an icon of WeChat, an icon of Alarm, an icon of Settings, an icon of Themes, an icon of Phone, an icon of Messages, an icon of Contacts, and an icon of Camera. As shown in FIG. 14(a), when the electronic device detects that the user taps the icon 510 of WeChat with a finger, a display interface of the application "WeChat" is a GUI shown in FIG. 14(b). The display interface 511 includes Chats 520, Contacts 530, Discover 540, and Me 550. As shown in FIG. 14(b), the display interface is an interface displayed after the electronic device detects an operation that the user taps Discover 5113. After detecting an operation that the user slides upward at any location in a blank area in the display interface 511, the electronic device may display a GUI shown in FIG. 14(c). The electronic device displays another display window 6112. An area occupied by the display window 6112 is less than an area occupied by the display interface 511. The display window 6112 may be displayed along four boundary lines of the display interface 511. During the operation that the user slides upward at the any location in the blank area in the display interface 511, a boundary line with a shortest distance from the action in the four boundary lines of the display interface 511 is a boundary line on which the display window 6112 abuts. The display window 6112 may also be displayed at any location in the display interface 511. When the user touches and holds and drags the display window 6112, the user may adjust a location of the display window 6112 in the display interface 511, so that the user conveniently performs a specific operation on content displayed in the display window 6112. The display window 6112 includes three areas: a first area 6112', a second area 6112", and a third area 6112'''. The third area 6112''' displays an application list currently opened by the electronic device. The application list may be an icon of an application, or the application list may be a thumbnail of an application opening interface. In this case, as shown in FIG. 14(c), the third area 6112''' displays an icon 510' of the application "WeChat" currently opened by the electronic device. In a GUI shown in FIG. 14(d), the user taps the icon 510'. After the electronic device detects an operation that the user taps the icon 510', the first area 6112' may display a GUI shown in FIG. 14(e). Content displayed in the first area 6112' is content displayed in the display interface 511, that is, an interface currently displayed by the application "WeChat". In this case, it may be understood that the content displayed in the display interface 511 is mirrored to the first area 6112', to be specific, the content displayed in the first area 6112' is the same as the content displayed in the display interface 511. A unique difference lies in that a size of the display interface 511 is different from a size of the first area 6112'. After the electronic device detects an operation that the user double-taps the second area 6112", the first area 6112' may display a GUI shown in FIG. 14(f), that is, the content displayed in the first area 6112' shown in FIG. 14(e) is scaled up. In this case, content displayed in the first area 6112' is a part of the content displayed in the first area 6112' shown in FIG. 14(e). When the user needs to perform an operation on "Me" in the application WeChat, the user needs to slide along a second direction in the second area 6112", so that "Me" is in a range in which the user can perform an operation. To be specific, after the electronic device detects an operation that the user slides along the second direction in the second area 6112", content displayed in the second area 6112" may be shown in FIG. 14(g). When the electronic device detects that the user taps the control "Me", as shown in FIG. 14(h), the content displayed in the second area 6112" is synchronized with the content displayed in the first interface 511.

FIG. 15(a) to FIG. 15(h) show GUIs of a mobile phone. FIG. 15(a) to FIG. 15(h) show a process in which a display interface on a home screen of the mobile phone changes when a user performs an operation on the mobile phone.

Figure 15A:
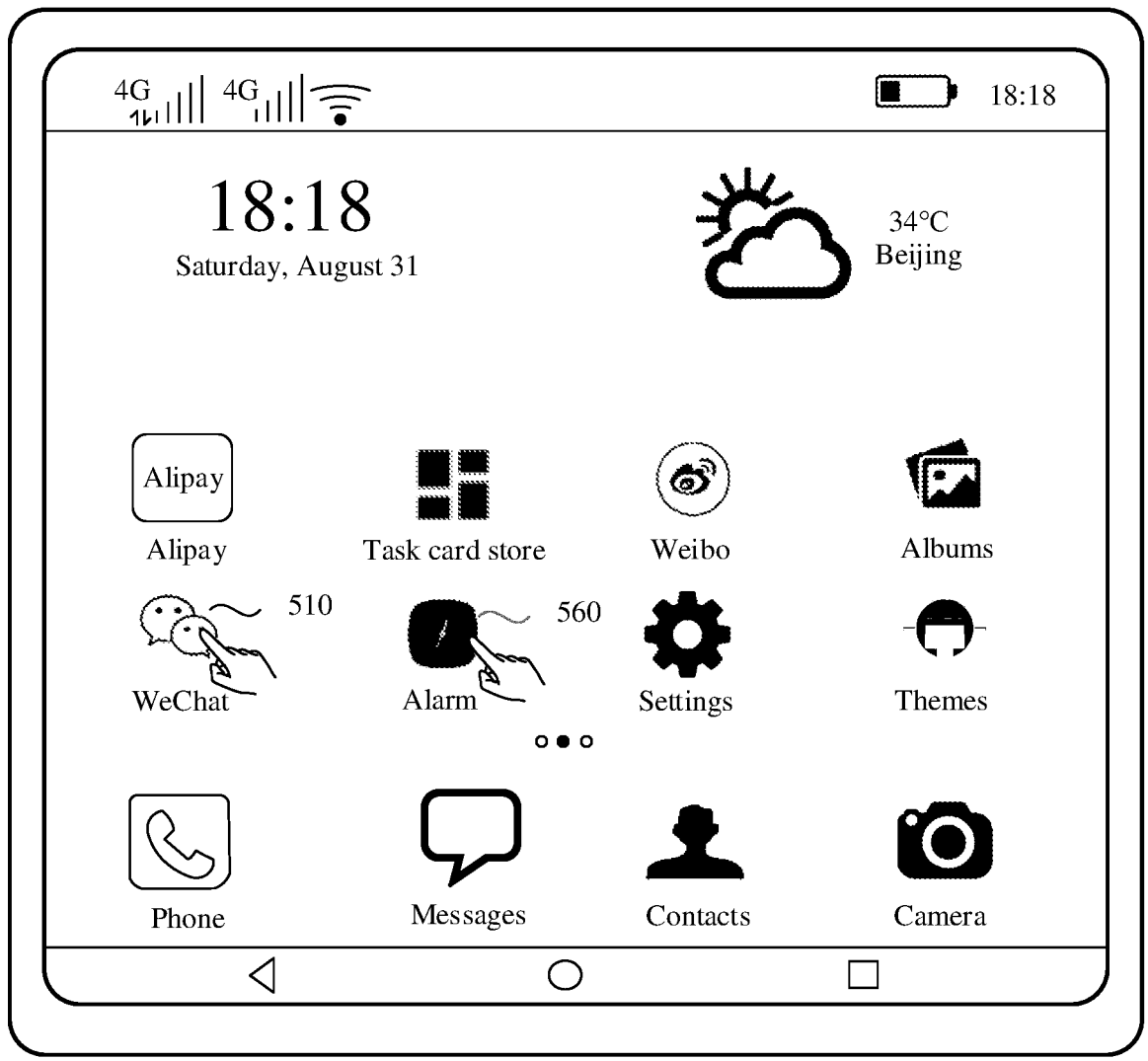
FIG. 15(*a*) to FIG. 15(*h*) are a schematic diagram of still another group of GUIs according to an embodiment of this application.
Figure 15B:
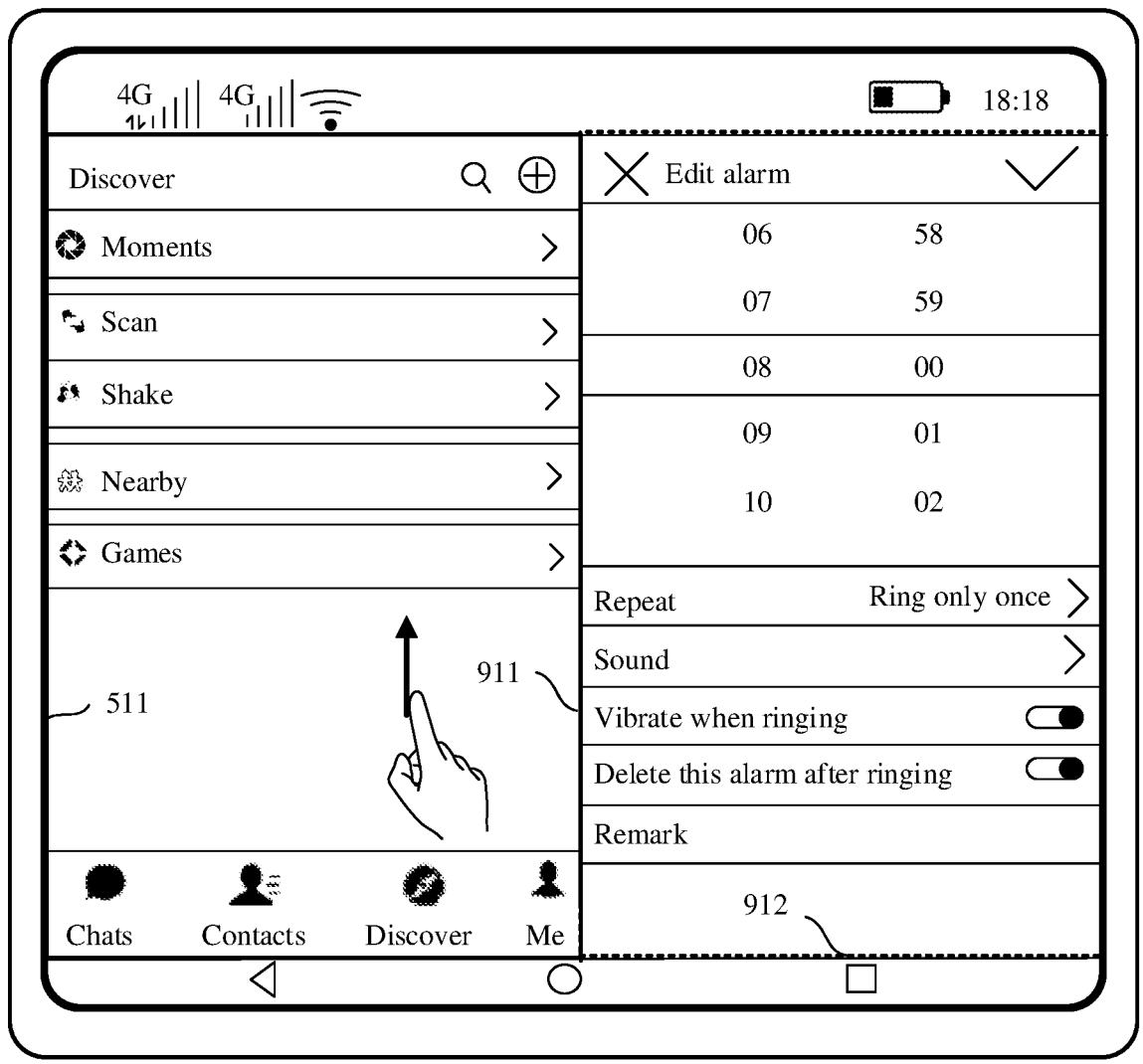
Figure 15C:
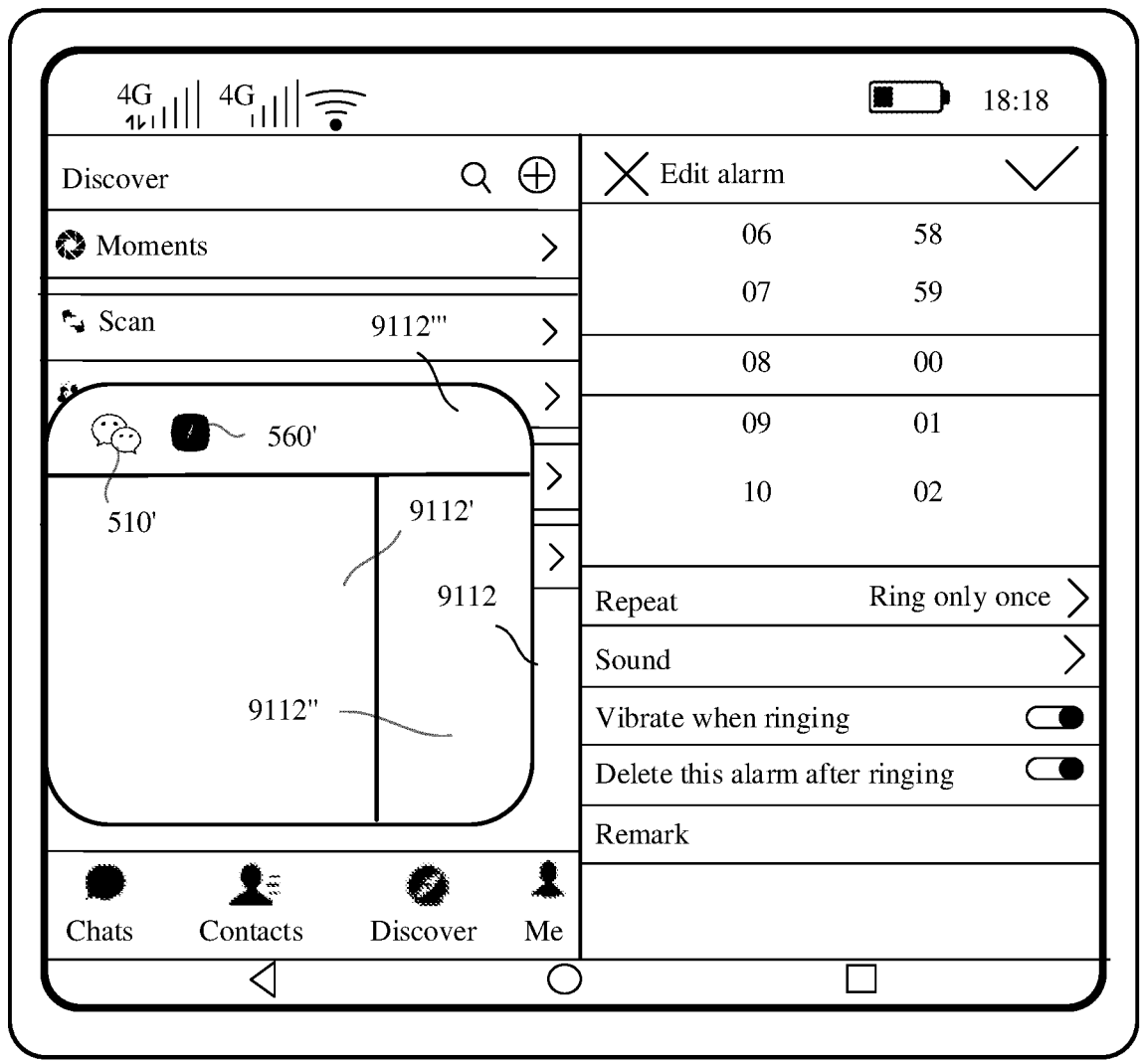
Figure 15D:
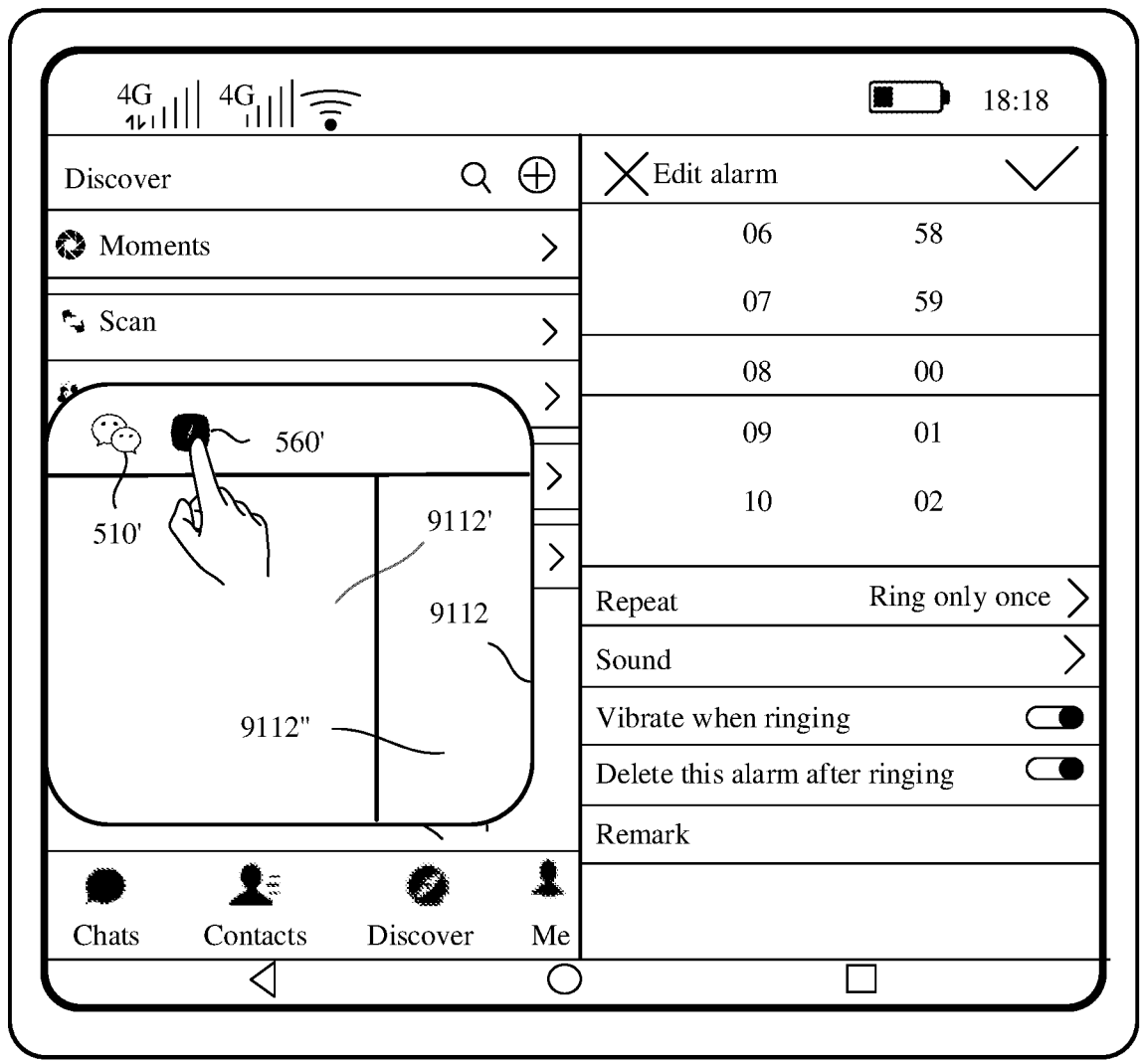
Figure 15E:
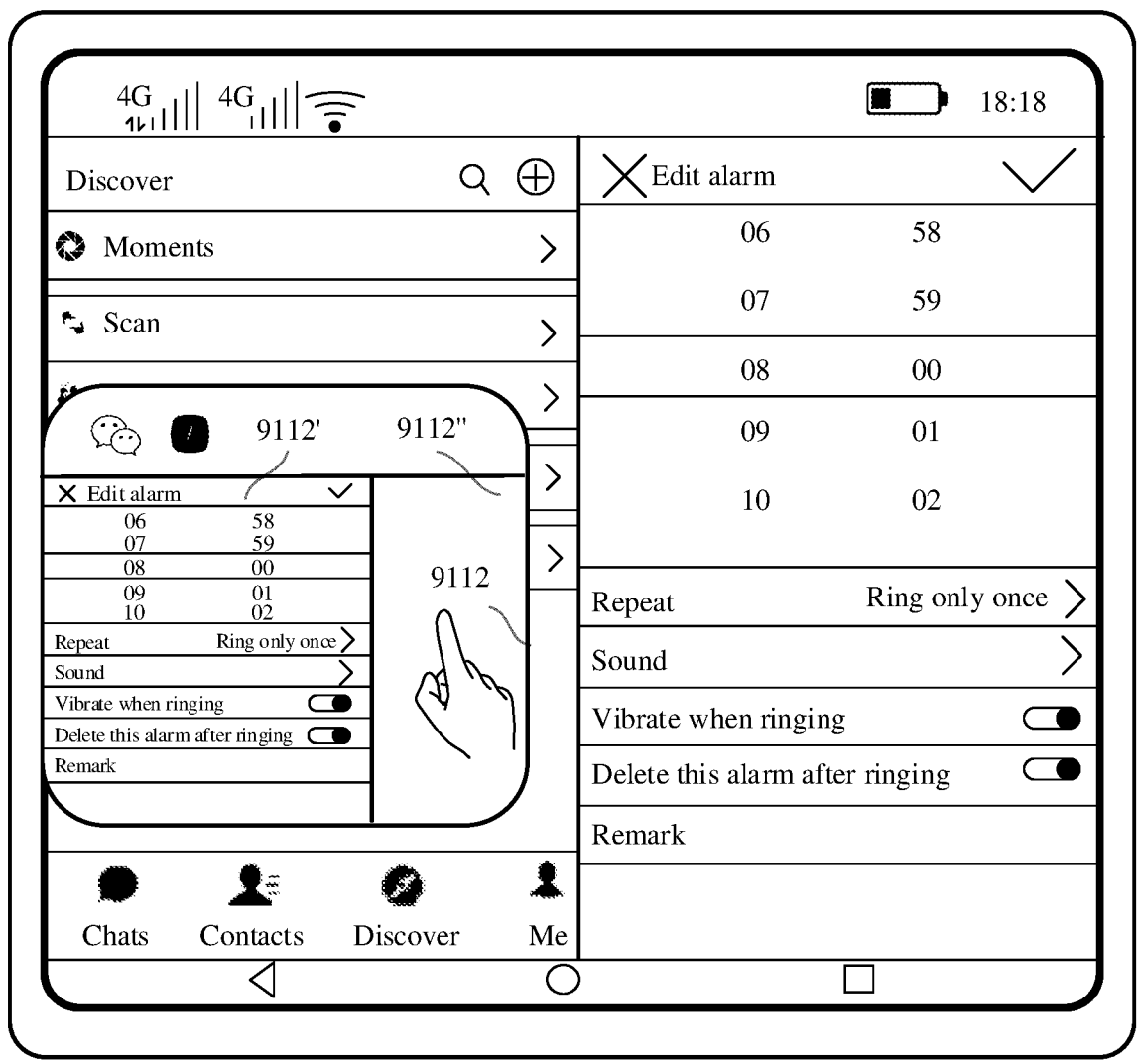
Figure 15F:
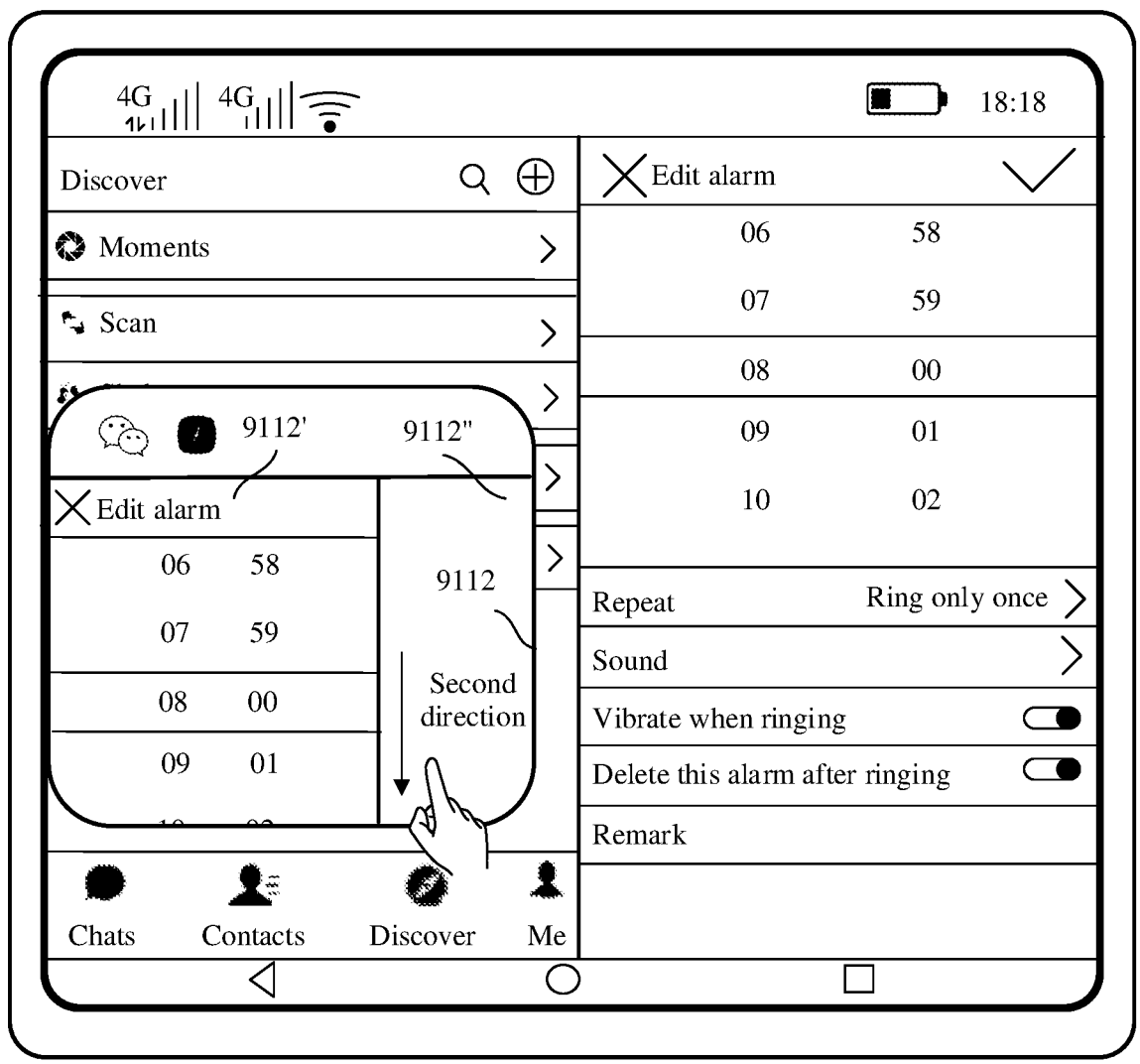
Figure 15G:
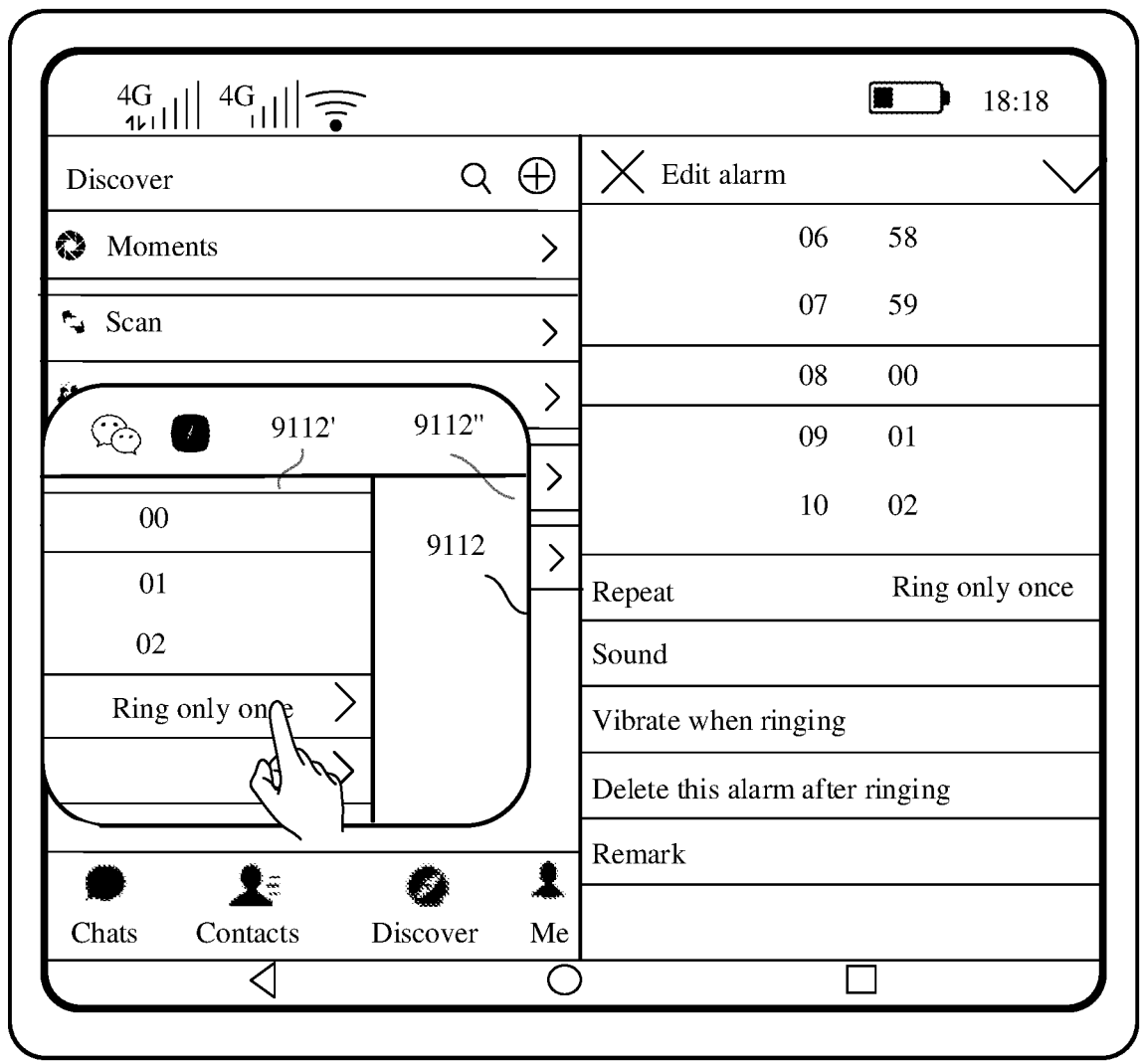
Figure 15H:
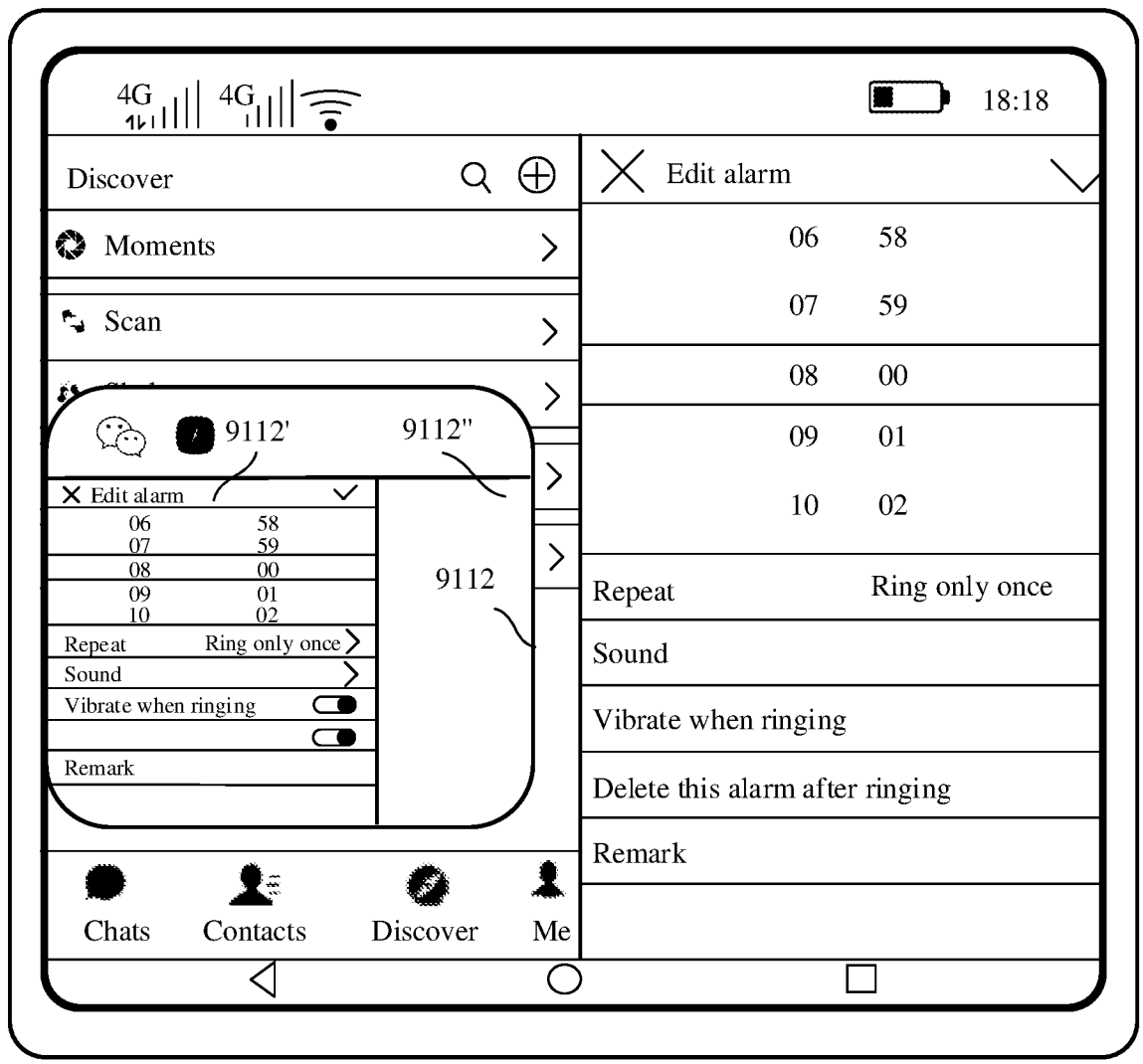

Refer to FIG. 15(a). The foldable electronic device is in an expanded state. In this case, an entire area of the electronic device is a home screen of the electronic device. The home screen of the electronic device includes three home screen pages, and each of the home screen pages includes one or more icons of one or more applications. A second home screen page is currently displayed on the home screen of the electronic device, and the home screen page includes an icon of Alipay, an icon of Task card store, an icon of Weibo, an icon of Albums, an icon of WeChat, an icon of Alarm, an icon of Settings, an icon of Themes, an icon of Phone, an icon of Messages, an icon of Contacts, and an icon of Camera. As shown in FIG. 15(a), when the electronic device separately detects that the user taps the icon 510 of WeChat with a finger and the user taps the icon 560 of Alarm with a finger, a display interface 911 of the application "WeChat" and a display interface 912 of the application "Alarm" may be GUIs shown in FIG. 15(b). The display interface 911 of the application "WeChat" and the display interface 912 of the application "Alarm" fully occupy the home screen of the electronic device. After detecting an operation that the user slides upward at any location in a blank area in a display interface 511, the electronic device may display a GUI shown in FIG. 15(c). The electronic device displays another display window 9112. An area occupied by the display window 9112 is less than an area occupied by the display interface 511. The display window 9112 may be displayed along four boundary lines of the display interface 511. During the operation that the user slides upward at the any location in the blank area in the display interface 511, a boundary line with a shortest distance from the action in the four boundary lines of the display interface 511 is a boundary line on which the display window 9112 abuts. The display window 9112 may also be displayed at any location in the display interface 511. When the user touches and holds and drags the display window 9112, the user may adjust a location of the display window 9112 in the display interface 511, so that the user conveniently performs a specific operation on content displayed in the display window 9112. The display window 9112 includes three areas: a first area 9112', a second area 9112", and a third area 9112'''. The third area 9112' displays an application list currently opened by the electronic device. The application list may be an icon of an application, or the application list may be a thumbnail of an application opening interface. In this case, as shown in FIG. 15(c), the third area 6112' displays an icon 510' of the application "WeChat" currently opened by the electronic device and an icon 560' of the application "Alarm" currently opened by the electronic device. In a GUI shown in FIG. 15(d), the user taps the icon 560'. After the electronic device detects an operation that the user taps the icon 560', the first area 9112' may display a GUI shown in FIG. 15(e). Content displayed in the first area 9112' is content displayed in the display interface 912, that is, an interface currently displayed by the application "Alarm". In this case, it may be understood that the content displayed in the display interface 912 is mirrored to the first area 9112', to be specific, the content displayed in the first area 9112' is the same as the content displayed in the display interface 912. A unique difference lies in that a size of the display interface 912 is different from a size of the first area 9112'. After the electronic device detects an operation that the user double-taps the second area 9112", the first area 9112' may display a GUI shown in FIG. 15(f), that is, the content displayed in the first area 9112' shown in FIG. 15(e) is scaled up. In this case, content displayed in the first area 9112' is a part of the content displayed in the first area 9112' shown in FIG. 15(e). When the user needs to perform an operation on "Ring only once" in the application Alarm, the user needs to slide along a second direction in the second area 9112", so that "Ring only once" is in a range in which the user can perform an operation. To be specific, after the electronic device detects an operation that the user slides along the second direction in the second area 9112", content displayed in the second area 9112" may be shown in FIG. 15(g). When the electronic device detects that the user taps the control "Ring only once", as shown in FIG. 15(h), the content displayed in the second area 9112" is synchronized with the content displayed in the first interface 511.

Figure 16:
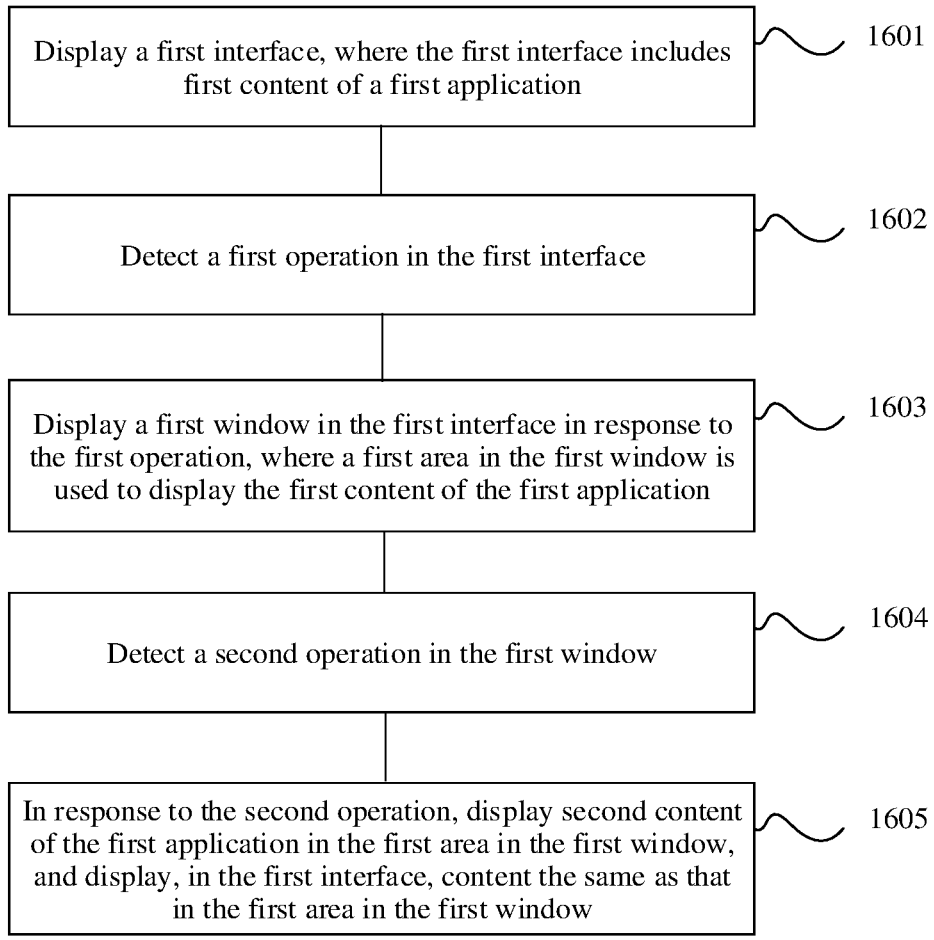
FIG. 16 is a schematic flowchart of an operation method 1600 according to an embodiment of this application.

With reference to the foregoing embodiments and related accompanying drawings, an embodiment of this application provides an operation method. The method may be implemented on an electronic device (for example, a mobile phone or a tablet computer) having a foldable touchscreen, or the method may be implemented on an electronic device (for example, a mobile phone or a tablet computer) having a touchscreen. As shown in FIG. 16, the method 1600 may include the following steps.

S1601: Display a first interface, where the first interface includes first content of a first application.

Optionally, there may be one or more first applications.

For example, as shown in FIG. 7(b), the electronic device displays a WeChat interface in the first interface 511, the first application is WeChat, and the first content may be content displayed after a discover interface in WeChat is tapped.

Figure 9B:
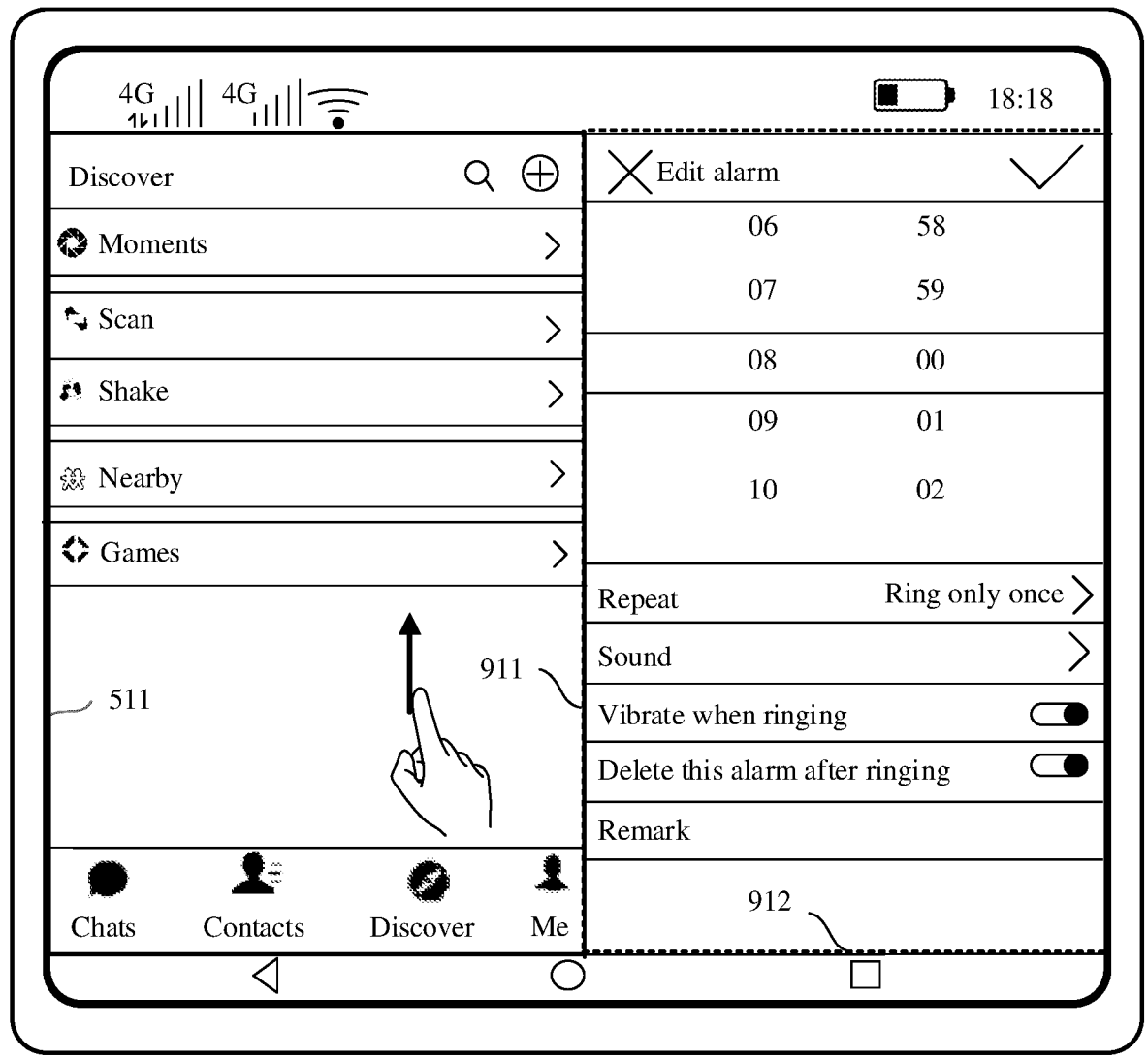
Figure 9C:
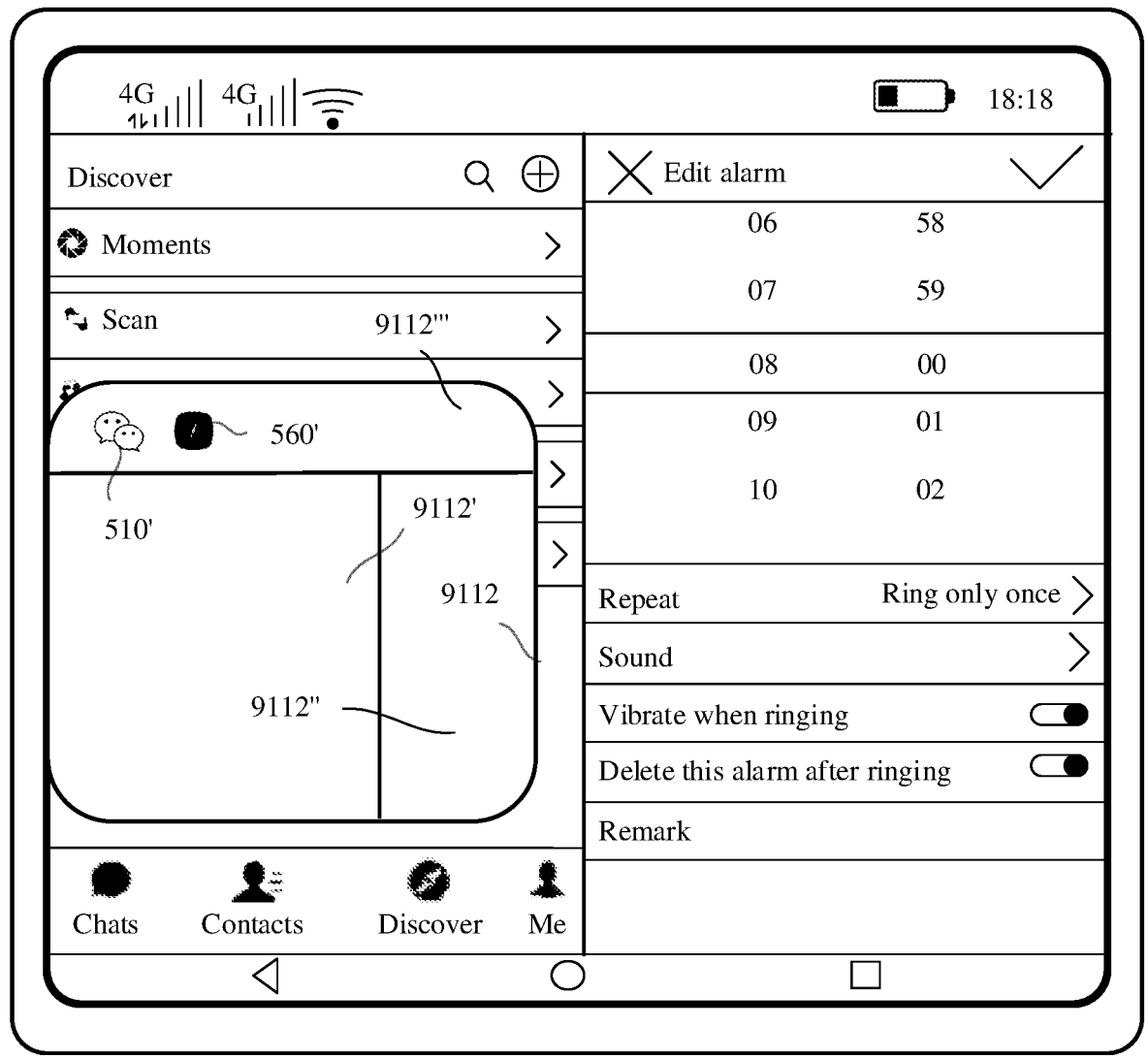
Figure 9D:
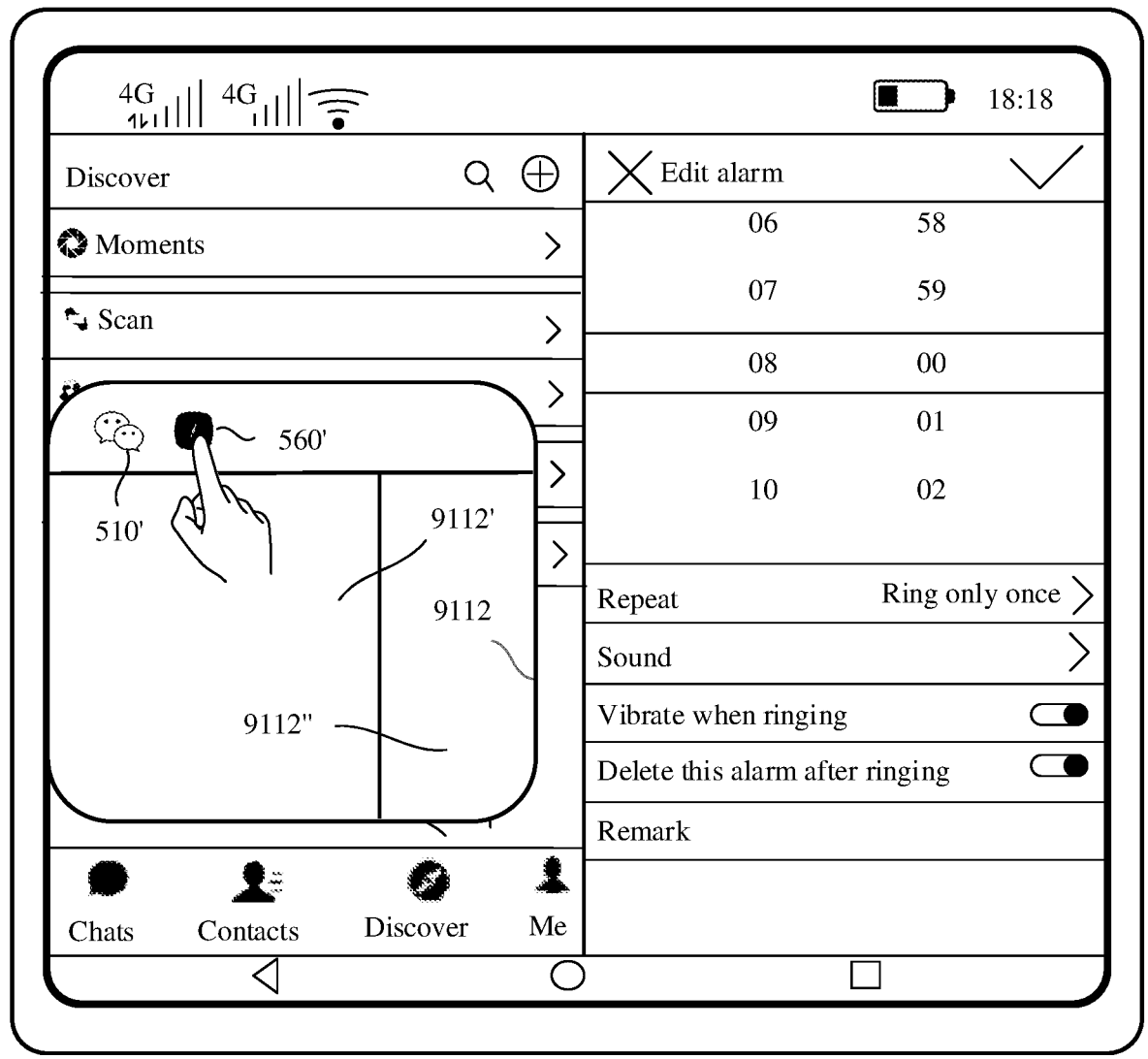

For example, as shown in FIG. 9(b), the electronic device displays content of two applications in the first interface 511. The first applications are WeChat and Alarm. A WeChat interface is displayed in the first window 911, and content of Discover is displayed in the WeChat interface. The electronic device displays an Alarm interface in the third interface 912, and the first content may be content displayed after an icon of Alarm is tapped.

S1602: Detect a first operation in the first interface.

For example, the first operation may be an operation of sliding upward at any location in a blank area in the display interface 511.

Optionally, the first operation may alternatively be a touch and hold operation, a double-tap operation, or the like detected by the electronic device in the first interface.

S1603: Display a first window in the first interface in response to the first operation, where a first area in the first window is used to display the first content of the first application.

For example, the first area may be the area 5112', the area 6112', or the area 9112'.

For example, as shown in FIG. 7(e), the content presented in the area 5112' may be the first content.

For example, as shown in FIG. 8(e), the content presented in the area 6112' may be the first content.

Figure 9E:
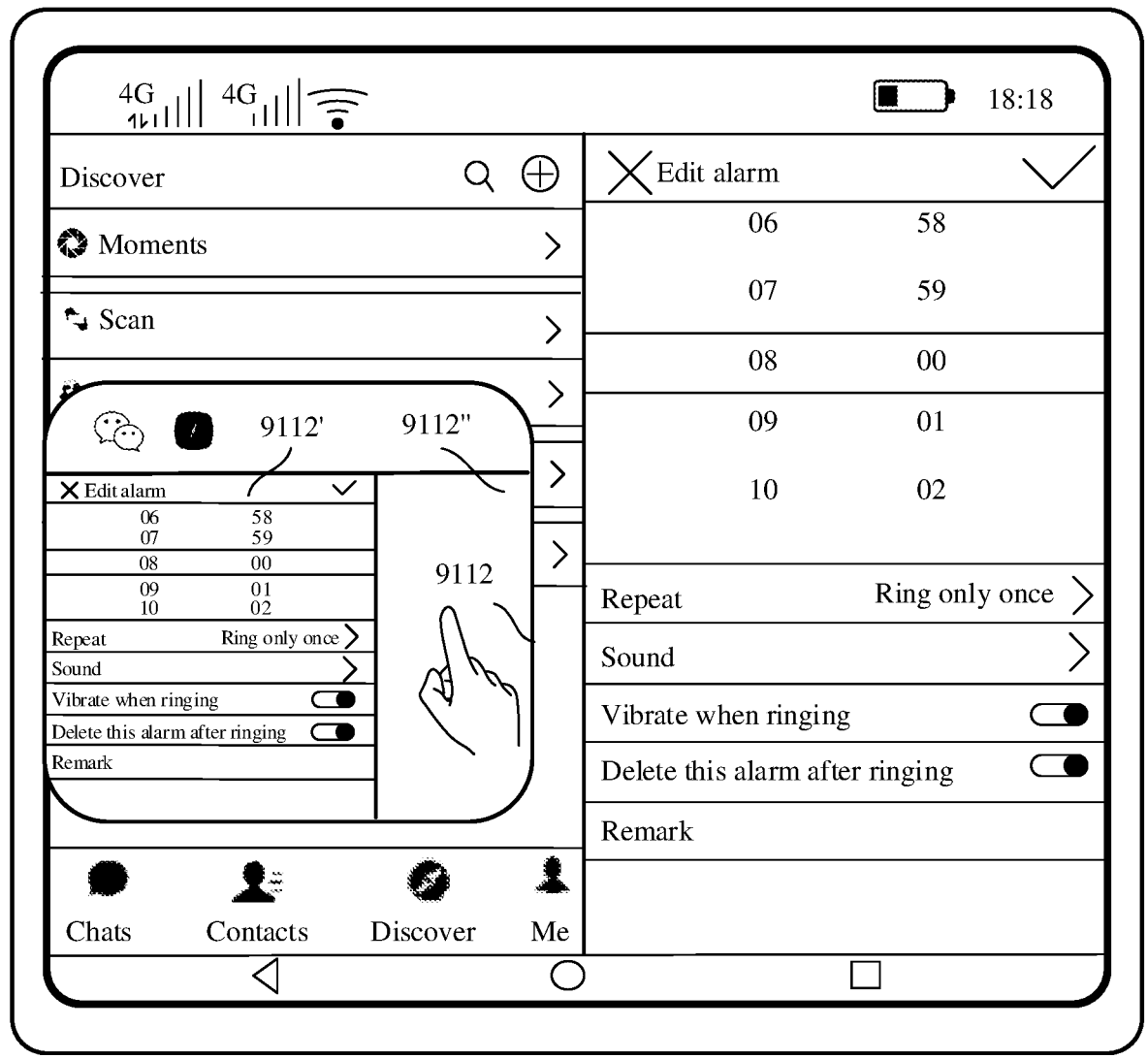
Figure 9F:
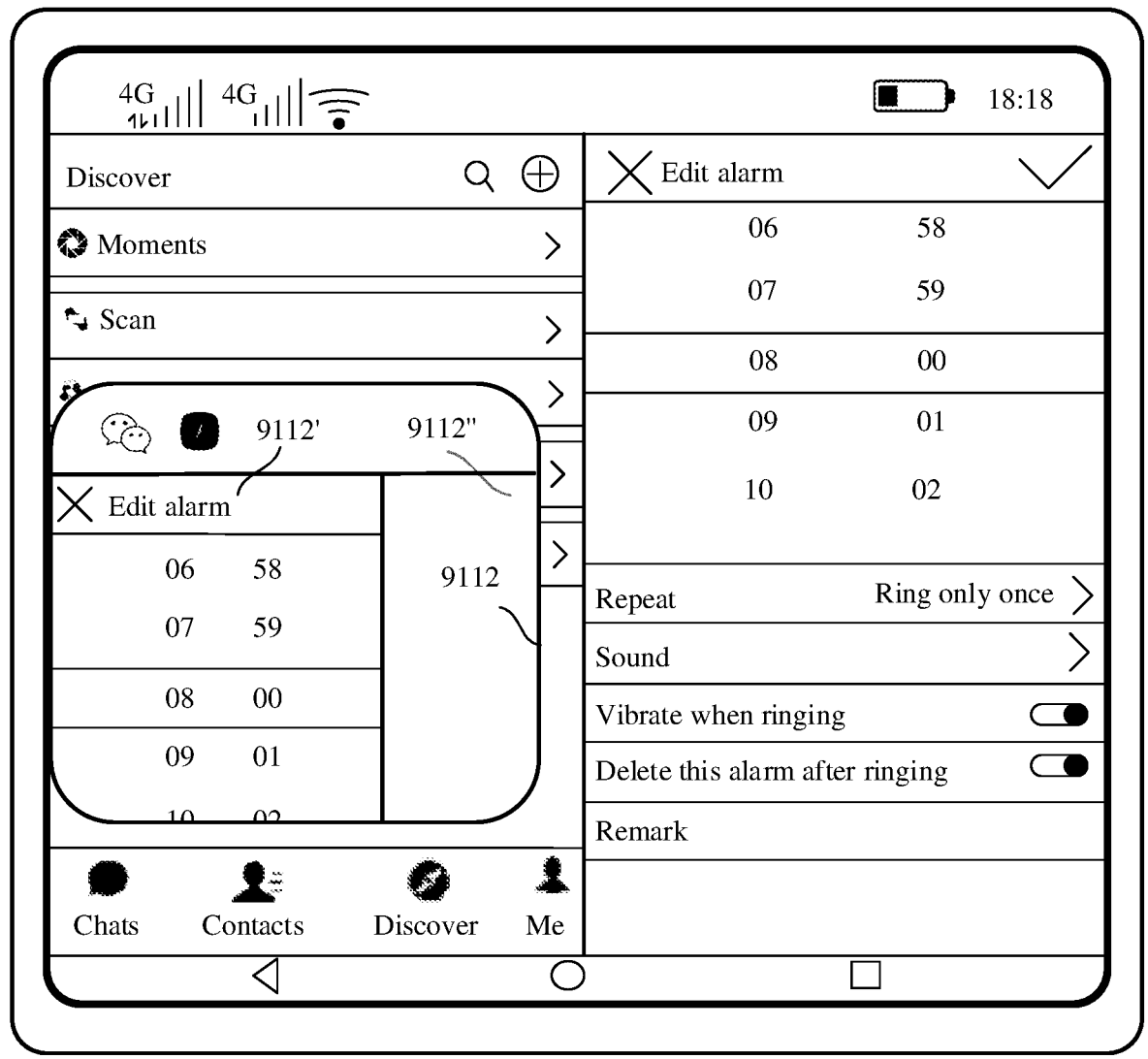
Figure 9G:
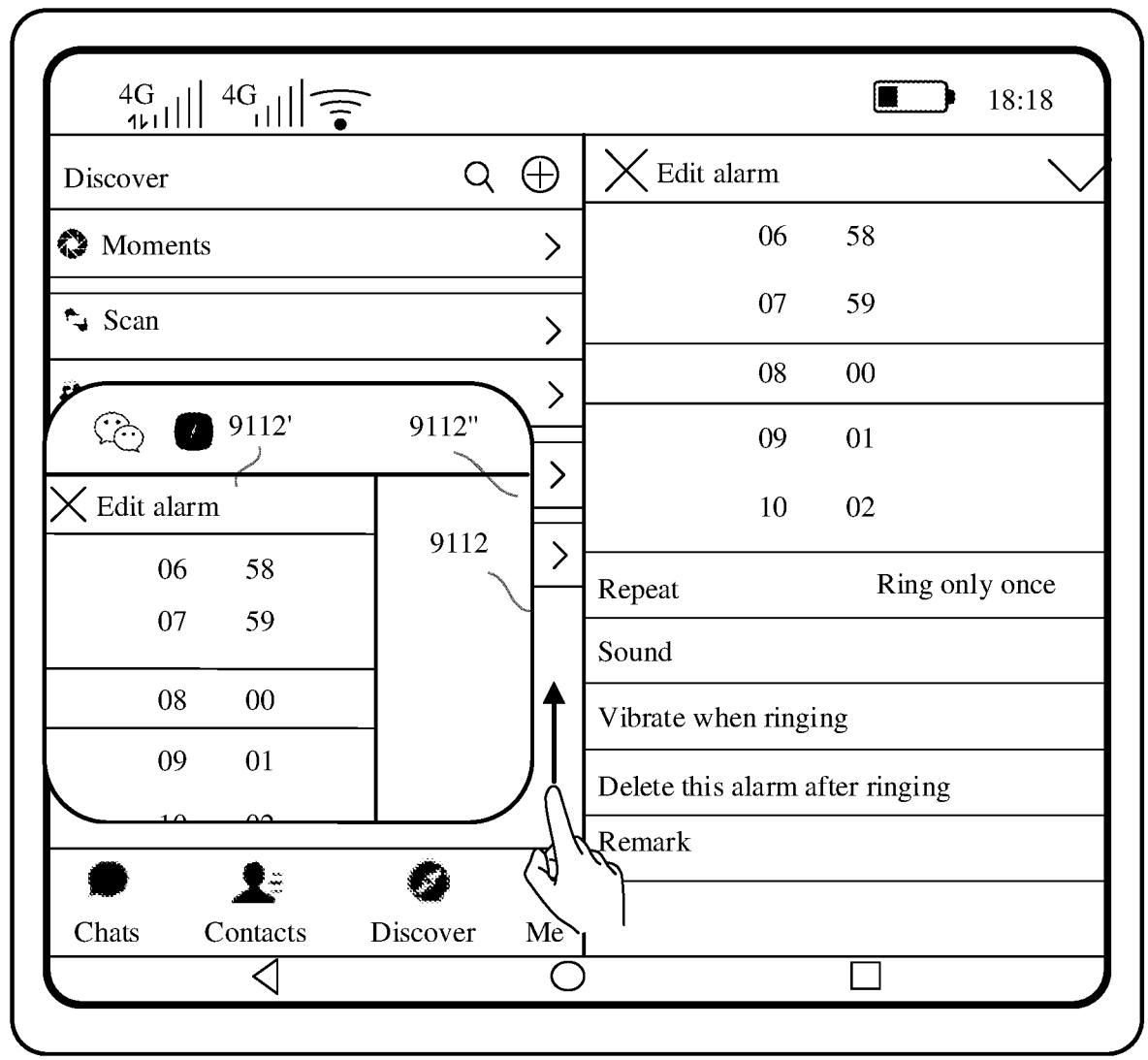
Figure 9H:
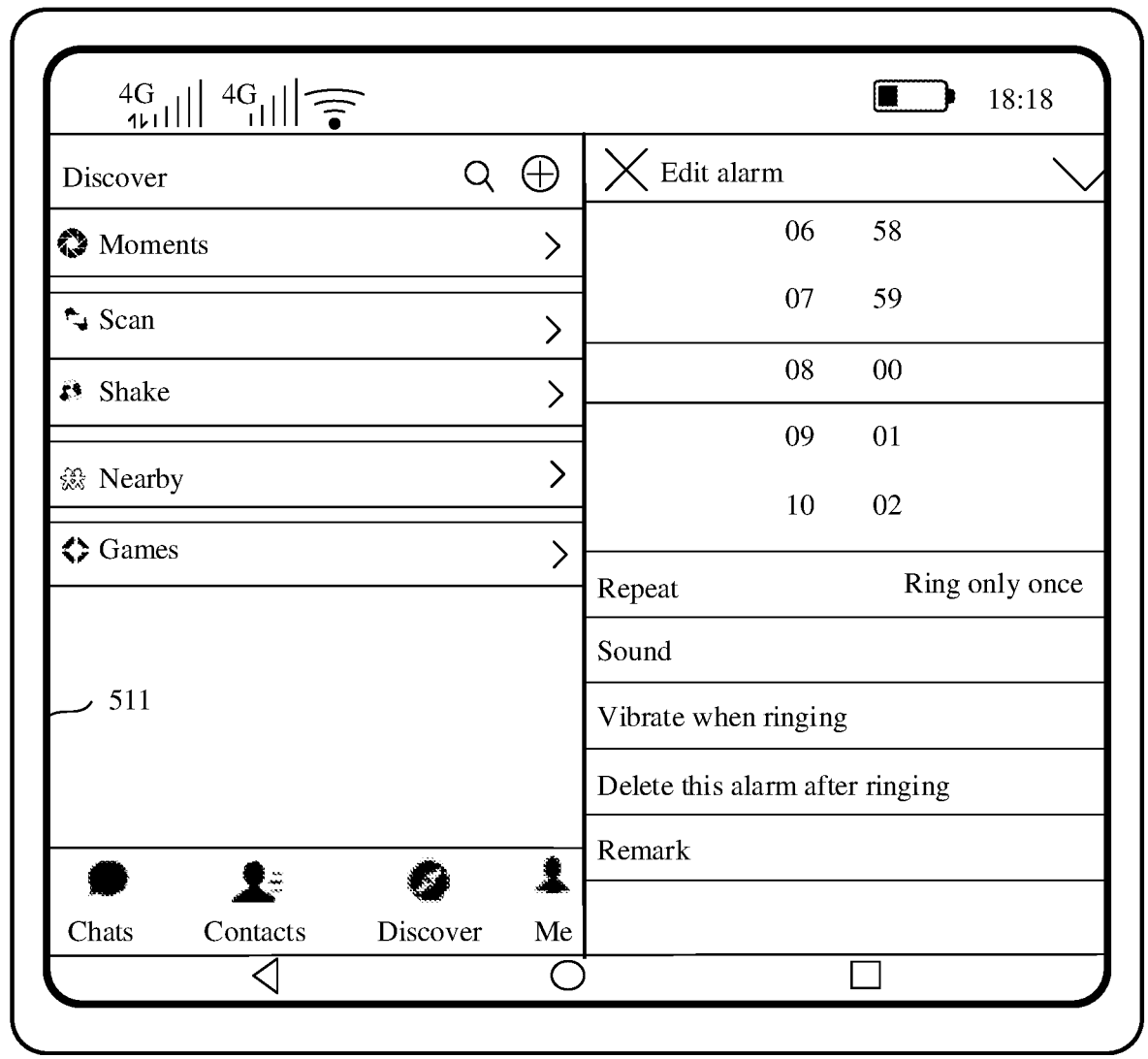

For example, as shown in FIG. 9(e), the content presented in the area 9112' may be the first content.

Figure 10A:
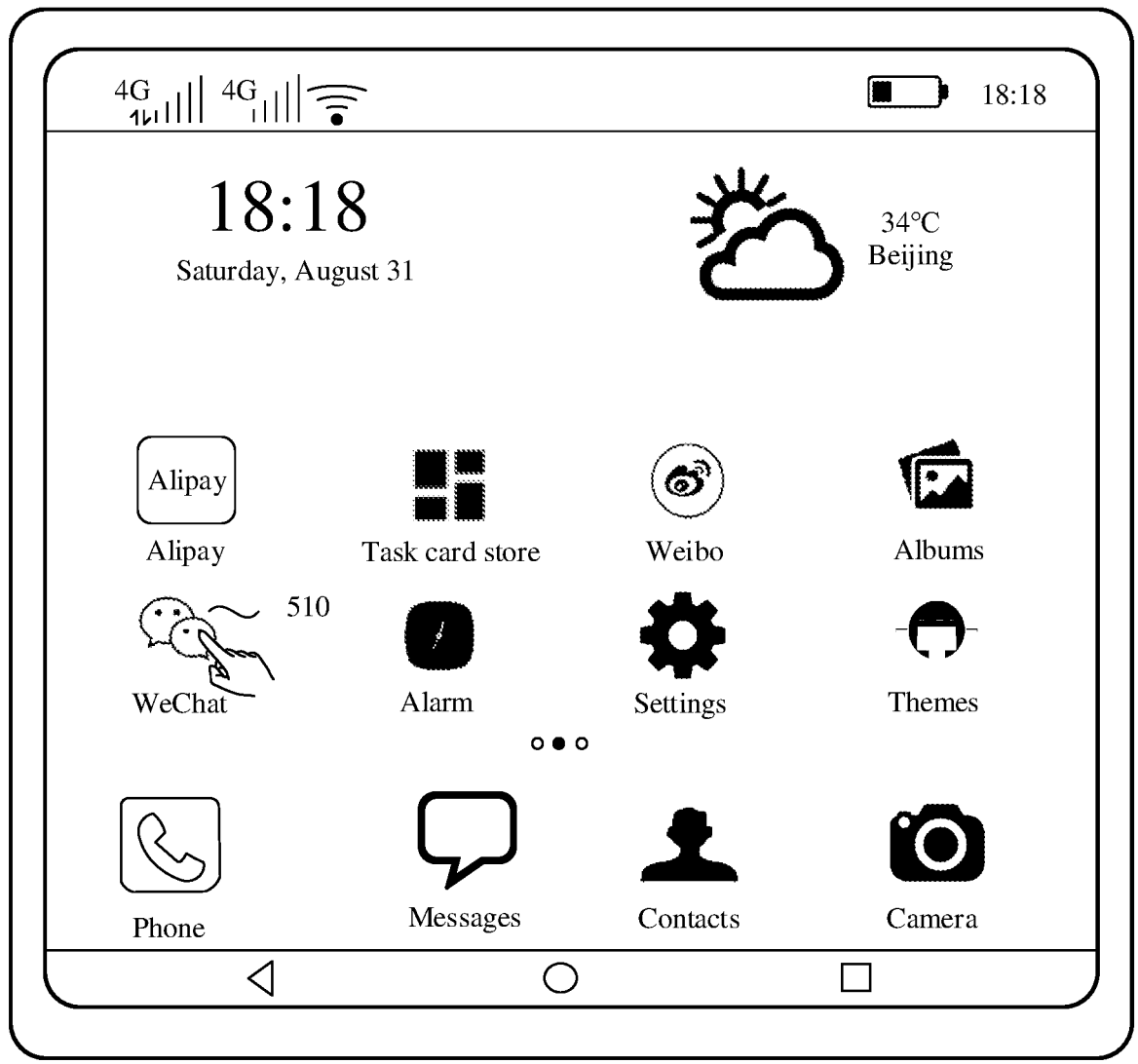
FIG. 10(*a*) to FIG. 10(*h*) are a schematic diagram of still another group of GUIs according to an embodiment of this application.
Figure 10B:
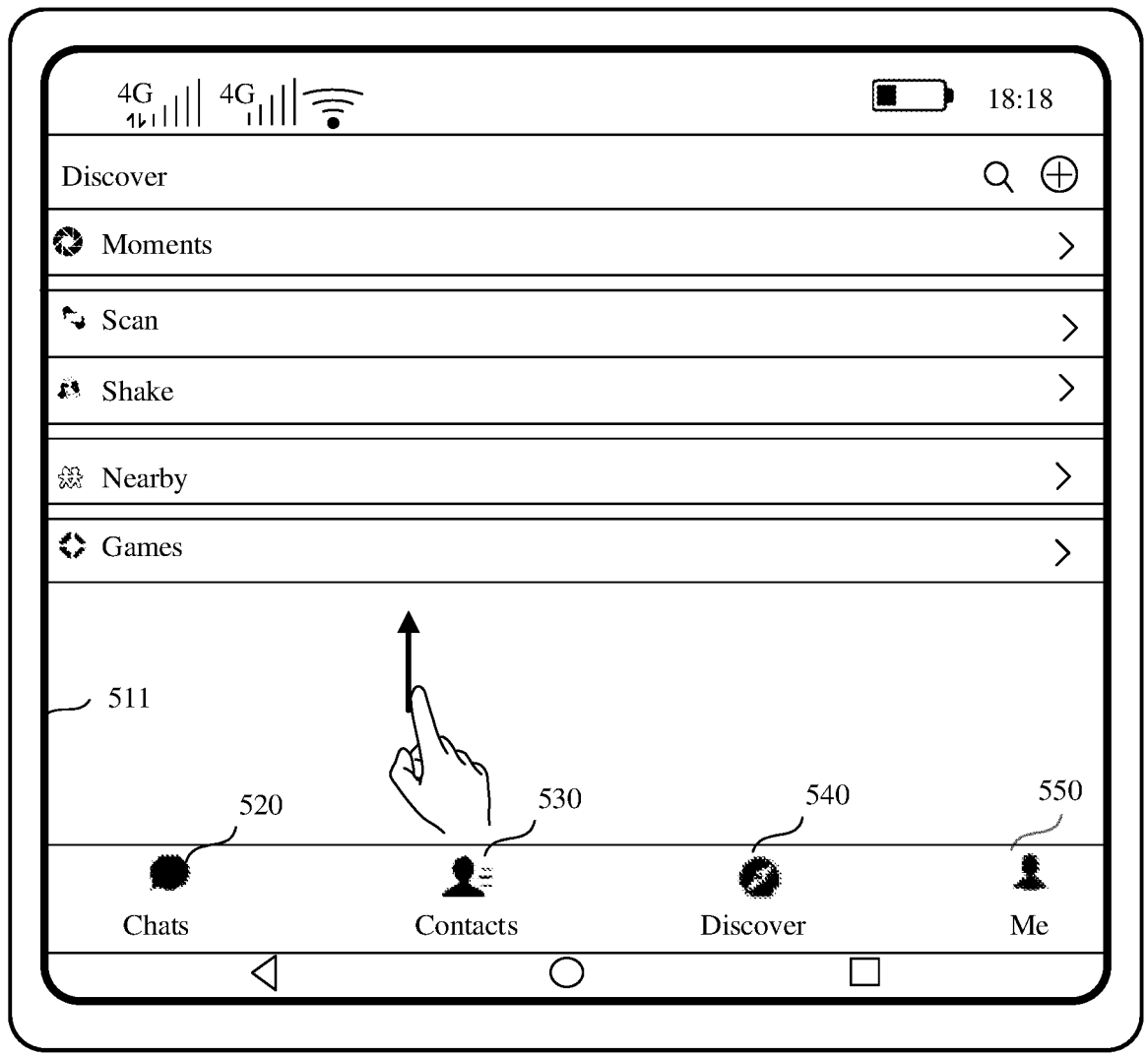
Figure 10C:
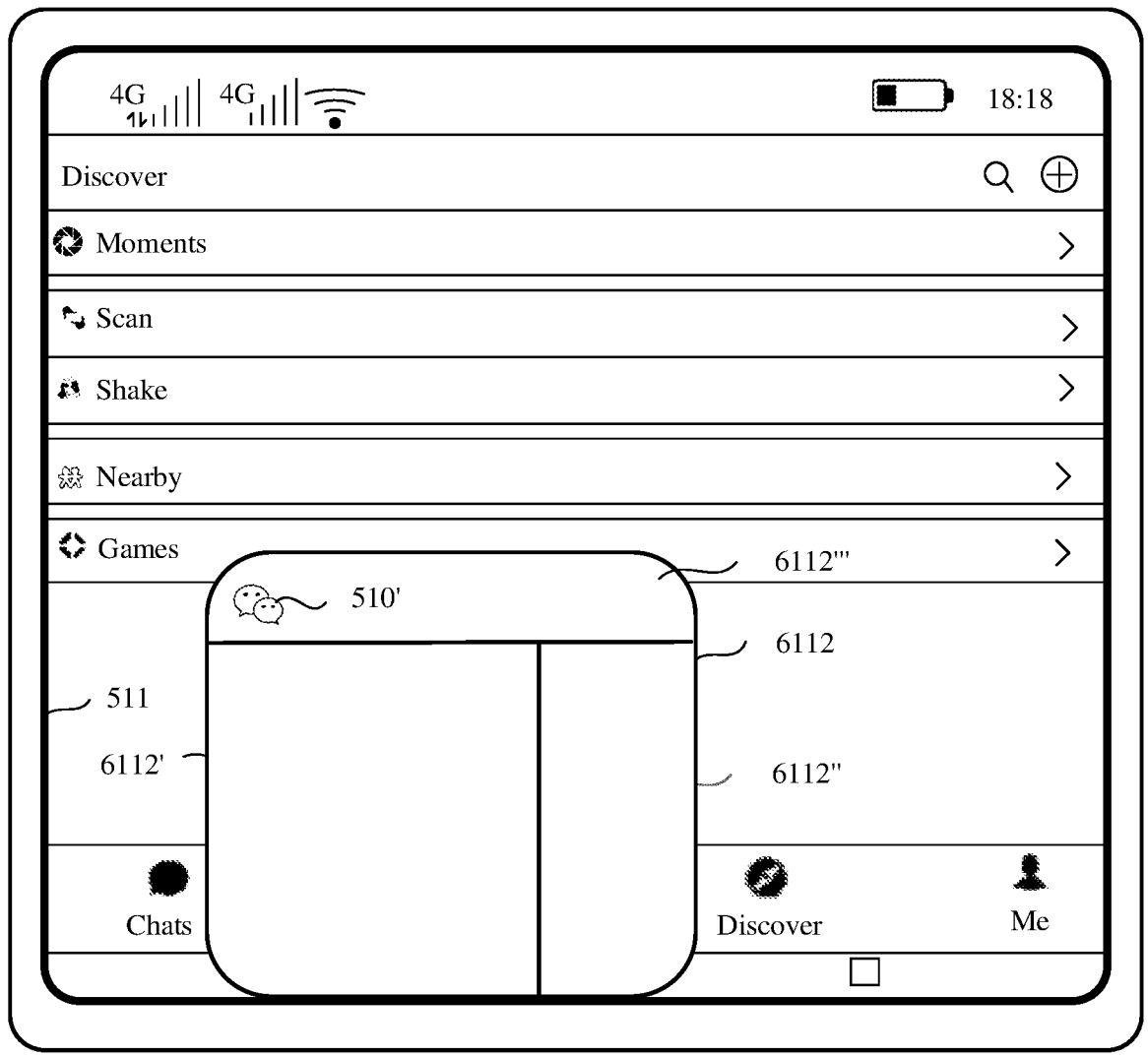
Figure 10D:
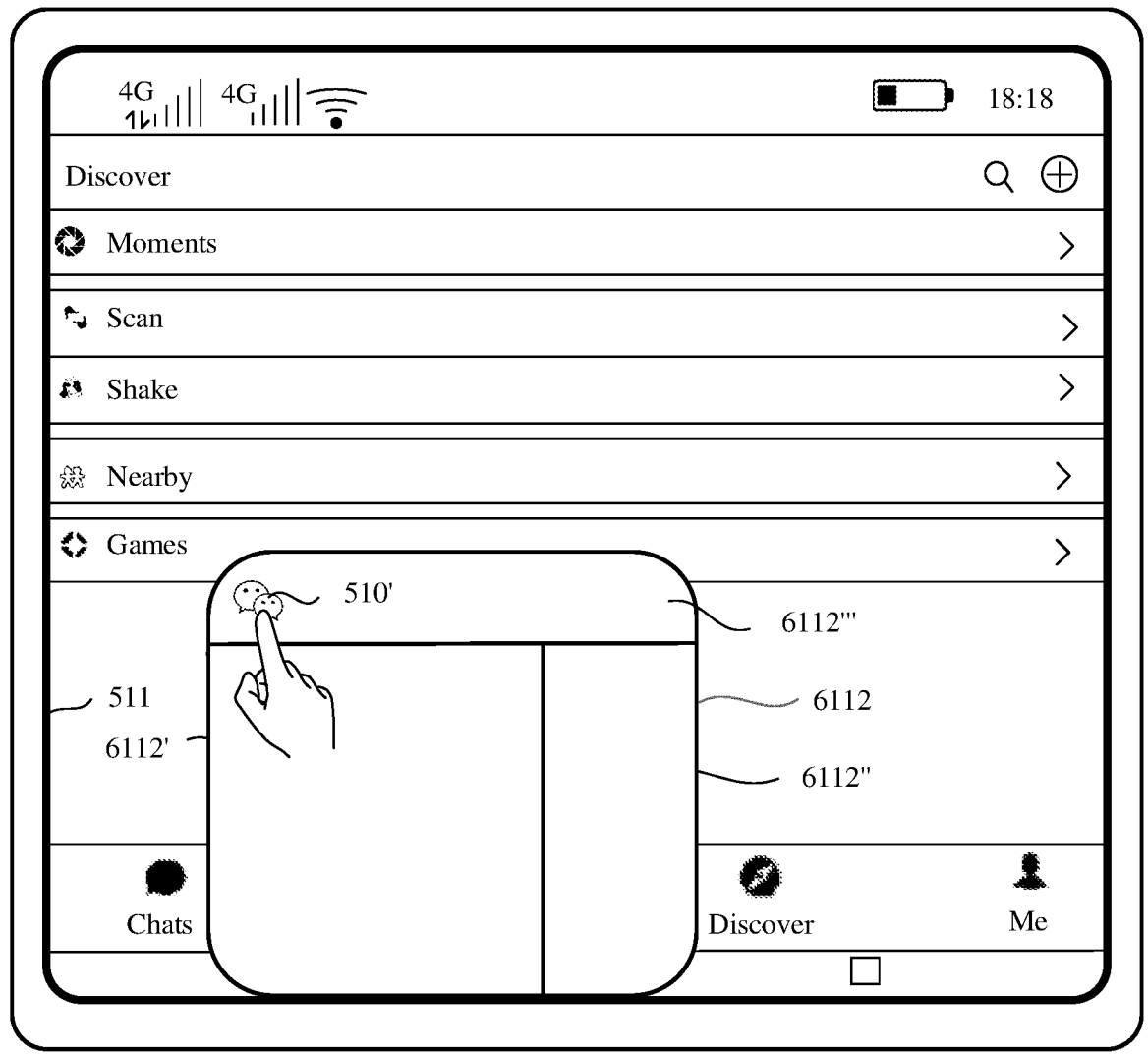
Figure 10E:
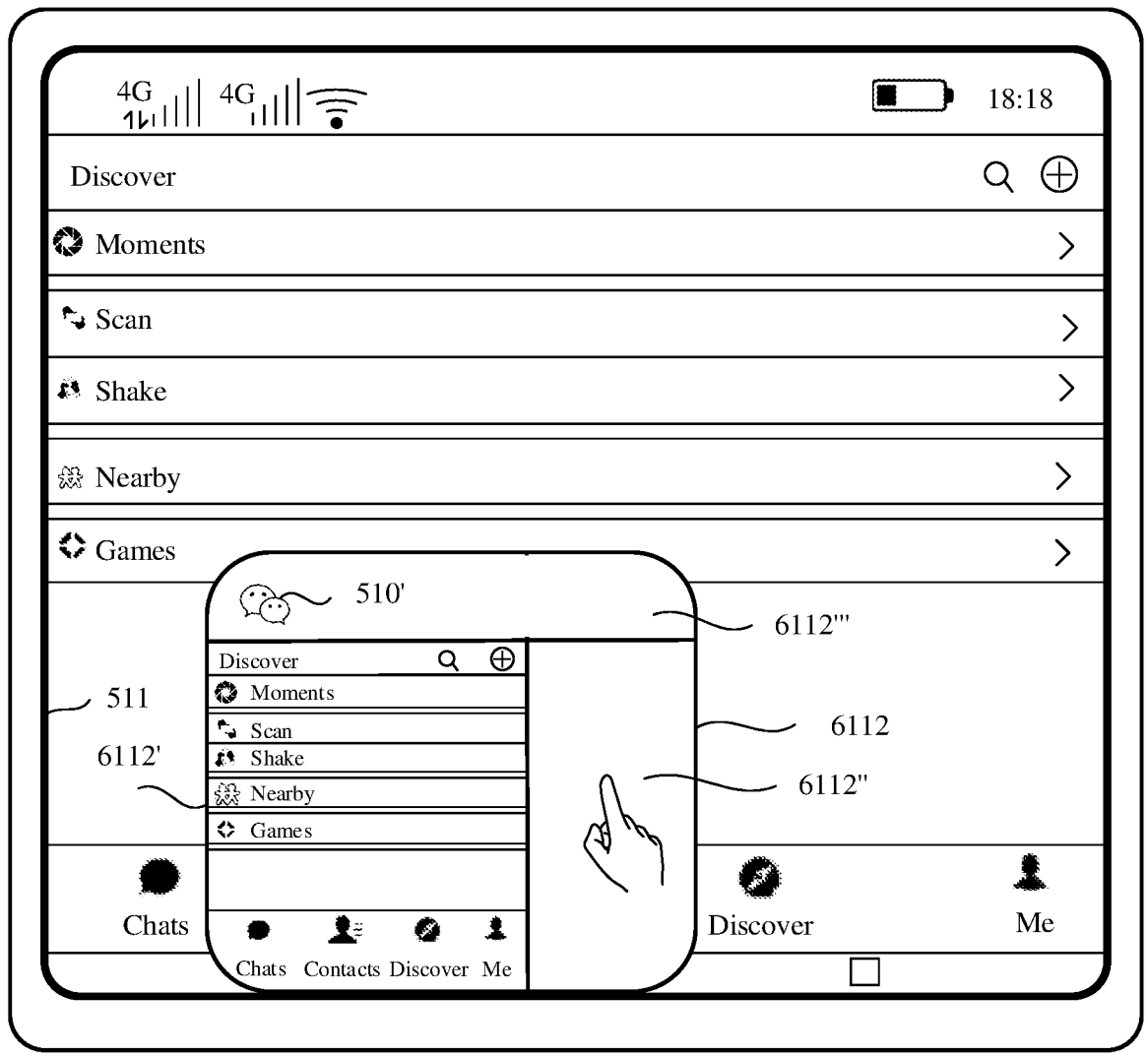
Figure 10F:
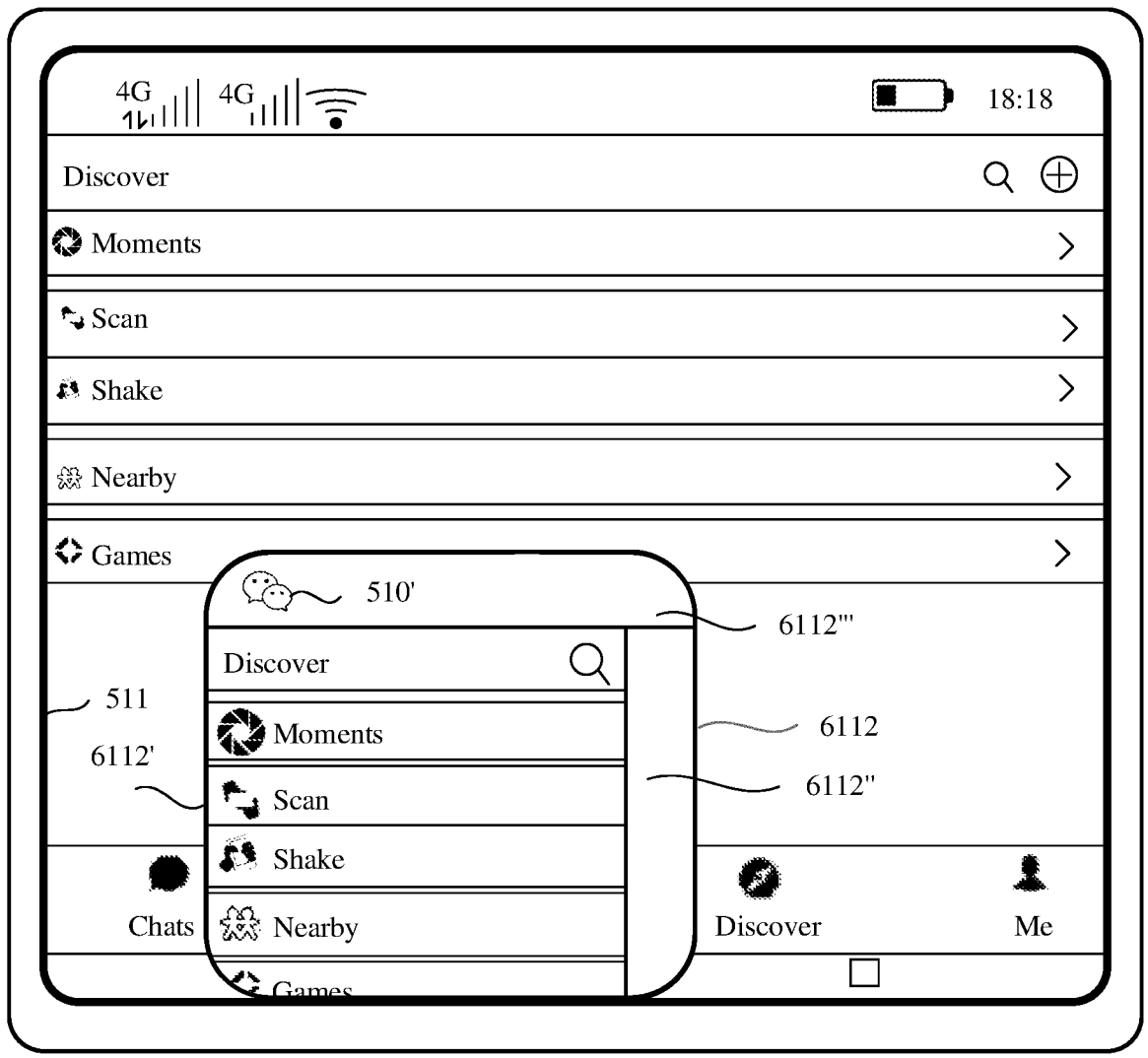
Figure 10G:
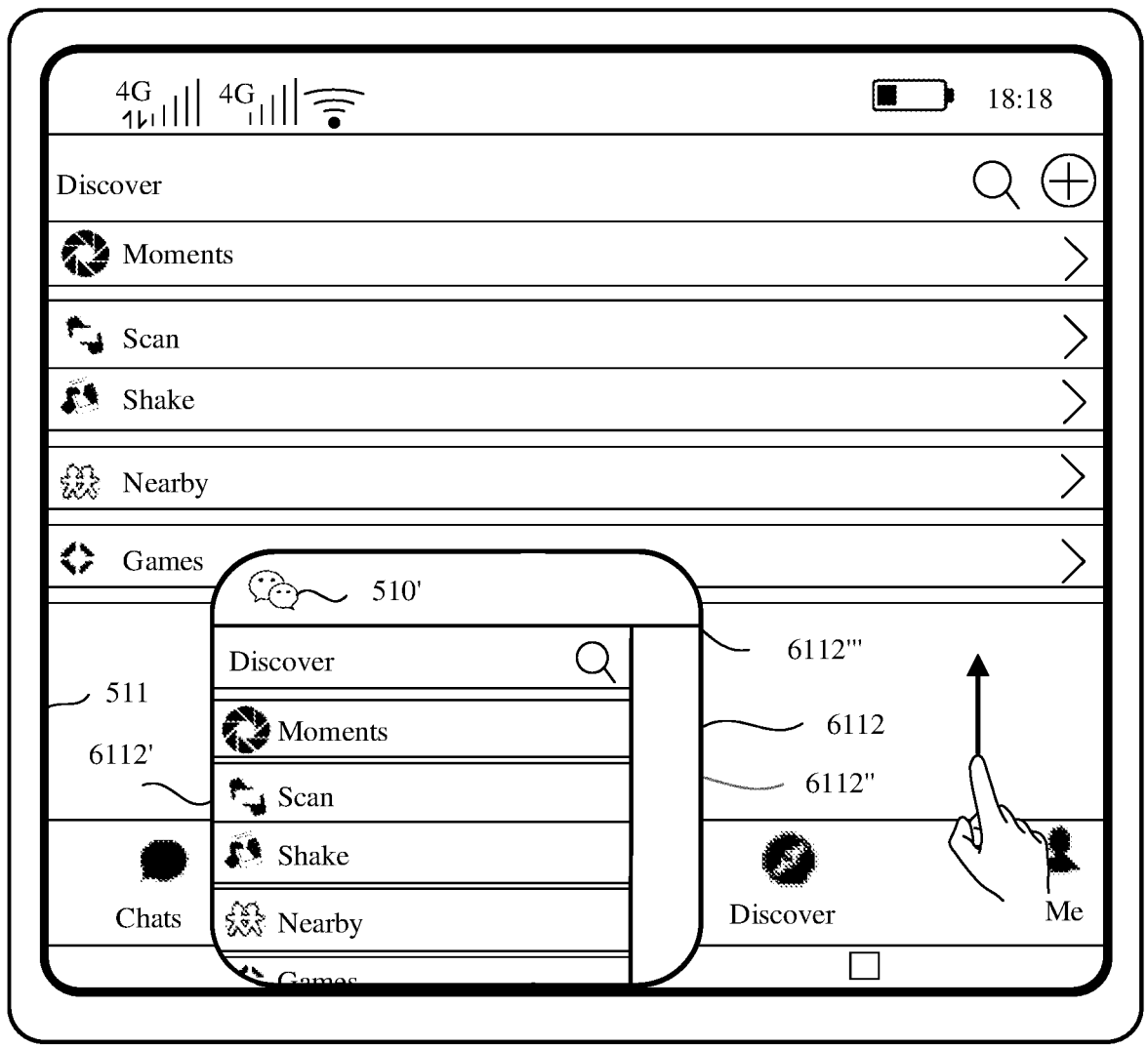
Figure 10H:
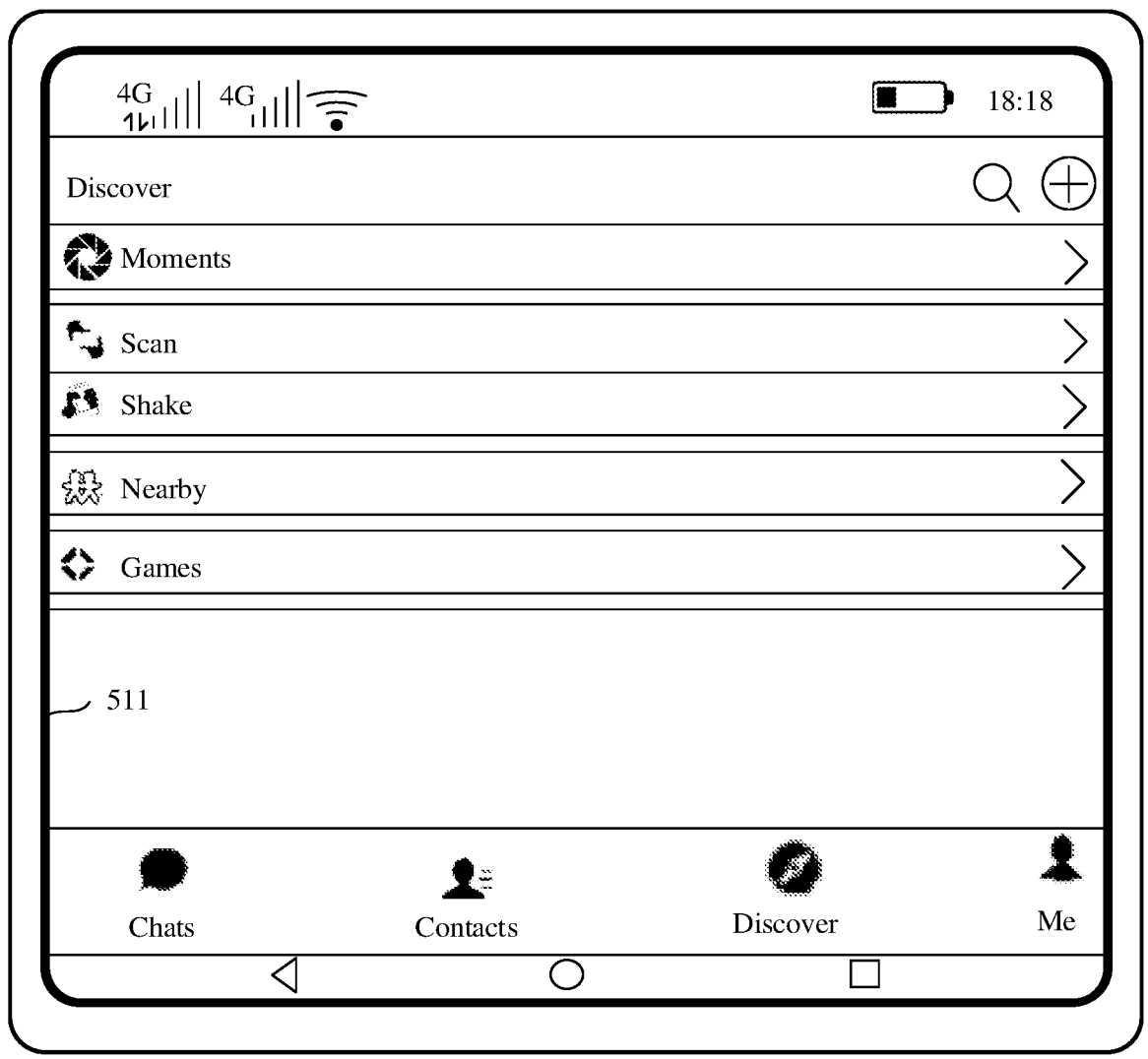

For example, as shown in FIG. 10(e), the content presented in the area 6112' may be the first content.

Figure 11A:
FIG. 11(*a*) to FIG. 11(*h*) are a schematic diagram of still another group of GUIs according to an embodiment of this application.
Figure 11B:
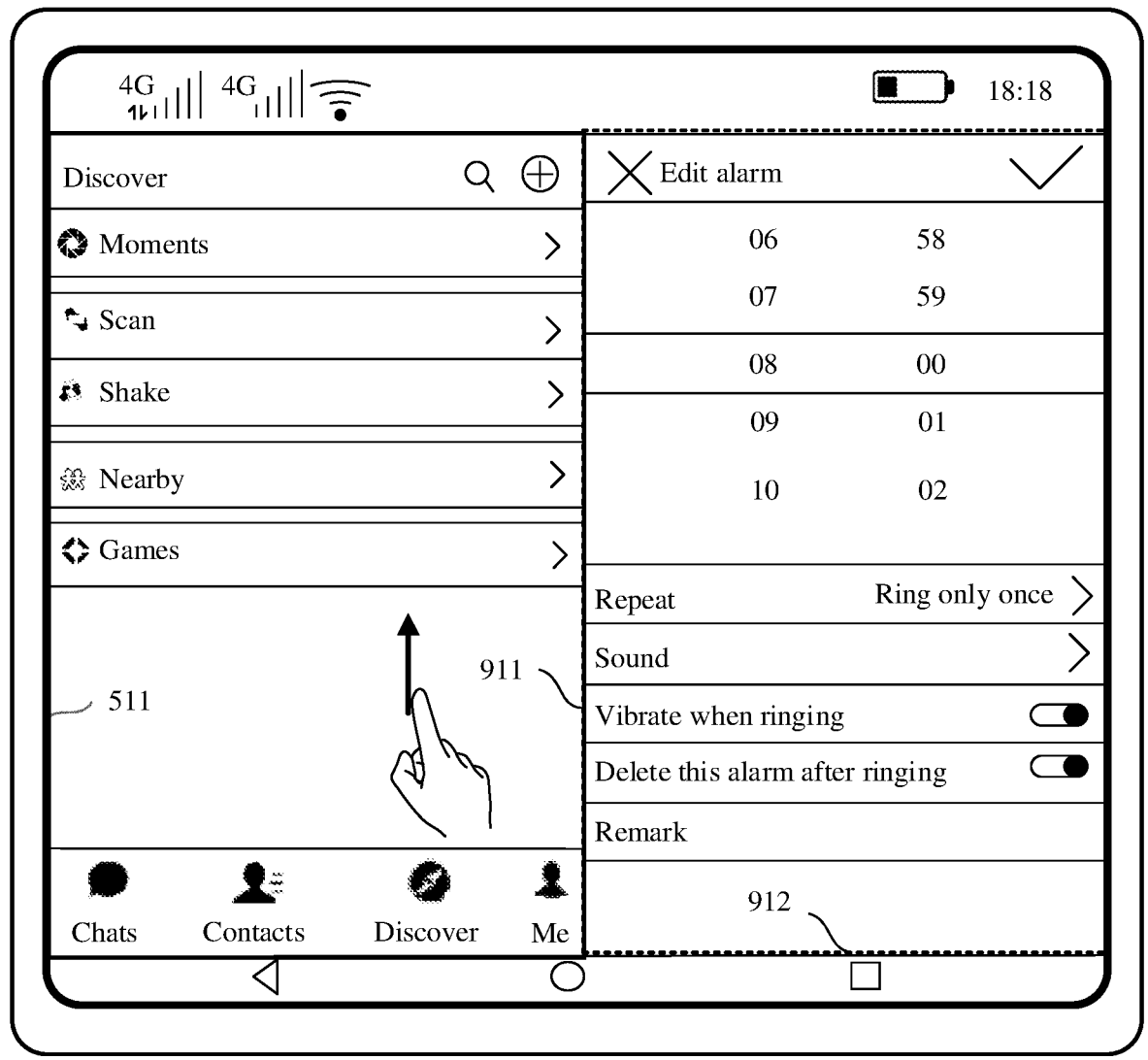
Figure 11C:
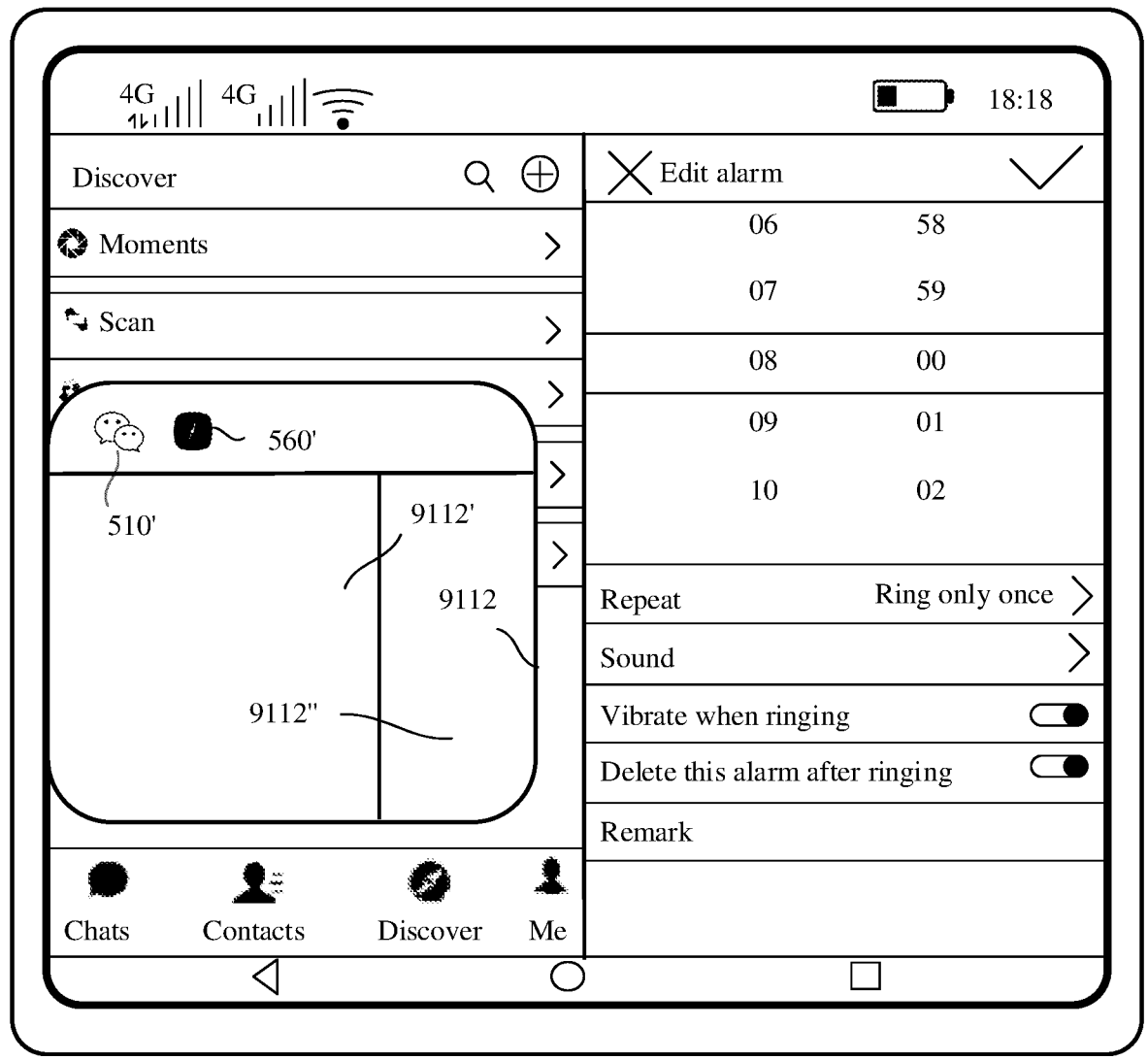
Figure 11D:
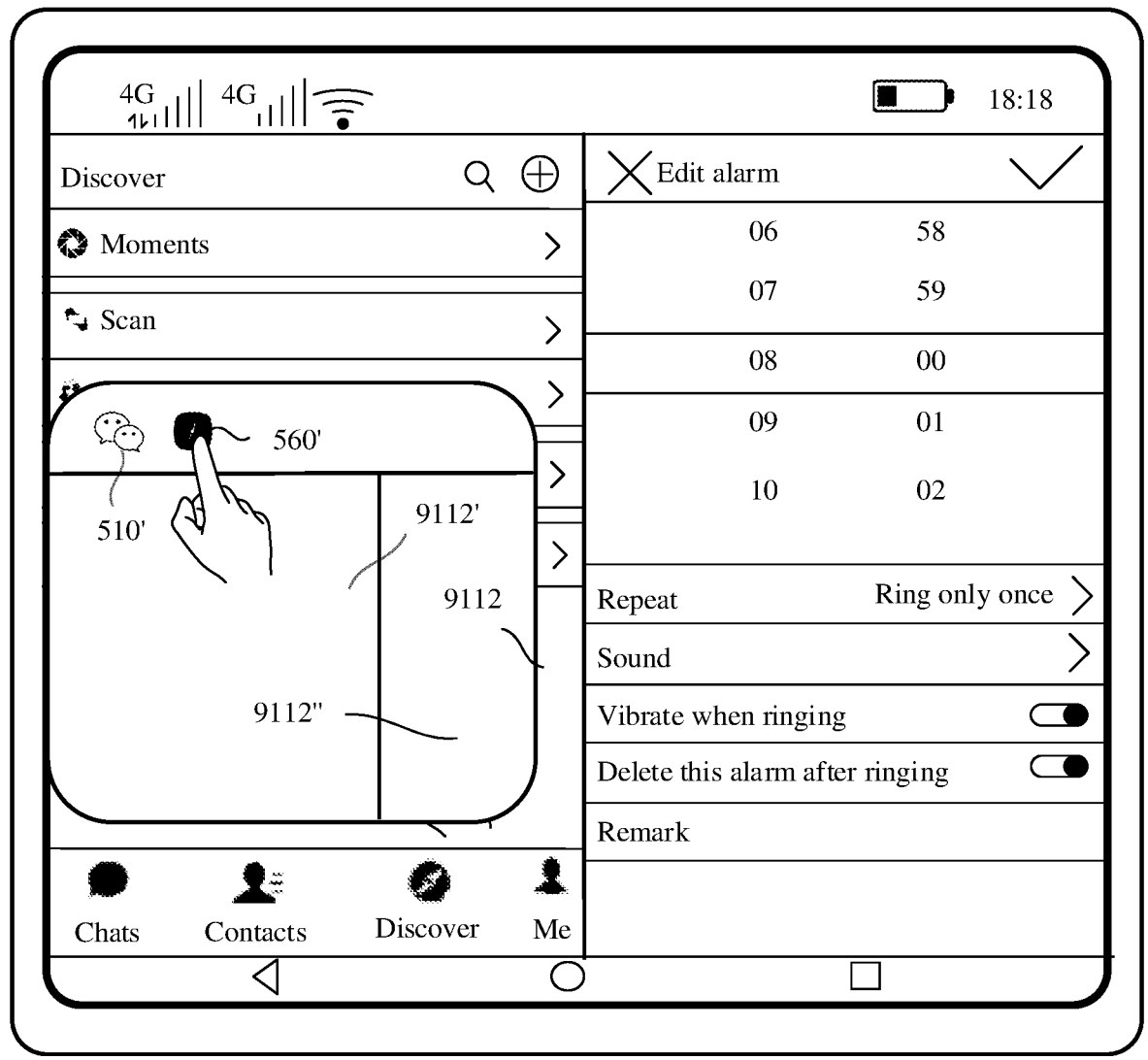
Figure 11E:
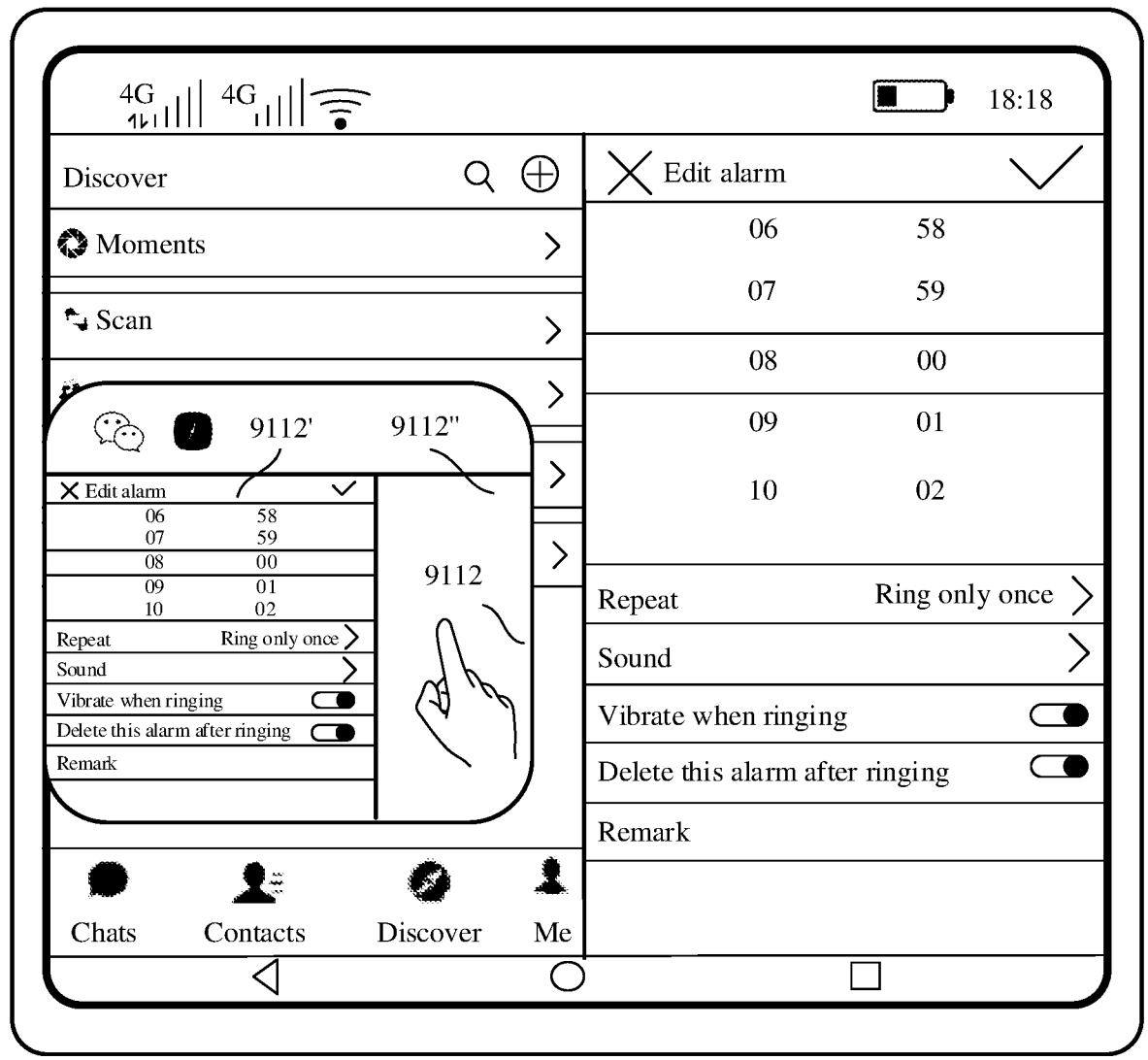
Figure 11F:
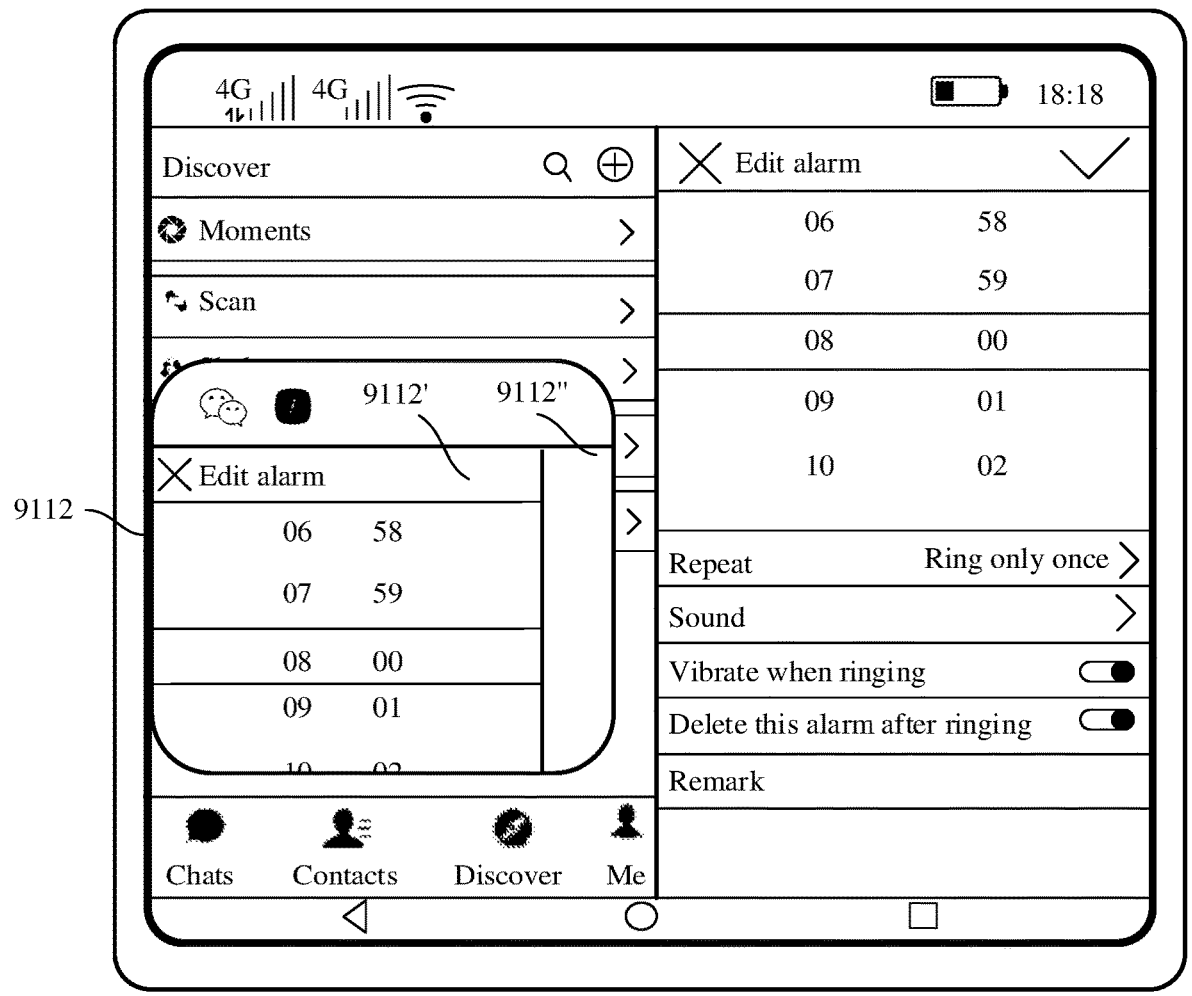
Figure 11G:
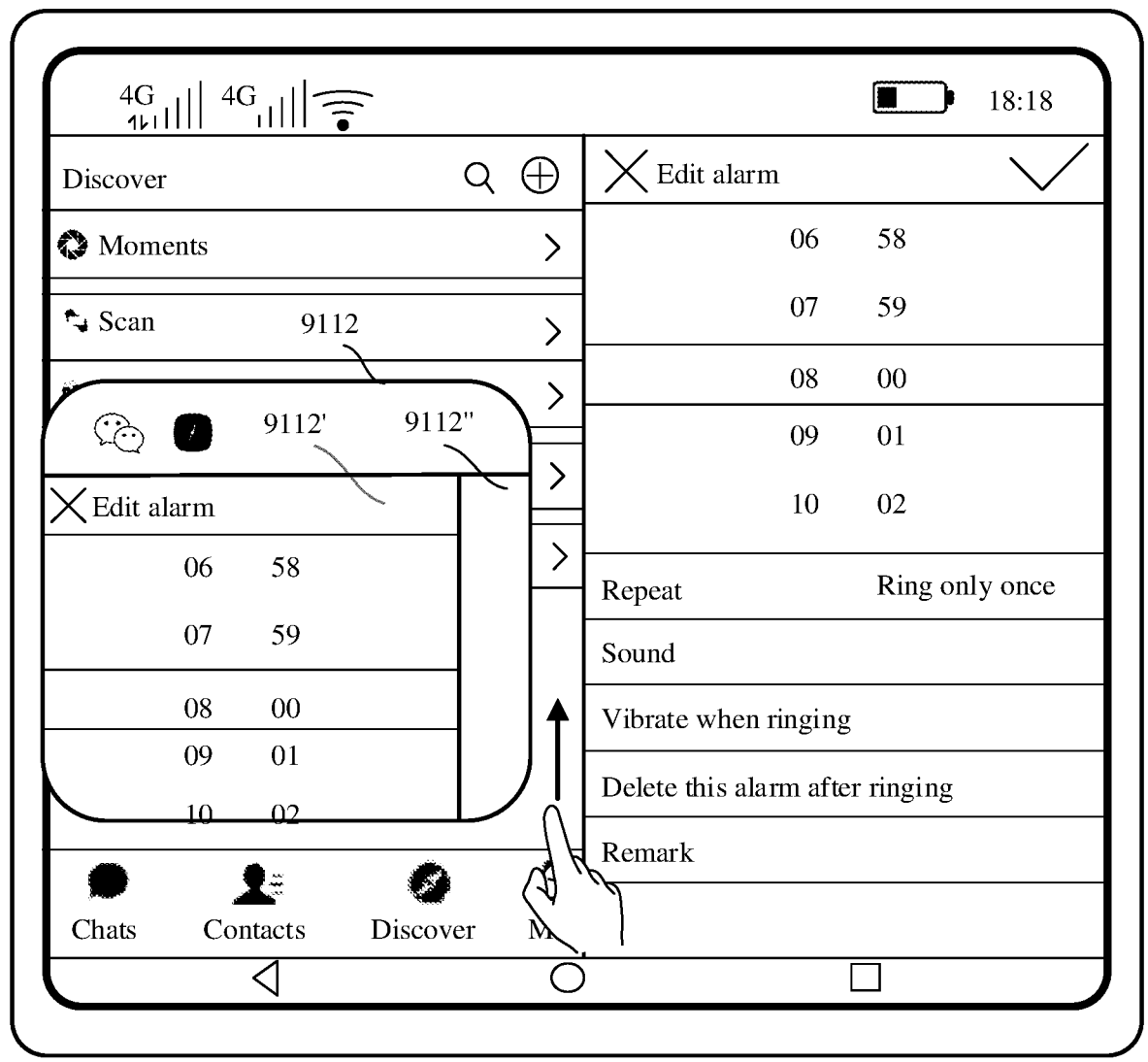

For example, as shown in FIG. 11(e), the content presented in the area 9112' may be the first content.

Optionally, the electronic device may obtain a location and a size of the first application through a second operation by using an AMS, so that the electronic device can find, in a frame buffer of the electronic device, one frame of image that is displayed by the first application on the electronic device and that corresponds to the location and the size of the first application, send the one frame of image to the first area in the first window, and display the one frame of image in the first area in the first window of the first device.

For example, the first window may be the window 5112, the window 6112, or the window 9112.

S1604: The electronic device detects a second operation in the first window.

The first window further includes a second area, and the second operation is detected in the second area in the first window.

Optionally, the second area may be the area 5112″, the area 6112″, or the area 9112″.

For example, the second operation may be a double-tap operation or a slide operation.

S1605: In response to the second operation, display second content of the first application in the first area in the first window, and display, in the first interface, content the same as that in the first area in the first window.

For example, as shown in FIG. 7(*f*), the first application is WeChat, the first content presented for the first application is the content presented in the interface 511, and the second content may be the content presented in the first area 5112′. As shown in FIG. 7(*g*), the second content that is of the first application and that is displayed in the first interface is the content presented in the interface 511.

For example, as shown in FIG. 8(*f*), the first application is WeChat, the first content presented for the first application is the content presented in the interface 511, and the second content may be the content presented in the first area 6112′. As shown in FIG. 8(*g*), the second content that is of the first application and that is displayed in the first interface is the content presented in the interface 511.

For example, as shown in FIG. 9(*f*), the first application is Alarm, the first content presented for the first application is the content presented in the interface 912, and the second content may be the content presented in the first area 9112′. As shown in FIG. 9(*g*), the second content that is of the first application and that is displayed in the first interface is the content presented in the interface 511.

Optionally, the electronic device may further detect, in the second area, a slide operation of the user along a second direction. After detecting, in the second area, the slide operation of the user along the second direction, the electronic device may display the second content in the first area.

Optionally, the second direction may be any direction.

For example, as shown in FIG. 13(*f*), the user performs a slide operation along the second direction in the second area 5112″. In this case, the first area 5112′ displays the second content, that is, the first area 5112′ shown in FIG. 13(*g*) displays the second content.

For example, as shown in FIG. 14(*f*), the user performs a slide operation along the second direction in the second area 6112″. In this case, the first area 6112′ displays the second content, that is, the first area 6112′ shown in FIG. 14(*g*) displays the second content.

For example, as shown in FIG. 15(*f*), the user performs a slide operation along the second direction in the second area 9112″. In this case, the first area 9112′ displays the second content, that is, the first area 9112′ shown in FIG. 15(*g*) displays the second content.

Optionally, the electronic device may obtain, based on the second operation, relative coordinates that are of a touch point corresponding to the second operation and that are relative to the first area, and calculate, based on a correspondence between the first area and the first interface occupying the entire electronic device, coordinates that are of a touch point corresponding to a third operation and that are relative to the first interface, where the correspondence may be a proportional relationship and/or an offset relationship, so that an input manager performs dispatch to map the touch point from the first area to the first interface. In this way, the content displayed in the first area is synchronized with the content displayed in the first interface.

Optionally, the first window further includes a third area, and at least one application running in the background of the electronic device is displayed in the third area. Optionally, the at least one application that runs in the background of the electronic device and that is displayed in the third area may be obtained by the electronic device by using an application management system (AMS).

Optionally, the third area may be the area 6112‴ or the area 9112‴.

Optionally, the at least one application that runs in the background of the electronic device and that is displayed in the third area may be an icon of the at least one application running in the background of the electronic device, or the at least one application that runs in the background of the electronic device and that is displayed in the third area may be a thumbnail of the at least one application running in the background of the electronic device.

For example, as shown in FIG. 8(*c*), if an opened application on the electronic device is WeChat, an icon of the opened application, that is, the icon 510′ of WeChat, is displayed in the third area 6112′.

For example, as shown in FIG. 9(*c*), if opened applications on the electronic device are WeChat and Alarm, icons of the opened applications, that is, the icon 510′ of WeChat and the icon 560′ of Alarm, are displayed in the third area 9112‴.

For example, as shown in FIG. 7(*d*), the second operation may be an operation that the user taps any blank location in the first window 5112.

For example, as shown in FIG. 8(*d*), the second operation may be an operation that the user taps the icon 510′.

For example, as shown in FIG. 9(*d*), the second operation may be an operation that the user taps the icon 560′.

Optionally, the method 1600 may further include steps S1606 to S1609.

S1606: Detect a third operation in the third area in the first window.

For example, the third operation may be a single-tap operation.

S1607: Display the first content of the first application in the first area in the first window in response to the third operation.

S1608: Detect a fourth operation in the first window.

For example, the fourth operation may be a double-tap operation, or the fourth operation may be a slide operation of the user with two fingers along two opposite directions on the electronic device.

S1609: Change a display size of the first window in the first interface in response to the fourth operation.

For example, as shown in FIG. 12(*d*), the user double-taps the first window 9112, and a display size of the first window is a size of the window 91121.

Optionally, the method 1600 may further include steps S1610 and S1611.

S1610: Detect a fifth operation in the first window.

For example, the fifth operation may be a drag operation.

S1611: Move the first window from a first location in the first interface to a second location in the first interface in response to the fifth operation.

For example, as shown in FIG. 12(e), the location A is the first location, and the location B is the second location. When the user drags the first window 91121 from the location A to the location B along the first direction, the first window 91121 on the electronic device moves from the location A in the first interface 511 to the location B in the first interface 511.

Optionally, the first direction may be any direction.

When the user performs a one-hand operation, and a hand of the user cannot touch a side that is away from the hand of the user, the user can implement the one-hand operation by using the operation method, to improve user experience.

It may be understood that, to implement the foregoing functions, the electronic device includes corresponding hardware and/or software modules for performing the functions. Algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, the electronic device may be divided into functional modules based on the method examples. For example, each functional module may be obtained through division based on each corresponding function, or two or more functions may be integrated into one processing module. The integrated module may be implemented in a form of hardware. It should be noted that, in the embodiments, division into the modules is an example and is merely logical function division, and may be other division in an actual implementation.

Figure 17:
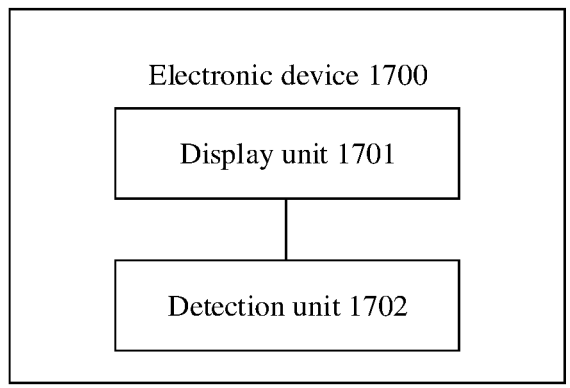
FIG. 17 is a schematic block diagram of an electronic device according to an embodiment of this application.

When each functional module is obtained through division based on each corresponding function, FIG. 17 is a possible schematic composition diagram of an electronic device 1700 related to the foregoing embodiment. As shown in FIG. 17, the electronic device 1700 may include a display unit 1701 and a detection unit 1702.

The display unit 1701 may be configured to support the electronic device 1700 in performing step 1601, step 1603, step 1605, and the like, and/or another process of the technology described in this specification.

The detection unit 1702 may be configured to support the electronic device 1700 in performing step 1602, step 1604, and the like, and/or another process of the technology described in this specification.

It should be noted that all related content in the steps in the foregoing method embodiments may be cited in function descriptions of corresponding functional modules. Details are not described herein again.

The electronic device provided in this embodiment is configured to perform the operation method. Effects that are the same as those of the foregoing implementation method can be achieved.

When an integrated unit is used, the electronic device may include a processing module, a storage module, and a communications module. The processing module may be configured to: control and manage actions of the electronic device, for example, may be configured to support the electronic device in performing the steps performed by the display unit 1701 and the detection unit 1703. The storage module may be configured to support the electronic device in storing program code, data, and the like. The communications module may be configured to support communication between the electronic device and another device.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor (DSP) and a microprocessor. The storage module may be a memory. The communications module may be specifically a device that interacts with another electronic device, such as a radio frequency circuit, a Bluetooth chip, or a Wi-Fi chip.

In an embodiment, when the processing module is a processor and the storage module is a memory, the electronic device in this embodiment may be a device in the structure shown in FIG. 1.

An embodiment further provides a computer storage medium. The computer storage medium stores computer instructions. When the computer instructions are run on an electronic device, the electronic device is enabled to perform the foregoing related method steps, to implement the operation method in the foregoing embodiments.

An embodiment further provides a computer program product. When the computer program product runs on a computer, the computer is enabled to perform the foregoing related steps, to implement the operation method in the foregoing embodiments.

In addition, an embodiment of this application further provides an apparatus. The apparatus may be specifically a chip, a component, or a module. The apparatus may include a processor and a memory that are connected. The memory is configured to store computer executable instructions, and when the apparatus runs, the processor may execute the computer executable instructions stored in the memory, so that the chip performs the operation method in the foregoing method embodiments.

The electronic device, the computer storage medium, the computer program product, and the chip provided in the embodiments are all configured to perform a corresponding method provided above. Therefore, for beneficial effects that can be achieved by the electronic device, the computer storage medium, the computer program product, and the chip, refer to beneficial effects in the corresponding method provided above. Details are not described herein again.

Based on the foregoing descriptions of the implementations, a person skilled in the art may understand that for the purpose of convenient and brief descriptions, division into the foregoing functional modules is merely used as an example for description. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, in other words, may be located at one place, or may be distributed on different places. A part or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing content is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An operation method performed by an electronic device, the operation method comprising:
    displaying, on a display of the electronic device, a home screen including an indicator of a first application;
    in response to a first operation selecting the indicator of the first application in the home screen, displaying, on the display of the electronic device, a first interface comprising first content of the first application;
    detecting a second operation in the first interface;
    in response to the second operation, displaying a first window in the first interface, wherein the first window comprises a first area, a second area, and a third area each of which is a respectively different area in the first window;
    displaying, in the third area, the indicator or another indicator of the first application;
    detecting a third operation in the third area; and
    in response to the third operation, displaying at least a portion of a second content of the first application in the first area in the first window, wherein the second content is the same as the first content displayed in the first interface, and simultaneously with the displaying said at least the portion of the second content of the first application in the first area in the first window, displaying the first content in the first interface and displaying the indicator or the other indicator in the third area of the first window,
    wherein in a time interval between said displaying, in the third area, the indicator or the other indicator of the first application and said detecting the third operation in the third area, no content is displayed in the first area.

2. The method according to claim 1, wherein the method further comprises:
    detecting a fourth operation in the second area in the first window; and
    in response to said detecting the fourth operation, adjusting a scaling of the second content displayed in the first area.

3. The method according to claim 1, wherein the method further comprises:
    detecting a fourth operation in the first window; and
    changing a display size of the first window in the first interface in response to the fourth operation.

4. The method according to claim 1, wherein the first window is located at a first location in the first interface; and the method further comprises:
    detecting a fourth operation in the first window; and
    moving the first window from the first location in the first interface to a second location in the first interface in response to the fourth operation.

5. The method according to claim 1, wherein a portion of the first content in the first interface is hidden from view by the first window, and wherein the simultaneously displayed first content is displayed in a same location in the first interface before the first window is displayed and when first window is displayed.

6. An electronic device, comprising:
    one or more processors;
    a display; and
    one or more memories, wherein
    the one or more memories store one or more computer programs, the one or more computer programs comprise instructions that when executed by the one or more processors cause the electronic device to perform operations comprising:
    displaying, on the display, a home screen including an indicator of a first application;
    in response to a first operation selecting the indicator of the first application in the home screen, displaying a first interface on the display, wherein the first interface comprises first content of the first application;
    detecting a second operation in the first interface;
    in response to the second operation, displaying a first window in the first interface, wherein the first window comprises a first area, a second area, and a third area each of which is a respectively different area in the first window;
    displaying, in the third area, the indicator or another indicator of the first application;
    detecting a third operation in the third area; and
    in response to the third operation, displaying at least a portion of a second content of the first application in the first area in the first window, wherein the second content is the same as the first content displayed in the first interface, and simultaneously with the displaying at least the portion of the second content of the first application in the first area in the first window, displaying the first content in the first interface and displaying the indicator or the other indicator in the third area of the first window, wherein in a time interval between said displaying, in the third area, the indicator or the other indicator of the first application and said detecting the third operation in the third area, no content is displayed in the first area.

7. The electronic device according to claim 6, wherein when the instructions are executed by the one or more processors, the electronic device performs further operations comprising:
    detecting the fourth operation in the second area in the first window; and
    in response to said detecting the fourth operation, adjusting a scaling of the second content displayed in the first area.

8. The electronic device according to claim 6, wherein when the instructions are executed by the one or more processors, the electronic device performs further operations comprising:
    detecting a fourth operation in the first window; and
    changing a display size of the first window in the first interface in response to the fourth operation.

9. The electronic device according to claim 6, wherein the first window is located at a first location in the first interface, and when the instructions are executed by the one or more processors, the electronic device performs further operations comprising:
    detecting a fourth operation in the first window; and
    moving the first window from the first location in the first interface to a second location in the first interface in response to the fourth operation.

10. A non-transitory computer readable storage medium comprising stored computer instructions which, when run on an electronic device, causes the electronic device to perform operations comprising:
    displaying, on a display of the electronic device, a home screen including an indicator of a first application;
    in response to a first operation selecting the indicator of the first application in the home screen, displaying, on the display of the electronic device, a first interface comprising first content of the first application;
    detecting a second operation in the first interface;
    displaying a first window in the first interface in response to the second operation, wherein the first window comprises a first area, a second area, and a third area, each of which is a respectively different area in the first window;
    displaying, in the third area, the indicator or another indicator of the first application;
    detecting a third operation in the third area; and
    in response to the third operation, displaying at least a portion of a second content of the first application in the first area in the first window, wherein the second content is the same as the first content displayed in the first interface, and simultaneously with the displaying at least the portion of the second content of the first application in the first area in the first window, displaying the first content in the first interface and displaying the indicator or the other indicator in the third area of the first window,
    wherein in a time interval between said displaying, in the third area, the indicator or the other indicator of the first application and said detecting the third operation in the third area, no content is displayed in the first area.

11. The non-transitory computer readable storage medium according to claim 10, wherein when the instructions are executed by the one or more processors, the electronic device performs further operations comprising:
    detecting the fourth operation in the second area in the first window; and
    in response to said detecting the fourth operation, adjusting a scaling of the second content displayed in the first area.

12. The non-transitory computer readable storage medium according to claim 10, wherein when the instructions are executed by the one or more processors, the electronic device performs further operations comprising:
    detecting a fourth operation in the first window; and
    changing a display size of the first window in the first interface in response to the fourth operation.

13. The non-transitory computer readable storage medium according to claim 10, wherein the first window is located at a first location in the first interface, and when the instructions are executed by the one or more processors, the electronic device performs further operations comprising:
    detecting a fourth operation in the first window; and
    moving the first window from the first location in the first interface to a second location in the first interface in response to the fourth operation.

* * * * *